US006983108B2

(12) United States Patent
Sugawara et al.

(10) Patent No.: US 6,983,108 B2
(45) Date of Patent: Jan. 3, 2006

(54) OPTICAL SWITCHING APPARATUS AND OPTICAL TRANSMISSION APPARATUS

(75) Inventors: Mitsuru Sugawara, Kawasaki (JP); Takashi Yano, Hachioji (JP); Kyosuke Dobashi, Higashimurayama (JP); Katsumi Kusama, Chofu (JP); Sadao Tanikoshi, Hachioji (JP); Kazuhiko Ide, Yamato (JP); Mitsuru Otani, Tokyo (JP); Masayuki Takami, Hachioji (JP); Mototaka Kitajima, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 812 days.

(21) Appl. No.: 09/978,637

(22) Filed: Oct. 18, 2001

(65) Prior Publication Data

US 2002/0044315 A1 Apr. 18, 2002

(30) Foreign Application Priority Data

Oct. 18, 2000 (JP) ............................ 2000-318486

(51) Int. Cl.
*H04J 14/00* (2006.01)

(52) U.S. Cl. ............................ 398/45; 398/46; 398/48; 398/50

(58) Field of Classification Search .................. 398/45, 398/46, 48, 49, 50, 51; 385/16, 17
See application file for complete search history.

(56) References Cited

U.S. PATENT DOCUMENTS

| | | | | |
|---|---|---|---|---|
| 5,625,478 | A * | 4/1997 | Doerr et al. | 398/4 |
| 5,809,221 | A * | 9/1998 | Kumar et al. | 714/4 |
| 6,344,912 | B1 * | 2/2002 | Hajjar et al. | 398/48 |
| 6,631,018 | B1 * | 10/2003 | Milton et al. | 398/59 |
| 6,771,907 | B1 * | 8/2004 | Yoshifuji et al. | 398/59 |

OTHER PUBLICATIONS

T. Miyazaki, et al., IEICE Trans. Electron, vol. E82-C, No. 2, pp. 274-282, “A Demonstration of an Optical Switch Circuit with “Bridge and Switch” Function in WDM Four-Fiber Ring Networks”, Feb. 1999.

R. Iraschko, et al., OFC’99 100C, pp. 154 TuK3-1 to 156 TuK3-3, “An Optical 4-Fiber Bi-Directional Line-Switched Ring”, 1999.

* cited by examiner

*Primary Examiner*—Kenneth Vanderpuye
*Assistant Examiner*—Dzung Tran
(74) *Attorney, Agent, or Firm*—Oblon, Spivak, McClelland, Maier & Neustadt, P.C.

(57) ABSTRACT

Optical signals inputted to input ports are split in half by 1×2 optical splitters respectively and the resulting signals are inputted to the input terminals of an optical matrix switch. The optical matrix switch switches between the routes of the individual optical signals and outputs the signal at any of the output ports. This enables the optical signal from the same input port to be outputted at two different output ports, which makes it possible to effect “bridge” at the time of protection switching.

33 Claims, 43 Drawing Sheets

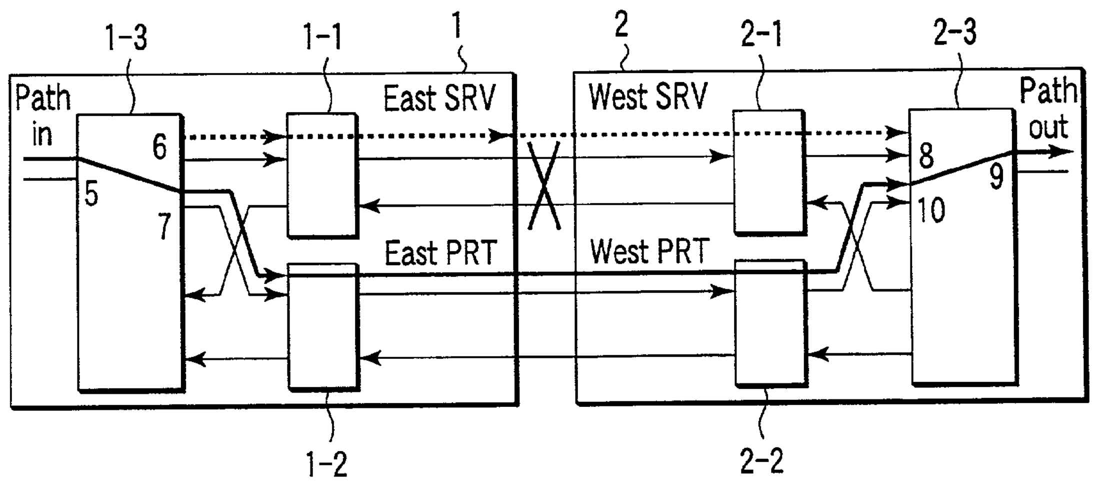
F I G. 3A
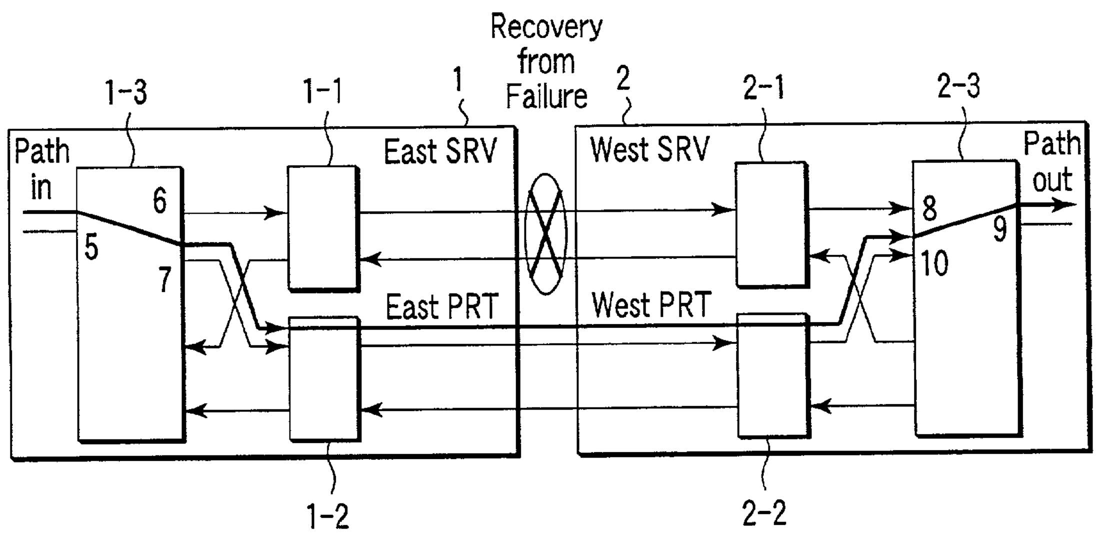
F I G. 3B

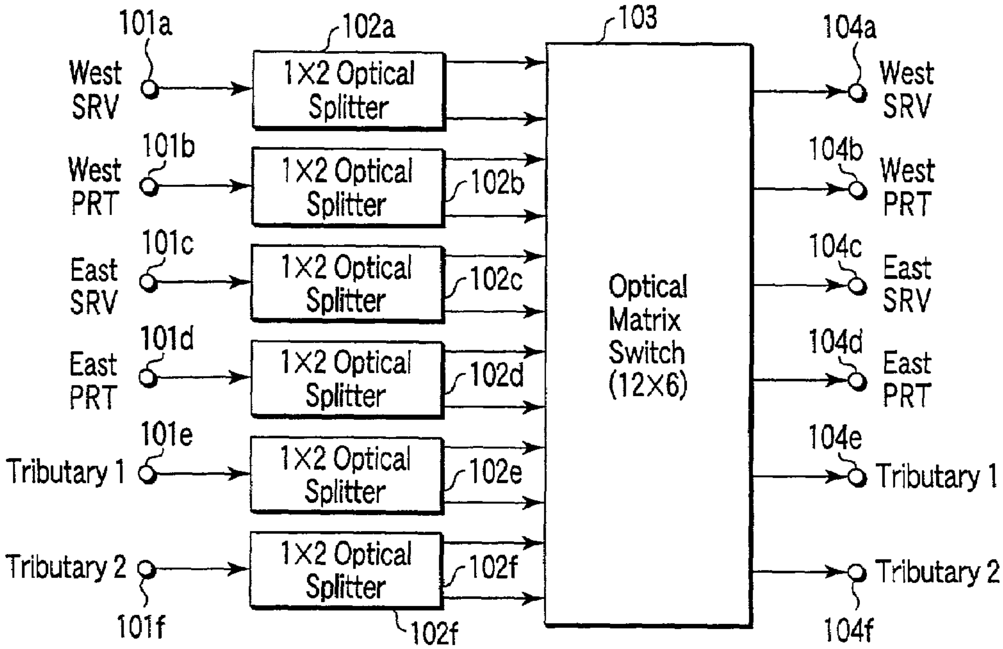
F I G. 8
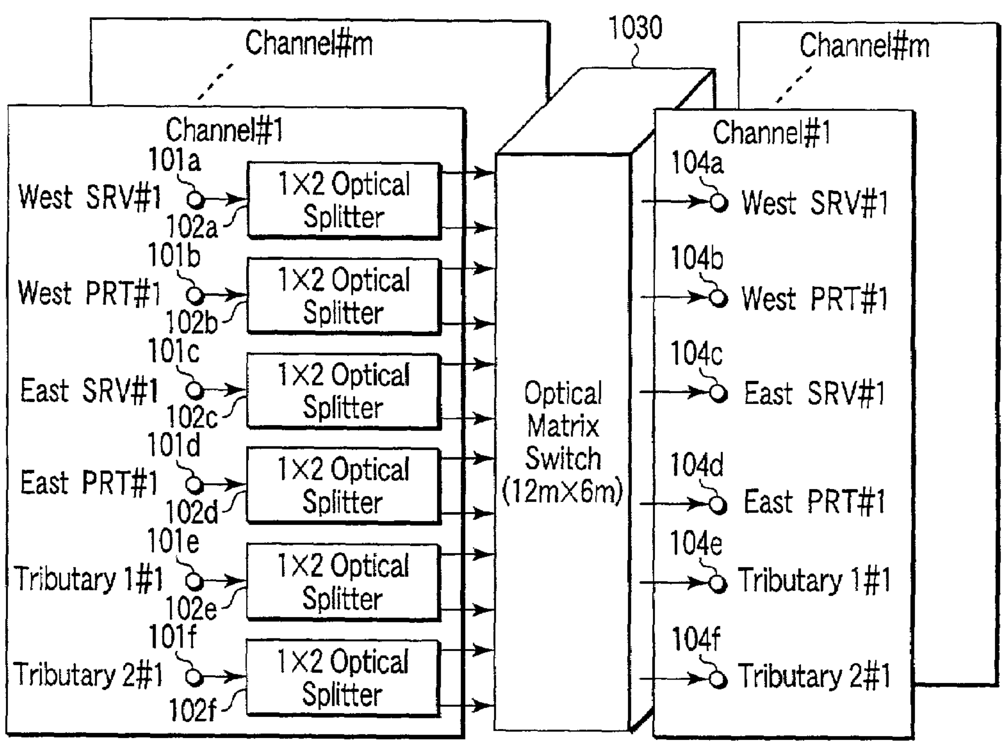
F I G. 9

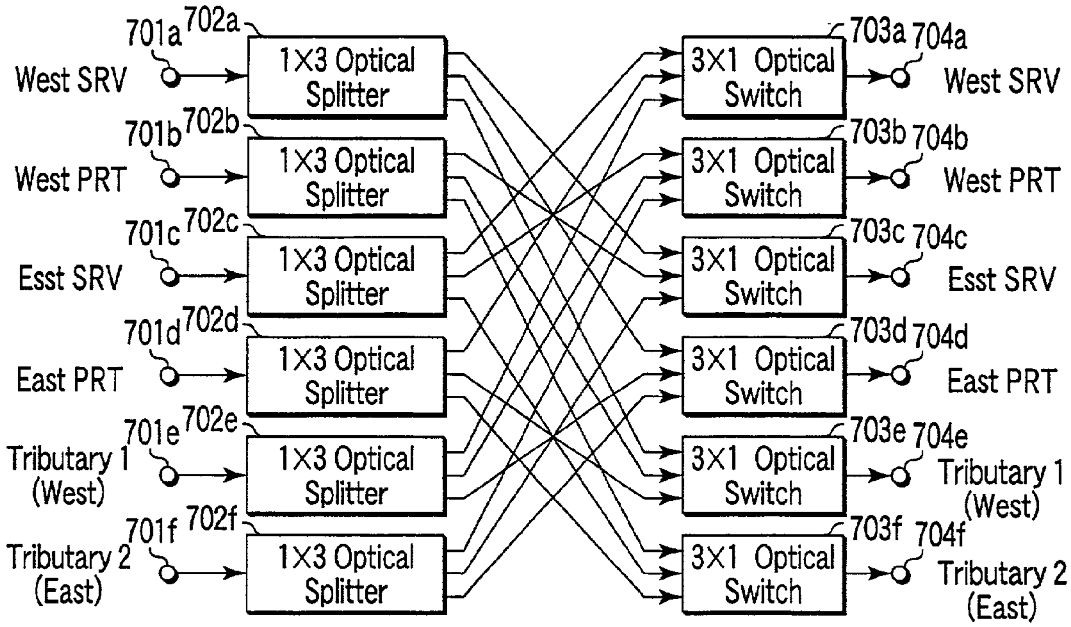
F I G. 15
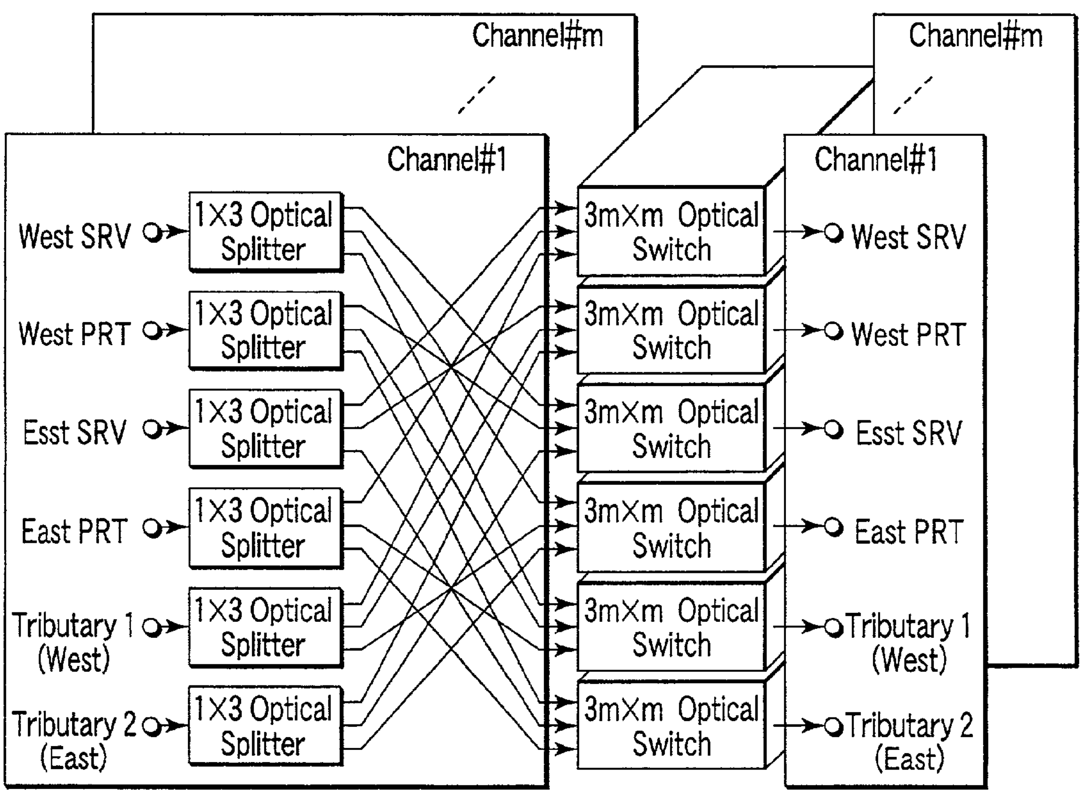
F I G. 16

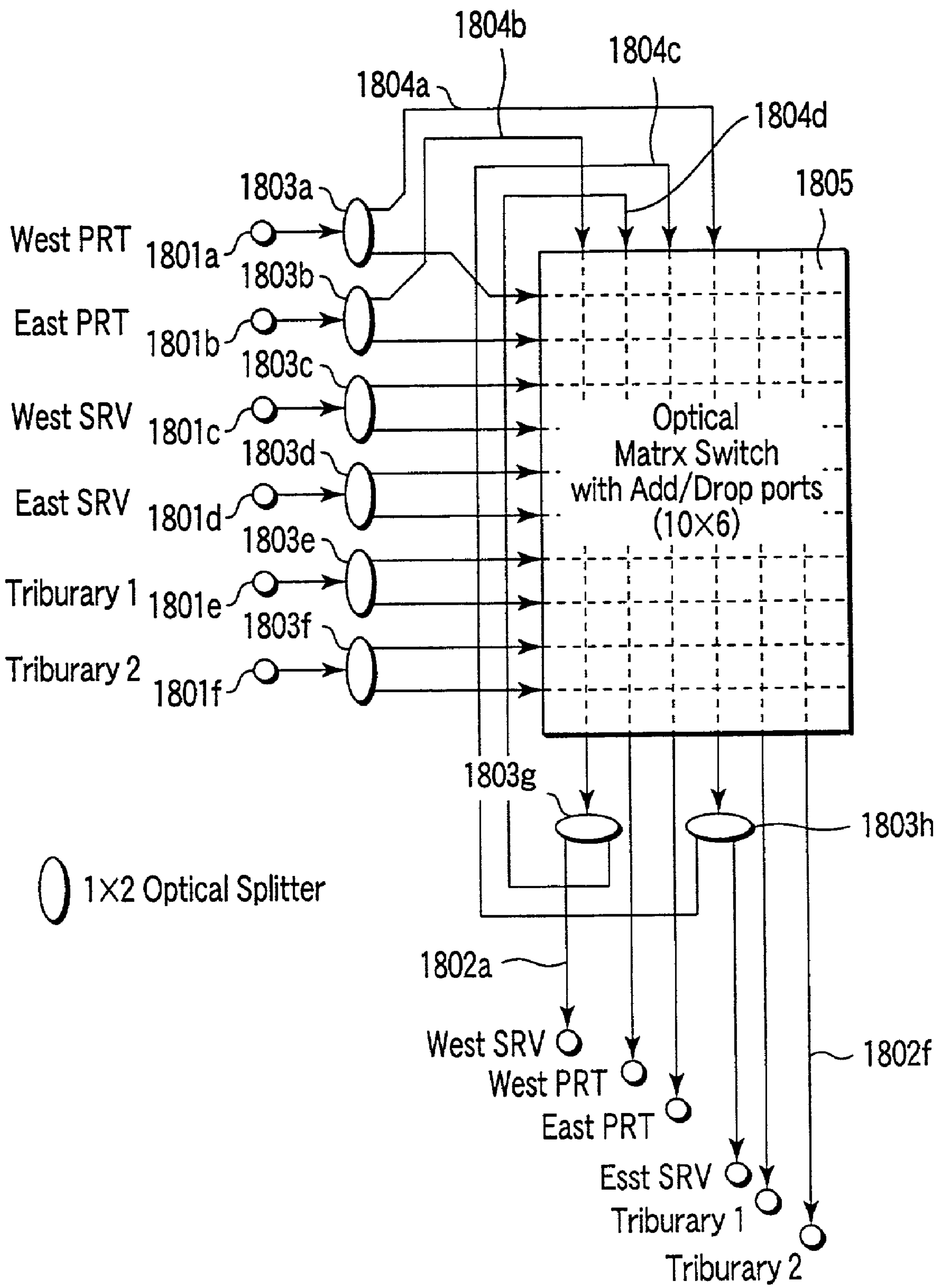
F I G. 27

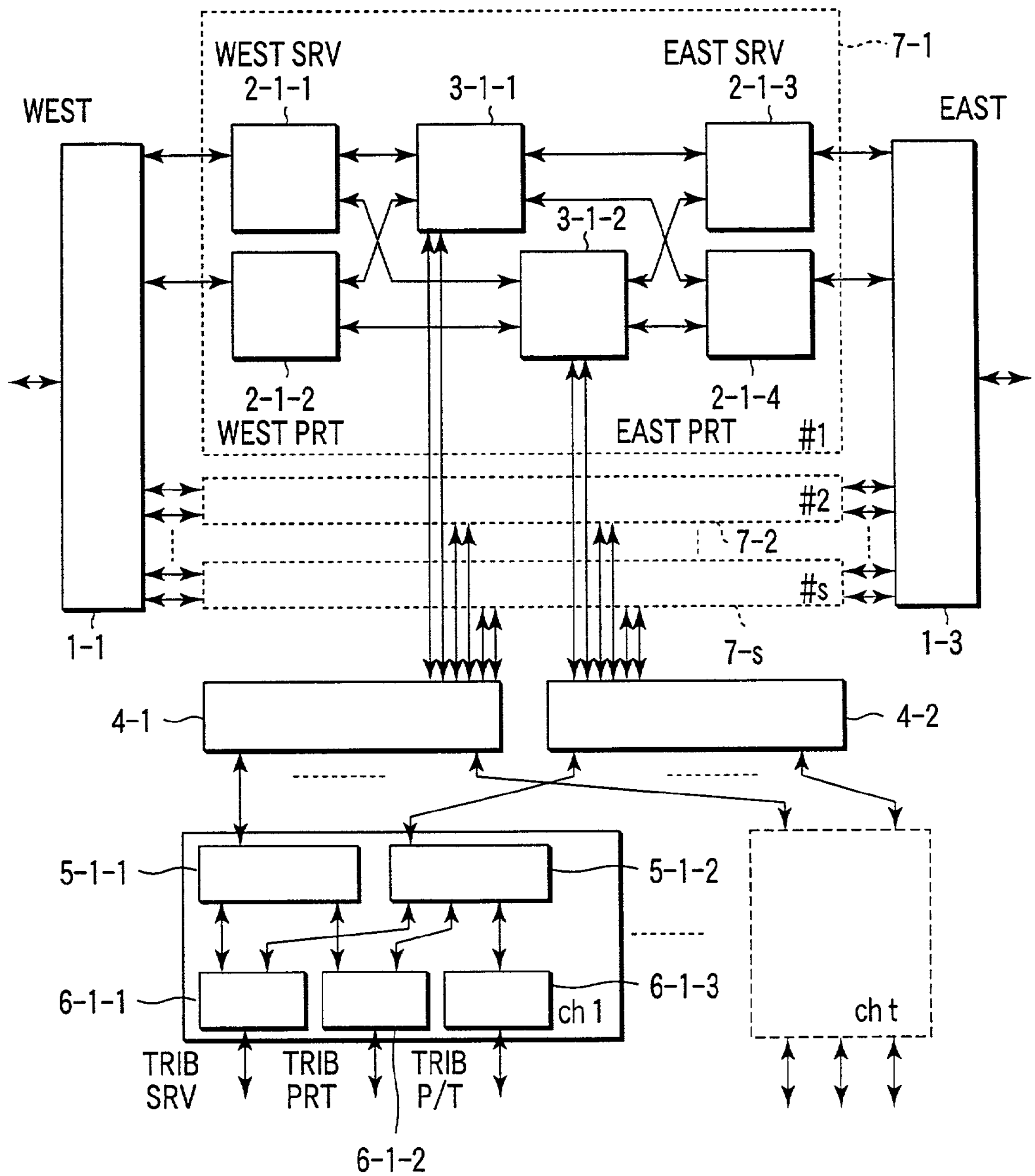
F I G. 42

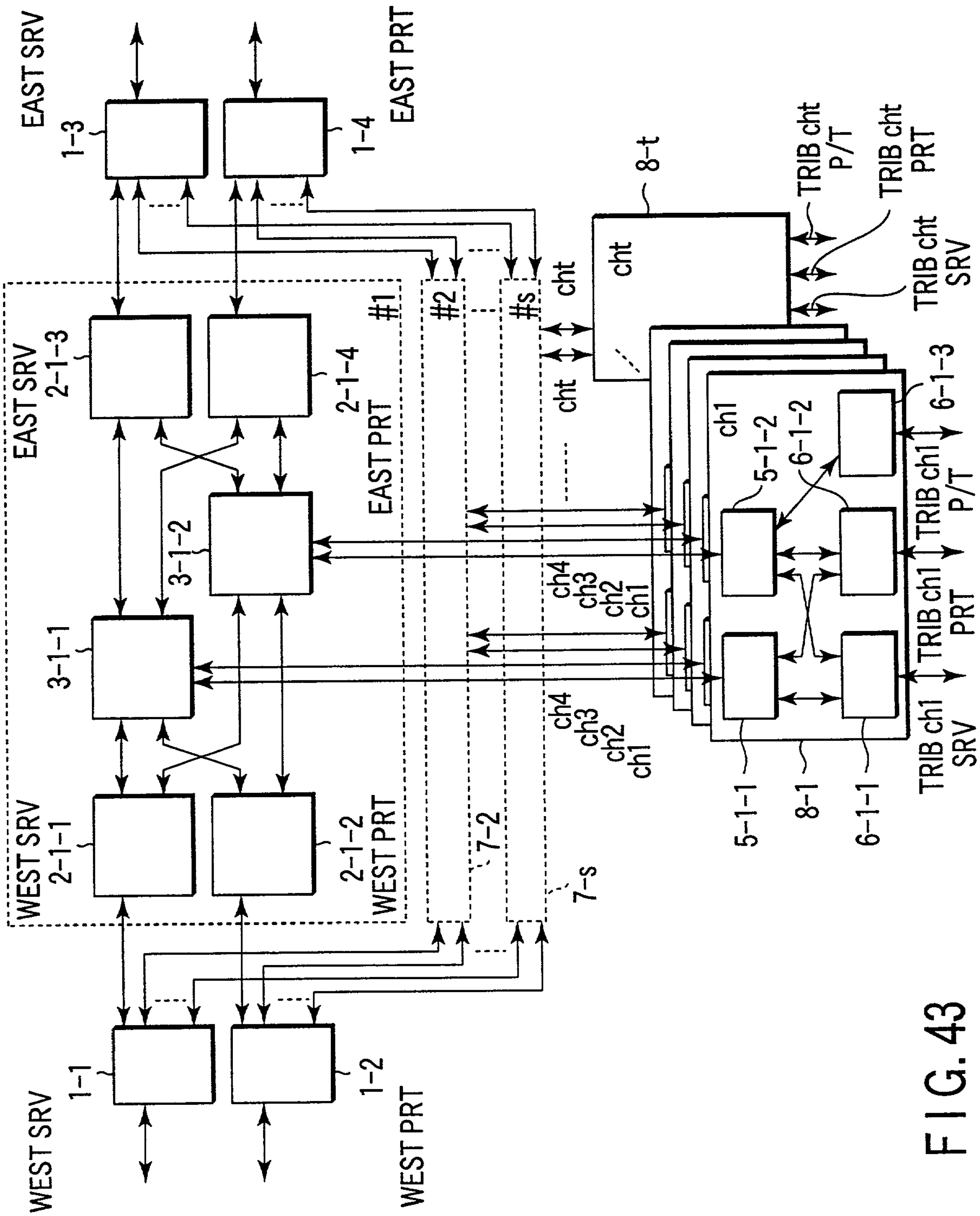
F I G. 43

OPTICAL SWITCHING APPARATUS AND OPTICAL TRANSMISSION APPARATUS

CROSS-REFERENCE TO RELATED APPLICATIONS

This application is based upon and claims the benefit of priority from the prior Japanese Patent Application No. 2000-318486, filed Oct. 18, 2000, the entire contents of which are incorporated herein by reference.

BACKGROUND OF THE INVENTION

1. Field of the Invention

This invention relates to an optical switching apparatus and an optical transmission apparatus which are applied to, for example, a wavelength-division multiplexing optical transmission system.

2. Description of the Related Art

With optical fiber amplifiers recently put to practical use, information transmission by a wavelength-division multiplexing (WDM) method has drawn attention. Optical signals including a plurality of time-division-multiplexed time slots are multiplexed using different wavelengths, which enables the information transmission capacity to be increased remarkably.

In a conventional information transmission system, a transmission apparatus is provided for each wavelength. The add/drop process of signals is carried out in time slots. Since such an architecture requires as many transmission apparatuses as corresponds to the number of wavelengths to be multiplexed, the size of the system becomes large.

To overcome this problem, an optical transmission apparatus capable of performing the add/drop process of signals in wavelengths is being developed. In this type of apparatus, an optical switch apparatus for switching the path of an optical signal is an important device. Hereinafter, an apparatus for carrying out the add/drop process in time slots is called a transmission apparatus and an apparatus for carrying out the add/drop process in wavelengths is called an optical transmission apparatus to distinguish them.

Many information transmission systems are provided with working channels/sections and protection channels/sections for redundancy to prevent the signal transmission from being cut off due to the occurrence of a failure. This type of system has a so-called self-healing function of changing the normal traffic from the working channels/sections to the protection channels/sections or detouring the normal traffic around the working channels/sections to the protection channels/sections.

The self-healing function is a function related to the process called protection switching. The protection switching includes switching whereby the normal traffic flowing through the working channels/sections is detoured to the protection channels/sections and revertive switching whereby the normal traffic flowing through the protection channels/sections is returned to the working channels/sections.

The transmission apparatus can transmit the same traffic to both the working channels/sections and the protection channels/sections, because the traffic transmitted in the form of optical signals are converted to electric signals in the apparatus. This has an advantageous effect on the simplification of the procedure necessary to effect protection switching.

In contrast, the optical transmission apparatus deals with traffic in the form of optical signals without converting traffic into electric signals. Because of this, the conventional optical transmission apparatus cannot transmit the same traffic to both of the working channels/sections and protection channels/sections. This makes the procedure necessary to effect protection switching complex, which leads to the disadvantages that the state where the information transmission is cut off might last a long time and that the switch completion time might become longer.

BRIEF SUMMARY OF THE INVENTION

The object of the present invention is to provide an optical switching apparatus and an optical transmission apparatus which are capable of simplifying the procedure necessary to effect protection switching and thereby contributing to an improvement in the performance of protection switching.

An optical switching apparatus of the present invention has the function of splitting optical signals arrived via the optical transmission lines into a plurality of sub-signals and sending them to a plurality of optical transmission lines other than the optical transmission lines over which the optical signals came.

More specifically, an optical switching apparatus of the present invention comprises n×m input ports to which optical signals are inputted, n×m output ports for outputting optical signals, n×m optical splitting elements for each splitting in half the optical signal inputted from the corresponding one of the input ports, and an optical matrix switch including 2×n×m input terminals to which the split signals outputted from the optical splitting elements are inputted in a one-to-one correspondence and n×m output terminals connected to the output ports in a one-to-one correspondence.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are diagrams to help explain the operation when a failure has occurred in the transmission path in a case where two units of the optical transmission apparatus of FIG. 1 are provided so as to face each other;

FIG. 8 is a block diagram showing the configuration of a optical switch section according to a first embodiment of the present invention;

FIG. 9 is a block diagram showing the configuration of a optical switch section according to a second embodiment of the present invention;

FIG. 15 is a block diagram showing the configuration of a optical switch section according to a seventh embodiment of the present invention;

FIG. 16 is a block diagram showing the configuration of a optical switch section according to an eighth embodiment of the present invention;

FIG. 27 is a block diagram showing the configuration of a optical switch section according to an eighteenth embodiment of the present invention;

FIG. 42 is a block diagram showing another configuration of an optical transmission apparatus according to the present invention;

FIG. 43 is a block diagram showing another configuration of an optical transmission apparatus according to the present invention;

DETAILED DESCRIPTION OF THE INVENTION

Hereinafter, referring to the accompanying drawings, embodiments of the present invention will be explained.

Figure 1:
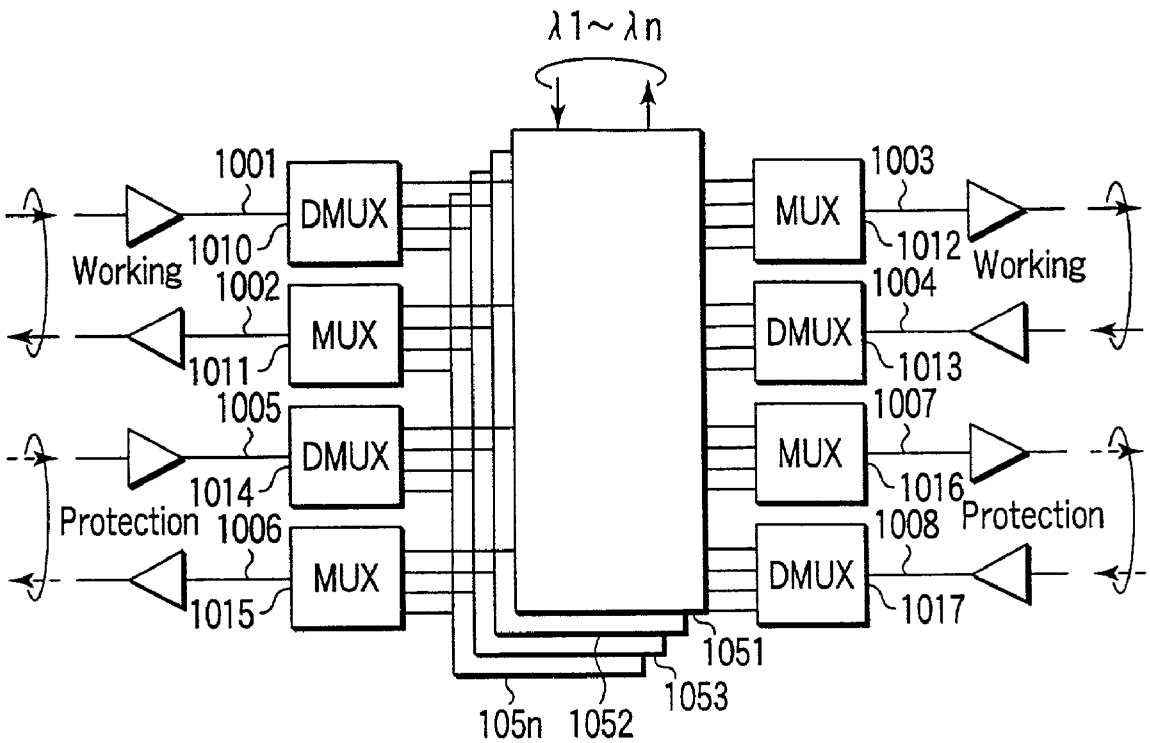
FIG. 1 is a functional block diagram showing the configuration of a conventional optical transmission apparatus used in a wavelength-division multiplexing ring network using OADM techniques.

Referring to FIG. 1, an optical transmission apparatus used in a wavelength-division multiplexing ring network using OADM (Optical Add Drop Multiplexer) techniques will be explained. FIG. 1 is a functional block diagram showing the configuration of an optical transmission apparatus applied to a network with the so-called FFRN (Four Fiber Ring Network) configuration. The network of FIG. 1 comprises service lines 1001 to 1004 and protection lines 1005 to 1008. The concept of this type of apparatus has been described in, for example, the references below:

i) Rainer Iraschko et al., "An Optical 4-Fiber bidirectional Line-switched Ring," OFC'99, TuK 3-1, 1999.

ii) Tetsuya MIYAZAKI et al., "A Demonstration of an Optical Switch Circuit with "Bridge and Switch" Function in WDM Four-Fiber Ring Networks," IEICE TRANS.ELECTRON., Vol. E82-C, No. 2, February 1999.

In the optical transmission apparatus 1000 of FIG. 1, the wavelength-division multiplex light arrived through lines 1001, 1004, 1005, and 1008 is split into an optical signal with a wavelength of λ1, an optical signal with a wavelength of λ2, . . . , an optical signal with a wavelength of λn by wavelength demultiplexing sections (DMUX) 1010, 1013, 1014, and 1017, respectively. The demultiplexed optical signals with wavelengths of λ1, λ2, . . . , λn are inputted to optical switch circuits 1051 to 105n provided for the respective wavelengths.

Each of the optical switch circuits 1051 to 105n subjects the optical signal of the wavelength allocated to itself to an Add/Drop process or a Through process. The individual optical signals are multiplexed at wavelength multiplexing sections (MUX) 1011, 1012, 1015, and 1016 and the resulting signals are transmitted to adjacent stations via lines 1002, 1003, 1006, and 1007.

Referring to FIGS. 2A, 2B, 2C, 3A, and 3B, an explanation will be given as to the operation in the failure state when two units of the optical transmission apparatus of FIG. 1 are provided in such a manner that they face each other. In these figures, reference numerals 1 and 2 indicate optical transmission apparatuses having the configuration shown in FIG. 1. They are connected bidirectionally via service lines (with no reference numeral) and protection lines (with no reference numeral). Reference numerals 1-1 and 2-2 indicate wavelength multiplexing sections, which correspond to reference numerals 1011, 1012, 1015, and 1016 in FIG. 1. Reference numerals 1-2 and 2-1 indicate wavelength demultiplexing sections, which correspond to reference numerals 1010, 1013, 1014, and 1017 in FIG. 1. Reference numerals 1-3 and 2-3 are optical switch circuits, which correspond to a single common wavelength.

Figure 2A:
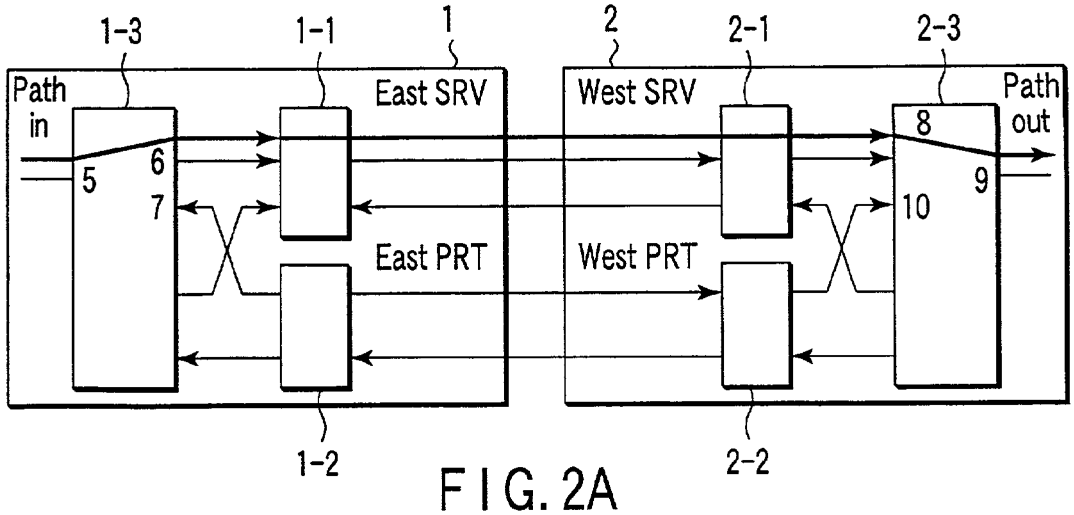
FIGS. 2A to 2C are diagrams to help explain the operation when a failure has occurred in the transmission path in a case where two units of the optical transmission apparatus of FIG. 1 are provided so as to face each other.

In the normal state shown in FIG. 2A, the optical signal inputted to an input port 5 of the optical switch circuit 1-3 of the optical transmission apparatus 1 is connected to an output port 6. This optical signal passes through the optical wavelength-division multiplexing and demultiplexing section 1-1 and is outputted from the optical transmission apparatus 1 to the service line. The signal introduced via the service lines to the optical transmission apparatus 2 passes through the optical wavelength-division multiplexing and demultiplexing section 2-1 of the optical transmission apparatus 2 and is inputted to an input port 8 of the optical switch circuit 2-3 and then connected to an output port 9. In this way, a path extending from the optical transmission apparatus 1 to the optical transmission apparatus 2 is set.

Figure 2B:
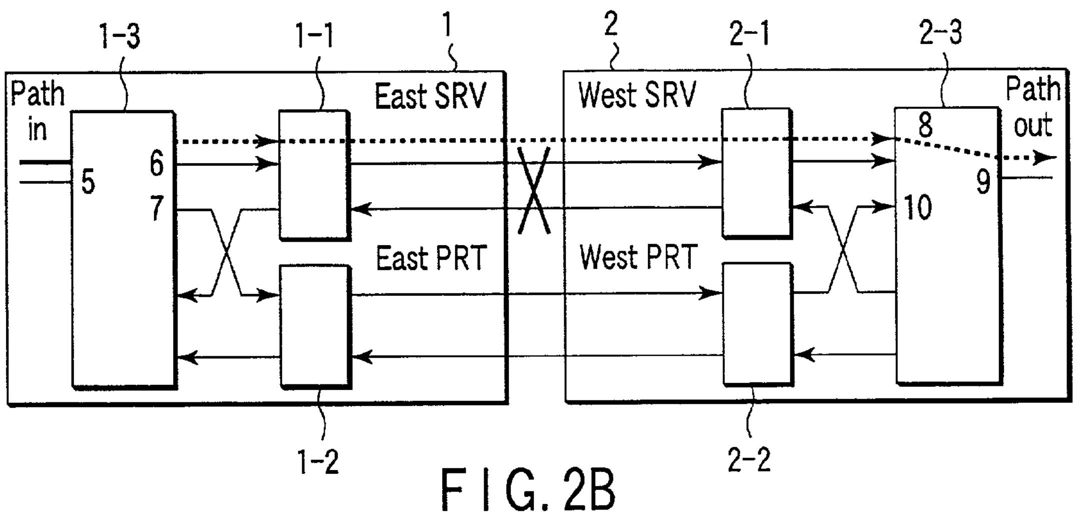

It is assumed that, in this state, bidirectional failures (shown by the symbol x in the figure) have occurred in the service lines as shown in FIG. 2B. Should this happen, the input port 5 is disconnected from the output port 6 in the optical switch circuit 1-3 of the optical transmission apparatus 1. As a result of this, the path of the SRV system, including the inside of the optical transmission apparatus 1, is completely interrupted.

Figure 2C:
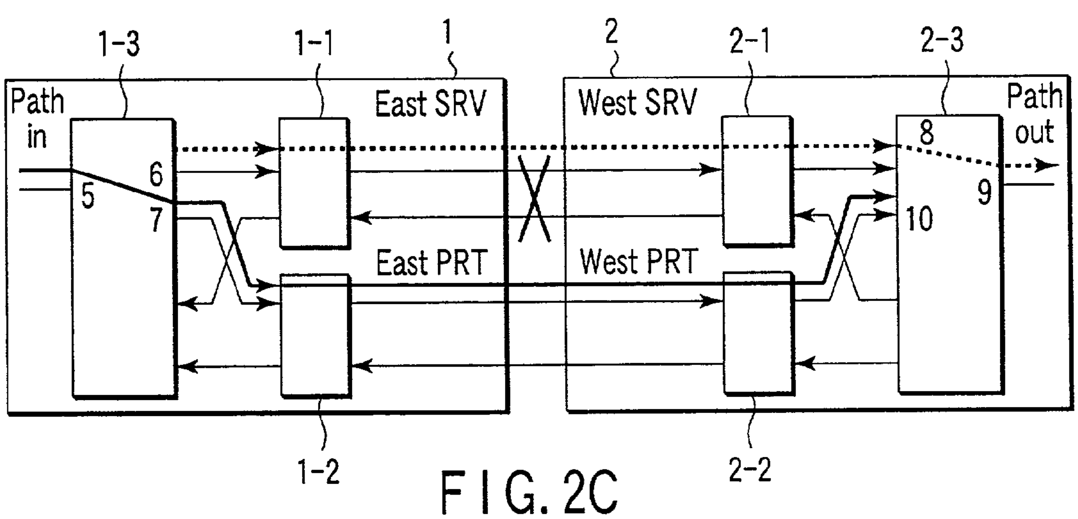

Next, as shown in FIG. 2C, the output port 7 is connected to the input port 5 in the optical switch circuit 1-3 of the optical transmission apparatus 1. This enables the path to pass through the PRT system and reach an input port 10 of the optical switch circuit 2-3 of the optical transmission apparatus 2. Therefore, the optical transmission apparatus 2 can check the state of the path.

After this state, the optical transmission apparatus 2 disconnects the input port 8 from the output port 9 and connects the input port 10 to the output port 9 in the optical switch circuit 2-3 as shown in FIG. 3A. In this way, a path via the protection line is set between the input port 5 of the optical switch circuit 1-3 of the optical transmission apparatus 1 and the output port 9 of the optical switch circuit 2-3 of the optical transmission apparatus 2, thereby saving the traffic flowing through the path.

Even after the traffic has been recovered from a failure in the state of FIG. 3A, the path of the SRV system is completely interrupted at the stage of FIG. 2B. Because of this, the optical transmission apparatus 2 cannot recognize the state of the path of the SRV system, even when the traffic has recovered from a failure. To overcome this drawback, it is necessary to provide the following procedure to give a lead to effect revertive switching as a result of the recovery from a failure.

(Step 1)

In the state of FIG. 3B, the optical transmission apparatus 1 disconnects the output port 7 from the input port 5 in the optical switch circuit 1-3.

(Step 2)

Then, the optical transmission apparatus 1 connects the output port 6 to the input port 5 in the optical switch circuit 1-3. As a result, if the failure has been eliminated, the path extends to the input port 8 of the optical switch circuit 2-3 of the optical transmission apparatus 2. This enables the optical transmission apparatus 2 to recognize that the service line has been conducting, or check the state of the path of the service line. Conversely, if the failure has not been eliminated, the path does not extend to the input port 8 of the optical switch circuit 2-3 of the optical transmission apparatus 2. Therefore, the optical transmission apparatus 2 can know that the service line has not been conducting.

(Step 3)

If having recognized at step 2 that the service line has been conducting, the optical transmission apparatus 2 disconnects the input port 10 from the output port 9 in the optical switch circuit 2-3 and connects the input port 8 to the output port 9. In this way, revertive switching is started.

As described above, at step 1 to step 3, it is necessary to do the work of returning the traffic flowing through the PRT system to the SRV system temporarily and determining whether or not the SRV system has been recovered from a failure by checking the continuity of the traffic.

Since the work requires the traffic saved by being caused to flow through the PRT system to be switched to the SRV system, this results in the interruption of the path. A similar process must be carried out in not only effecting revertive switching but also starting the process of switching to the PRT system. In this case, too, the path is interrupted.

To summarize what has been described above, the OADM apparatus that switches signals according to the state of optical signals have the following disadvantages:

(a) In switching, it is necessary to carry out the process of checking the state of a system to which the traffic is be detoured. This results in unnecessary switching or revertive switching.

(b) Effecting revertive switching always requires the process of connecting the signal path to the SRV system on the transmission side and then connecting the path to the SRV system on the reception side. This lengthens the time required for revertive switching, which thus lengthens the time during which the path is interrupted.

(c) Effecting switching always requires the process of connecting the signal path to the PRT system on the transmission side and then connecting the path to the PRT system on the reception side. This lengthens the time required for switching, which thus lengthens the time during which the path is interrupted.

There is still the following disadvantage (d) related to (a).

(d) For example, if the operator who has confirmed the recovery from the failure notified the recovery to the optical transmission apparatus related to the switching by means of an exclusive line or the like, this would eliminate the need to carry out the unnecessary switching process. However, providing such a new process would place restrictions on the design of the switching algorithm. This would lengthen the switch completion time or the time during which the path is interrupted.

Moreover, the above difficulties might cause various secondary disadvantages, such as a decrease in the transmission quality. In this respect, a solution to those disadvantages must be found.

That is, the OADM apparatus that switches between the paths of optical signals using the optical signals as they are has various disadvantages in effecting switching. Thus, there have been demands toward overcoming the disadvantages and making it easy to effect switching.

These disadvantages are not peculiar to the OADM apparatuses described in the above references (i) and (ii). An OADM apparatus with a general configuration has also these types of disadvantages. Neither reference (i) nor reference (ii) has described measures against such disadvantages.

Figure 4:
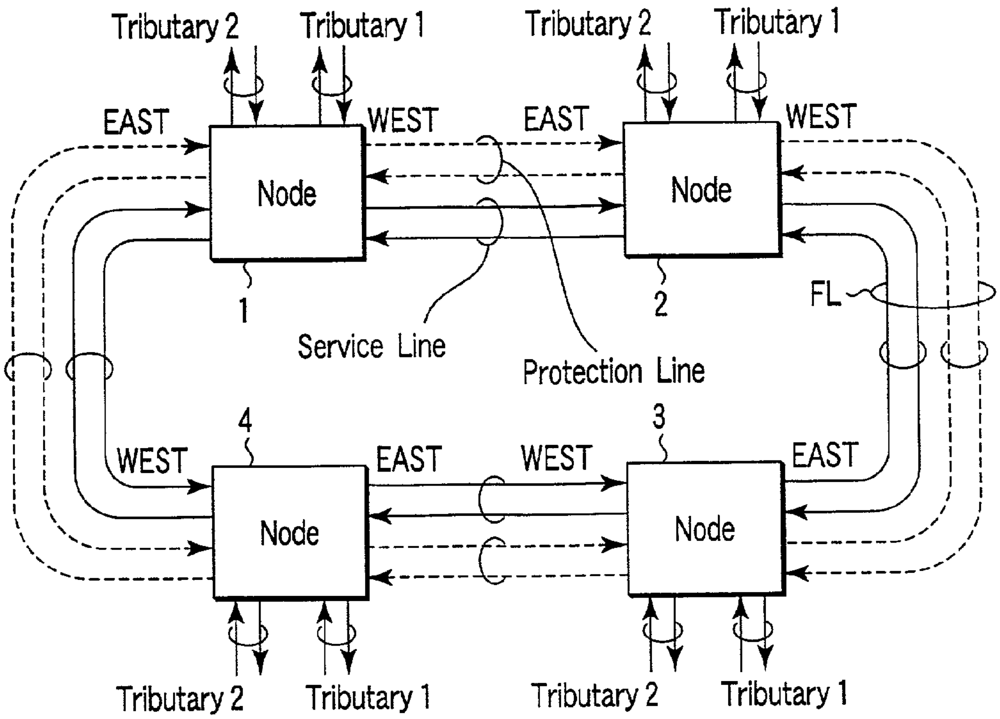
FIG. 4 shows an example of a transmission system to which the present invention is applied.

FIG. 4 shows an example of an information transmission system to which the present invention is applied. The system of FIG. 4 includes a plurality of optical transmission apparatuses (hereinafter, referred to as nodes) 1 to 4 and an optical fiber transmission line FL that connects the individual nodes in a ring. The optical fiber transmission line FL includes service lines SL and protection lines PL. Each of the lines SL, PL includes a pair of optical fibers that transmit traffic bidirectionally. The system form shown in FIG. 4 is called the so-called four-fiber ring.

In FIG. 4, the nodes 1 to 4 extract optical signals of any of the wavelengths included in the wavelength-division multiplex light transmitted via the optical fiber transmission line FL in the form of tributary signals (Tributary 1, Tributary 2). In addition, the nodes 1 to 4 multiplex the tributary signals with the wavelength-division multiplex light and send the resulting signals to the optical fiber transmission line FL.

Tributary signals mean signals inputted from the outside of the ring network to the individual nodes and signals outputted from the individual nodes to the outside of the ring network. The tributary signal multiplexed at a node is transmitted to another node via the ring network and finally demultiplexed at the destination node. In FIG. 4, the input/output routes for the tributary signals for two channels are shown at each node. In the present invention, however, the number of channels for the tributary signals inputted to or outputted from each node is not limited to two.

In FIG. 4, each node is connected at two points to the optical fiber transmission line FL. In the explanation below, one of the points connected to the optical fiber transmission line FL at each node is represented as WEST and the other is represented as EAST. The service line SL on the WEST side is represented as West Service (West SRV), the protection line PL as West Protection (West PRT), the service line SL on the EAST side as East Service (East SRV), and the protection line PL as East Protection (East PRT). An information transmission route set between the tributary at a node and the tributary at another node is called a path. Information transmitted via a path is called traffic. In the present specification, the word “working” and the word “service” are used for the same meaning.

Figure 5:
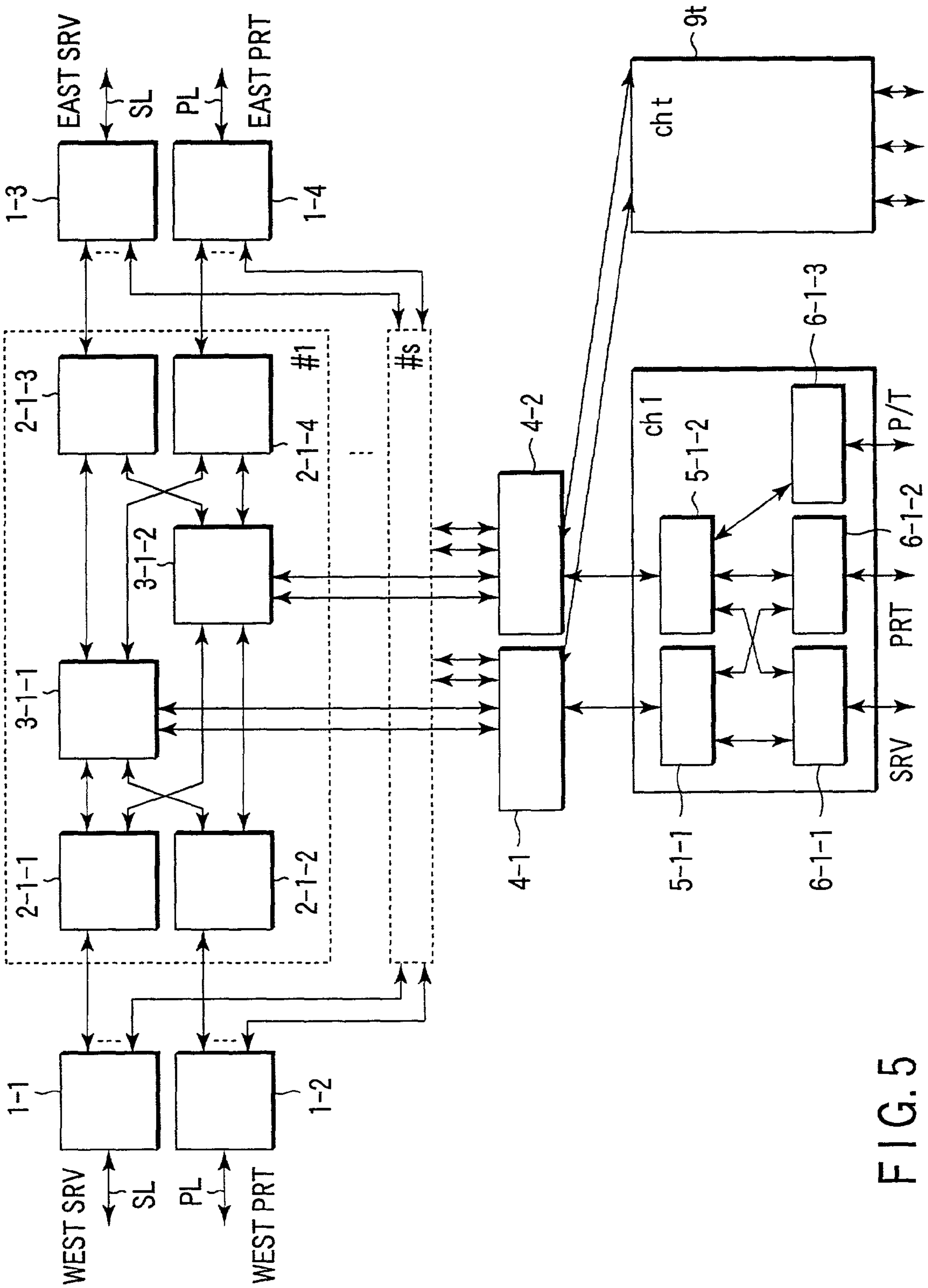
FIG. 5 is a block diagram showing the configuration of a node in FIG. 4 according to an embodiment of the present invention.

FIG. 5 is a block diagram showing the configuration of the nodes 1 to 4 in FIG. 4. The node of FIG. 5 includes wavelength-division multiplexing and demultiplexing sections 1-1 to 1-4 connected to optical transmission line FL, line switch sections #1 to #S, tributary interface sections 6-1-1 to 6-1-3, optical cross-connect sections 4-1 to 4-2, and tributary switch sections (SRV) 5-1-1 and 5-1-2. The line switch sections #1 to #S are provided so as to correspond to each wavelength.

The wavelength-division multiplexing and demultiplexing section 1-1 is connected to a service line SL (West SRV). The wavelength-division multiplexing and demultiplexing section 1-2 is connected to a protection line PL (West PRT). The wavelength-division multiplexing and demultiplexing section 1-3 is connected to a service line SL (East SRV). The wavelength-division multiplexing and demultiplexing section 1-4 is connected to a protection line PL (East PRT). Each of the wavelength-division multiplexing and demultiplexing sections 1-1 to 1-4 not only demultiplexes the wavelength-division multiplex light inputted from the corresponding transmission line into the individual wavelengths but also multiplexes the light of each wavelength supplied from inside the node and sends the resulting light to the transmission line.

The line switch sections #1 to #s include line interfaces 2-1-1 to 2-1-4, optical switch section(SRV) 3-1-1, and optical switch section(PRT) 3-1-2. The optical switch sections 3-1-1 and 3-1-2 have the functions of performing an Add process, a Drop process, and a Through process on the light of each wavelength and “bridge” the light of each wavelength. The bridge function of the optical switch sections 3-1-1 and 3-1-2 will be explained later in detail.

The tributary interface sections 6-1-1 to 6-1-3 serve as interfaces for the tributary signals. The optical cross-connect sections 4-1 and 4-2 are used to connect a tributary interface channel to the light of each wavelength arbitrarily. The tributary switch sections (SRV) 5-1-1 and 5-1-2 carry out the function related to the protection switching of the optical signal inputted and outputted via the tributary interface sections 6-1-1 to 6-1-3.

In FIG. 5, the function block including the tributary switch sections (SRV) 5-1-1 and 5-1-2 and the tributary interface sections 6-1-1 to 6-1-3 is provided for each channel on the tributary side (the low-speed side). In FIG. 5, the low-speed-side channels are distinguished by the reference symbols ch 1 to ch t.

The tributary interface section 6-1-3 particularly has an interface function related to the input and output of part-time traffic (hereinafter, referred to as P/T). Normally, part-time traffic is treated as traffic whose priority is lower than that of service traffic (synonymous with normal traffic). Part-time traffic is traffic held in an empty path in the protection line PL and corresponds to Extra Traffic in the ITU-T recommendation.

Although not shown in FIG. 5, each of the nodes 1 to 4 includes a control section, such as a CPU (Central Processing Unit), that shoulders the main part of its control.

Figure 6:
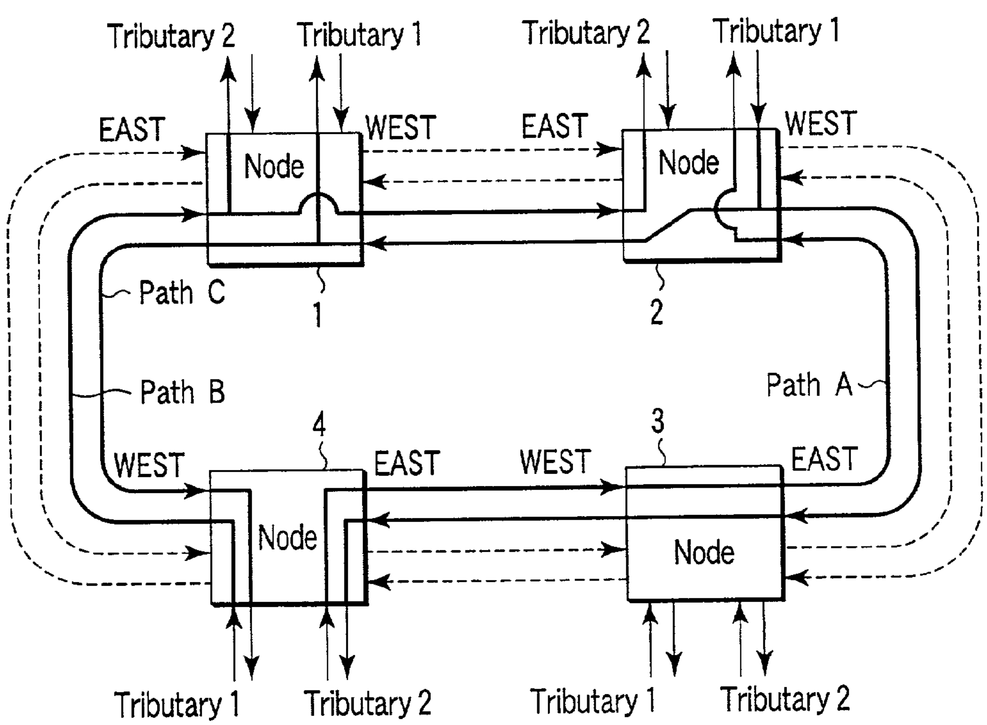
FIG. 6 shows an example of setting paths in the transmission system of FIG. 4.

FIG. 6 shows an example of setting paths in the transmission system of FIG. 4. In FIG. 6, a Point-to-Point connection path and a Point-to-Multi-point connection path are shown. The Point-to-Point connection path is a path for connecting senders of signals and receivers of signals in a one-to-one correspondence. The Point-to-Multi-point connection path is a path where there are a plurality of receivers for a sender of a signal.

In FIG. 6, path A is set between Tributary 2 of node 4 and Tributary 1 of node 2. The signal inputted to the Tributary 2 of node 4 is added to East SRV and the resulting signal is sent to node 3. Node 3 connects the signal inputted to West SRV to East SRV without performing the Add/Drop process of the signal. The connection is the so-called Through connection. Then, the signal is dropped at node 2 and the resulting signal is outputted from Tributary 1. As described above, path A is the Point-to-Point connection path where the senders of the signal correspond to the receivers in a one-to-one correspondence. Path B and path C are both point-to-Multi-point connection paths, which will be explained later in detail.

A node capable of Point-to-Point connection path setting differs from a node capable of Point-to-Multi-point connection path setting in the functions they are required to have. In the explanation below, a line switch section (hereinafter, referred to as a Point-to-Point connection line switch) where the connection relationship of FIG. 4 can be set in a first to a ninth embodiment of the present invention will be described. Then, a line switch section (hereinafter, referred to as a Point-to-Multi-point connection line switch) where not only the connection relationship of FIG. 4 but also the connection relationship of FIG. 18 (explained later) can be set will be described in a tenth to a twenty-second embodiment of the present invention. Thereafter, optical transmission apparatuses provided with the line switch sections explained in the first to twenty-second embodiments will be described in a twenty-third to a thirtieth embodiment of the present invention.

<Embodiments to Help Explain a Line Switch for Point-to-Point Connection>

Next, the connection relationship between input and output signals at each node will be explained for each of the normal state, span failure state, and ring failure state. FIG. 4 shows the connection relationship between input and output signals at a node for each state when there are Point-to-Point connection paths on the network.

As shown in section (a) of FIG. 4, Tributary 1 is connected to West SRV and Tributary 2 is connected to East SRV in normal state at the input and output nodes (Add/Drop Nodes) of the Point-to-Point connection path. A Point-to-Point connection path is set with a Tributary of another node where a similar connection setting has been done.

As shown in section (b) of FIG. 4, when a span failure has occurred in the West SRV line in the normal state, span switching is effected. That is, the path is switched from the West SRV line to the West PRT line. Even after the span switching has been completed, the signal Tributary 1 adds is still connected to the West SRV and further connected to the West PRT. A state where the same signal is connected to SRV and PRT is called "Bridge." In addition, the place to which the signal dropped to Tributary 1 is inputted is switched from the West SRV to the West PRT.

As shown in section (c) of FIG. 4, when a ring failure has occurred in the normal state in the West SRV line and West PRT line, ring switching is done. The signal Tributary 1 adds is bridged and connected to the West SRV and East PRT. In addition, the signal dropped to Tributary 1 is switched from the West SRV to the East PRT.

As shown in section (d) of FIG. 4, the West SRV and East SRV are connected to each other by a Through connection at the pass-through nodes of the Point-to-Point connection path.

As shown in section (e) of FIG. 4, when a span failure has occurred in the normal state in the West SRV line, span switching is done. The signal inputted from the East SRV is bridged and connected to the West SRV and West PRT. In addition, the input route of the signal sent to the East SRV is switched from the West SRV to the West PRT.

(First Embodiment)

FIG. 8 is a block diagram showing the configuration of a optical switch section according to a first embodiment of the present invention. In FIG. 8, numerals 101*a* to 101*f* indicate input ports, 102*a* to 102*f* indicate 1×2 optical splitters for splitting an input signal in half and outputting them, 103 indicates an optical matrix switch, and 104*a* to 104*f* indicate output ports. Generally, a matrix switch is a device which is composed of optical switch elements connected in a matrix and performs the switching of optical signals.

The optical matrix switch 103 of FIG. 8 is of the 12×6 type and includes 12 optical input terminals and 6 optical output terminals. The optical matrix switch 103 changes the route of the optical light inputted from a given optical input terminal according to an externally applied control signal and outputs the optical light at a given optical output terminal. The control signal to the optical matrix switch 103 is generated by the CPU of a node and supplied via a control bus or the like.

With the configuration of FIG. 8, the route of the optical signal is switched by the optical matrix switch 103. Thus, the input signals supplied to all the input ports 101*a* to 101*f* can be connected to any of the output ports 104*a* to 104*f*. Consequently, it is possible to realize the connection settings (section (a) and section (d) in FIG. 4) in the normal state of FIG. 4.

Furthermore, in the first embodiment, after each input signal is split in half by the 1×2 optical splitters 102*a* to 102*f*, the resulting signals are inputted to the optical matrix switch 103. This makes it possible to output the optical signal inputted from one input port at two different output ports. For example, the optical signal from the input port 101*e* of Tributary 1 can be outputted to the output port 104*a* of West SRV and the output port 104*b* of West PRT.

This is nothing but the realization of the bridge function. Of course, the switch function can be realized by changing the switching state of the optical matrix switch 103. Therefore, with the configuration of FIG. 8, the connection states shown in sections (b), (c), (e), and (f) of FIG. 4 can be realized. Consequently, all the connection states in FIG. 4 can be realized.

Furthermore, the line switch section of FIG. 8 can realize not only the connection relationship shown in FIG. 4 but also loop-back connection and in-node folding connection.

Loop-back connection is a form of connection where, for example, the signal inputted from West SRV is outputted at West PRT and the signal inputted from West PRT is outputted at West PRT. In-node folding connection is a form of connection where the input signal from either Tributary 1 or 2 is outputted at Tributary 1 or 2.

The present invention is not limited to the optical matrix switch 103 with a size of 12×6 in FIG. 8. For instance, even when the invention uses an optical matrix of a larger size, it can realize similar functions. In the embodiments explained below, too, the invention is not restricted to the size shown in the figures and may be applied to an optical matrix switch of a larger size.

As described above, with the first embodiment, the optical signal inputted to each of the input ports lOla to 101*f* is split in half by the 1×2 optical splitters 102*a* to 102*f* and the resulting signals are inputted to the input terminals of the optical matrix switch 103. The route of each optical signal is switched at the optical matrix switch 103 and the resulting signal is outputted at any of the output ports 104*a* to 104*f*. This enables the optical signal from the same input port to be outputted at two different ports.

By doing this, not only "switch" but also "bridge" can be done at the time of protection switching. As a result, in protection switching, the same traffic can be caused to flow through both the service line SL and the protection line PL. This makes it possible to check very easily the normality of the system to which the service traffic is to be switched. Of course, it is also possible to eliminate a possibility that the path will be interrupted in protection switching.

Therefore, when protection switching is effected, for example, there is no need to provide a new procedure, such as a procedure by which a person who has verified the recovery from the failure informs the optical transmission apparatus related to switching of the recovery. This alleviates the restrictions on designing algorithms for protection switching. That is, on the basis of an algorithm similar to that for protection switching in a conventional transmission apparatus, the algorithm for protection switching in an optical transmission apparatus can be designed. From these things, protection switching can be done by a simple procedure in the optical transmission apparatus, too.

(Second Embodiment)

FIG. 9 is a block diagram showing the configuration of a optical switch section according to a second embodiment of the present invention. The configuration of FIG. 9 is an expansion of the configuration of FIG. 8. In the second embodiment, a line switch corresponding to a plurality of channels (#1 to #m) will be explained. In the figure, m means the number of multiplexed wavelengths, that is, the number of channels.

In the line switch of FIG. 9, each of the channels #1 to #m is provided with the West SRV, West PRT, East SRV, East PRT, Tributary 1, and Tributary 2. Each channel is provided with input ports 101*a* to 101*f*, 1×2 optical splitters 102*a* to 102*f* for splitting in half the optical signal from the respective input ports 101*a* to 101*f* and output ports 104*a* to 104*f*.

Six 1×2 optical splitters 102*a* to 102*f* are provided for channel. Thus 6m outputs of 6m 1×2 optical splitters are inputted to the optical matrix switch 1030. The output of the optical matrix switch 1030 is supplied from any of the output ports 104*a* to 104*f* of each of the channels #1 to #m. The optical matrix switch 1030 is of the 12m×16m type and has 12m input terminals and 6m output terminals.

With this configuration, the same connection relationship of paths as in the first embodiment can be realized for each channel. That is, since "bridge" can be done for each channel, the effect similar to that of the first embodiment related to protection switching can be produced.

The connection setting of the signals for a plurality of channels is effected in the single optical matrix switch 1030. This enables the signals to be switched between different channels (that is, different wavelengths). Therefore, in the case of Through connection shown in FIG. 4, for example, the signal inputted to the West SRV of channel #1 can be outputted to the East SRV of channel #m.

As described above, in the second embodiment, it is possible to realize the connection setting that enables the signals to be inputted or outputted between different channels. In the WDM transmission system, such connection setting is equivalent to wavelength conversion.

Furthermore, in the case of Add connection shown in FIG. 4, for example, the signal inputted to Tributary 1 of channel #1 can be outputted to the West SRV of channel #m. That is, a given tributary signal of channels #1 to #m can be outputted to the output ports 104*a* to 104*f* of a given channel. Therefore, with the second embodiment, the wavelength of the signal inputted to Tributary can be selected.

(Third Embodiment)

Figure 10:
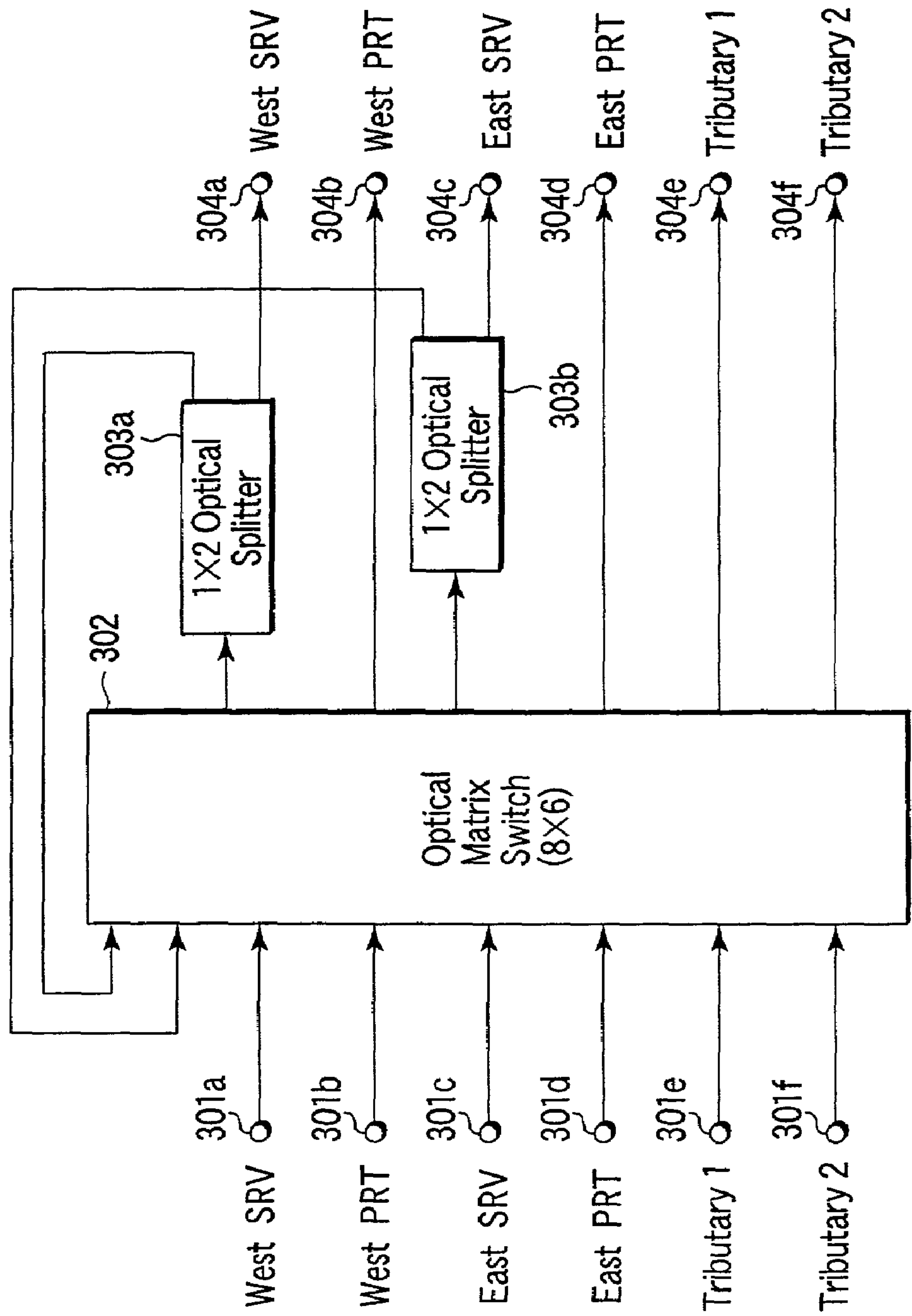
FIG. 10 is a block diagram showing the configuration of a optical switch section according to a third embodiment of the present invention.

FIG. 10 is a block diagram showing the configuration of a optical switch section according to a third embodiment of the present invention. In FIG. 10, reference numerals 301*a* to 301*f* indicate input ports, 302 indicates an 8×6 optical matrix switch, 302*a* and 303*b* indicate 1×2 optical splitters, and 304*a* to 304*f* indicate output ports.

The 1×2 optical splitter 303*a* is connected to one output terminal of the optical matrix switch 302 and splits in half the output signal from the output terminal. One split output signal is connected to a West SRV output port 304*a* and the other split output signal is connected again to an input terminal of the optical matrix switch 302.

The 1×2 optical splitter 303*b* is connected to one output terminal of the optical matrix switch 302 and splits in half the output signal from the output terminal. One split output signal is connected to an East SRV output port 304*c* and the other split output signal is connected again to an input terminal of the optical matrix switch 302.

With the configuration of FIG. 10, since the optical matrix switch 302 is used as means for switching the connection of optical signals, the input signals supplied to all the input ports 301*a* to 301*f* can be connected to any of the output ports 304*a* to 304*f*. Consequently, it is possible to realize the connection setting in the normal state (section (a) and section (d)) shown in FIG. 4.

In the third embodiment, the optical signals outputted from the optical matrix switch 302 to the West SRV and East SRV are split in half by the 1×2 optical splitters 303*a*, 303*b*. Then, one of the split outputs from each of the splitters 303*a*, 303*b* is inputted again to the optical matrix switch 302. This enables the same traffic as that outputted to the SRV output port to be outputted to the PRT output port as well. That is, the optical signal inputted from the same input port can be outputted at the SRV and PRT output ports. For example, the optical signal from the input port 301*e* of Tributary 1 can be outputted to both the output port 304*a* of the West SRV and the output port 304*b* of the West PRT.

This makes it possible to realize the bridge function as in the first embodiment. Of course, the switch function can be realized by changing the setting of the switching state of the optical matrix switch 302. As described above, with the configuration of FIG. 10, it is possible to realize the connection states shown in sections (b), (c), (e), and (f) of FIG. 4. Therefore, all the connection states shown in FIG. 4 can be realized.

Furthermore, the line switch section of FIG. 10 enables not only the connection states of FIG. 4 but also loop-back connection and in-node folding connection to be realized.

(Fourth Embodiment)

Figure 11:
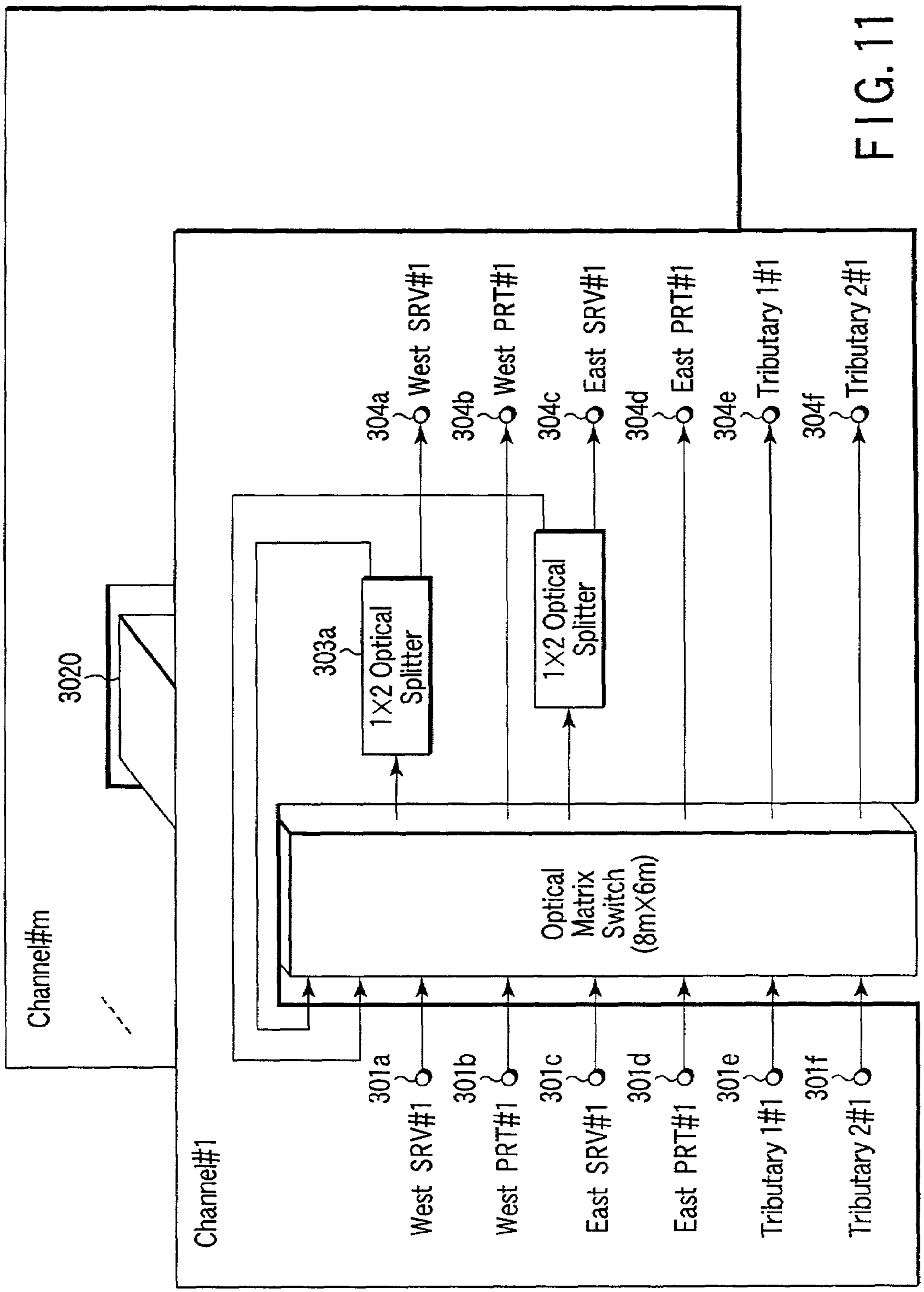
FIG. 11 is a block diagram showing the configuration of a optical switch section according to a fourth embodiment of the present invention.

FIG. 11 is a block diagram showing the configuration of a optical switch section according to a fourth embodiment of the present invention. The configuration of FIG. 11 is an expansion of the configuration of FIG. 10. In the fourth embodiment, a line switch corresponding to a plurality of channels (#1 to #m) will be explained.

In the line switch of FIG. 11, each of the channels #1 to #m is provided with the West SRV, West PRT, East SRV, East PRT, Tributary 1, and Tributary 2. Each channel is provided with input ports 301*a* to 301*f*, 1×2 optical splitters 303*a* and 303*b* for splitting in half the optical signal from each of the input ports 301*a* to 301*f*, and output ports 304*a* to 304*f*. An optical matrix switch 3020 is of the 8m×6m type with 8m inputs and 6m outputs.

With the above configuration, the same connection relationship as in the first embodiment can be realized for each channel. That is, since "bridge" can be done, the same effect as that of the first embodiment related to protection switching can be produced. Furthermore, since the connection setting of the signals for a plurality of channels is processed at the single optical matrix switch 3020, this enables the switching of signals between different channels. As a result, wavelength conversion and wavelength selection can also be made.

(Fifth Embodiment)

Figure 12:
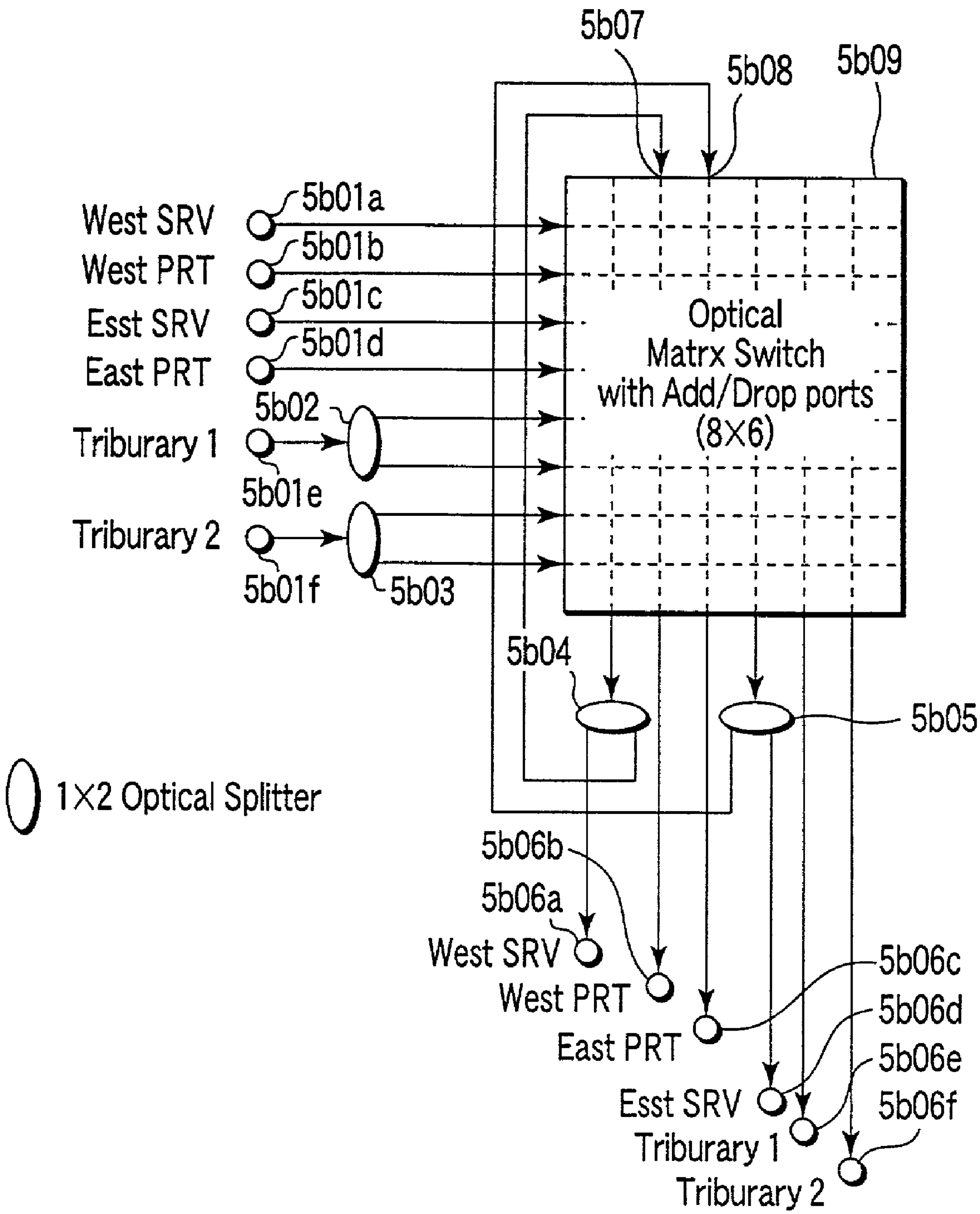
FIG. 12 is a block diagram showing the configuration of a optical switch section according to a fifth embodiment of the present invention.

FIG. 12 is a block diagram showing the configuration of a optical switch section according to a fifth embodiment of the present invention. In FIG. 12, reference numerals 5*b*01*a* to 5*b*01*f* indicate input ports, 5*b*06*a* to 5*b*06*f* indicate output ports, 5*b*02 to 5*b*05 indicate 1×2 optical splitters, and 5*b*09 indicates an optical matrix switch with Add/Drop ports.

Figure 13:
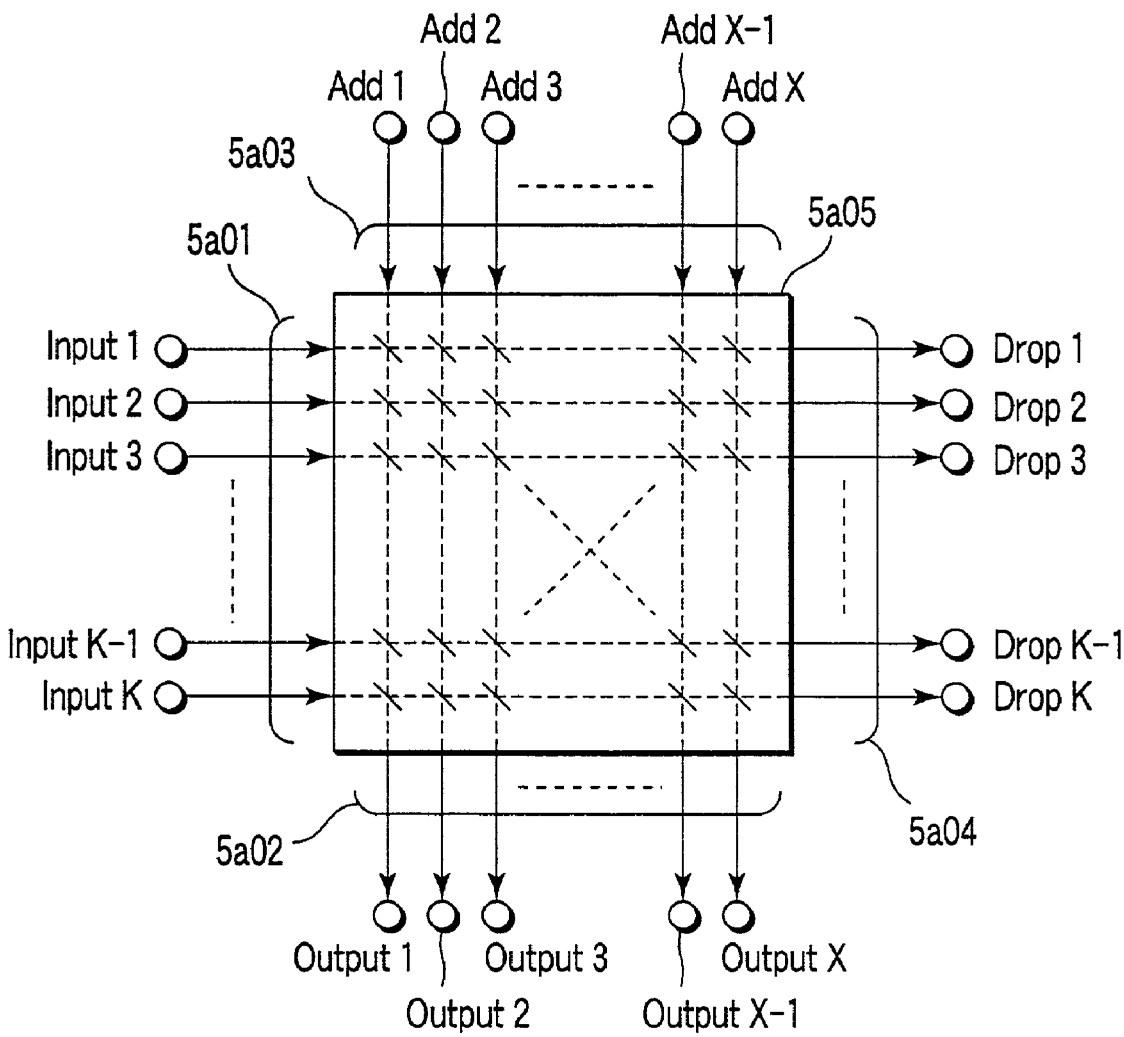
FIG. 13 is a conceptual diagram of an optical matrix switch with Add/Drop ports.

Referring to FIG. 13, an conceptual explanation of the optical matrix switch with Add/Drop ports will be given. The optical matrix switch with Add/Drop ports 5*a*05 of FIG. 13 includes a K number of input terminals 5*a*01, an X number of output terminals 5*a*02, and an X number of Add terminals 5*a*03, and a K number of Drop terminals 5*a*04.

The optical matrix switch with Add/Drop ports 5*a*05 selectively outputs any one of the input optical signals L ($1 \leqq L \leqq K$) of the input terminals 5*a*01 or any one of the Add optical signals N ($1 \leqq N \leqq X$) of the Add terminals 5*a*03 as any output ($1 \leqq N \leqq X$) of the output terminals 5*a*02.

Only when the input optical signals L ($1 \leqq L \leqq K$) inputted from the input terminals 5*a*01 are connected to none of the output terminals 5*a*02, the input optical signal L is outputted from the L-th ($1 \leqq L \leqq K$) Drop terminal 5*a*04 in a transmissive manner.

The optical matrix switch with Add/Drop ports 5*b*09 of FIG. 12 is of the 8×6 type and has eight input terminals, 6 output terminals, and two expansion input (Add) terminals. The West SRV traffic, West PRT traffic, East SRV traffic, and East PRT traffic inputted from the input ports 5*b*01*a* to 5*b*01*d* are inputted to four input terminals. The traffic inputted from Tributary 1 and that from Tributary 2 are split in half at the 1×2 optical splitters 5*b*02, 5*b*03, respectively, and the resulting signals are inputted to the remaining four input terminals.

Two of the output terminals of the optical matrix switch 5*b*09 are connected to output ports 5*b*06*d* and 5*b*06*c* and lead to the outputs of the West PRT and East PRT. Two of the other output terminals are connected to output ports 5*b*06*e* and 5*b*06*f* and lead to the outputs of Tributary 1 and Tributary 2. The remaining output terminals are connected to the 1×2 optical splitters 5*b*04, 5*b*05.

One split end of the 1×2 optical splitter 5*b*04 is connected to an output port 5606*a* and leads to the West SRV. One split end of the 1×2 optical splitter 5*b*05 is connected to an output port 5*b*06*d* and leads to the East SRV. The other split ends of the 1×2 optical splitters 5*b*04, 5*b*05 are connected to Add terminals of the optical matrix switch 5*b*09.

With the configuration of FIG. 12, since the optical matrix switch is used as means for switching the connection of the optical signals, the input signals supplied to all the input ports 5*b*01*a* to 5*b*01*f* can be connected to any of the output ports 5*b*06*a* to 5*b*06*f*. Therefore, it is possible to realize the connection setting (in section (a) and section (d)) in the normal state shown in FIG. 4.

Furthermore, the input to Tributary 1 is split in half by the optical splitter 5*b*02 and inputted to the optical matrix switch 5*b*09. The input to Tributary 2 is split in half by the optical splitter 5*b*03 and inputted to the optical matrix switch 5*b*09. As a result, the input signal to Tributary 1 can be connected to any two of the output ports 5*b*06*a* to 5*b*06*f*. The input signal to Tributary 2 can also be connected to any two of the output ports 5*b*06*a* to 5*b*06*f*.

In addition, the optical splitter 5*b*04 connected to the output side of the optical matrix switch 5*b*09 can make the output signal to the West SRV the same as the output signal to the West PRT. Similarly, the optical splitter 5*b*05 can make the output signal to the East SRV the same as the output signal to the East PRT.

These actions enable the bridge function to be realized. The switch function can also be realized by supplying a control signal or the like to change the connection setting of the optical matrix switch 5*b*09. As described above, with the configuration of FIG. 12, the connection states shown in sections (b), (c), (e), and (f) of FIG. 4 can be realized. As a result, all the connection states shown in FIG. 4 can be realized.

Furthermore, the line switch section of FIG. 12 enables not only the connection relationship of FIG. 4 but also loop-back connection and in-node folding connection to be realized.

While in FIG. 12, the optical matrix switch has a size of 8×6, the configuration of the fifth embodiment is not restricted to this size.

(Sixth Embodiment)

Figure 14:
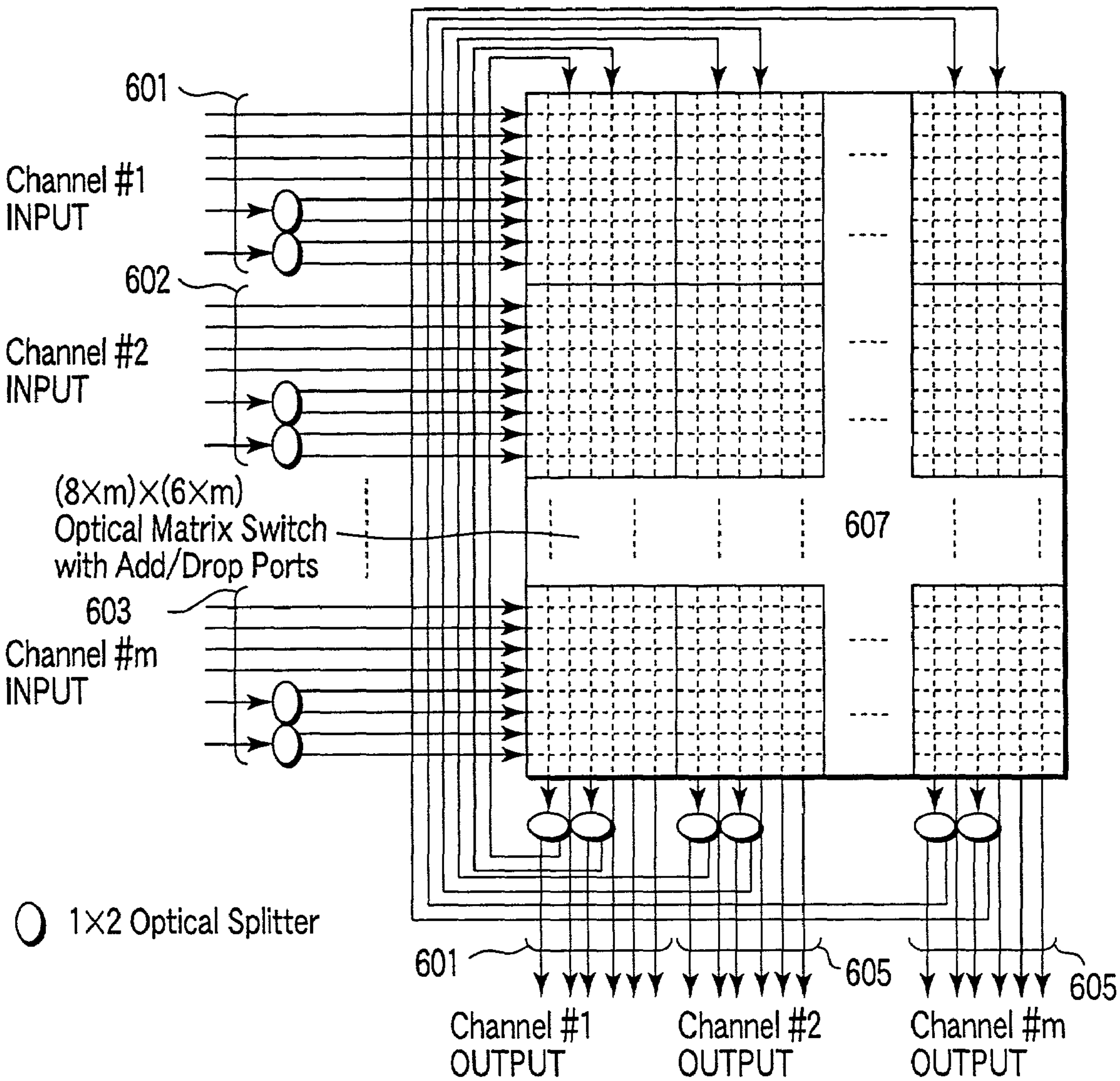
FIG. 14 is a block diagram showing the configuration of a optical switch section according to a sixth embodiment of the present invention.

FIG. 14 is a block diagram showing the configuration of a optical switch section according to a sixth embodiment of the present invention. The configuration of FIG. 14 is an expansion of the configuration of FIG. 12. In the sixth embodiment, a line switch corresponding to a plurality of channels (#1 to #m) will be explained.

In FIG. 14, each of reference numerals 601 to 60m indicates a group of input and output ports for each channel. In the line switch of FIG. 14, each of the channels #1 to #m is provided with the West SRV, West PRT, East SRV, East PRT, Tributary 1, and Tributary 2. Between the 6m input ports 601 to 60m for channels #1 to #m and the 6m output ports 601 for channels #1 to #m, 1×2 optical splitters (with no reference numerals) connected in the same manner as in the fifth embodiment and an 8m×6m optical matrix switch 607 are provided.

The optical matrix switch 607 has an 8m number of input terminals, a 6m number of output terminals, and a 2m number of Add terminals.

Specifically, 4m of the 6m input ports are connected to input terminals of the optical matrix switch 607 and the remaining 2m ones are connected to the 1×2 optical splitters. The split outputs of the 1×2 optical splitters are connected to the remaining input terminals of the optical matrix switch 607.

Furthermore, 4m output terminals of the optical matrix switch 607 are connected to the output ports. The remaining 2m output terminals are connected to the 1×2 optical splitters. One-side split ends of the optical splitters are connected to the remaining output ports of the optical matrix switch 607. The other-side split ends of the 1×2 optical splitters are connected to the Add ports of the optical matrix switch 607 in a one-to-one correspondence.

With such a configuration, the same connection relationship as in the fifth embodiment can be realized for each of channels #1 to #m. Since the connection setting of the signals for a plurality of channels is processed by the single optical matrix switch 607, the switching of signals between channels can be done.

Consequently, in the case of Through connection shown in FIG. 4, for example, the signal inputted to the West SRV of channel #1 can be outputted to the East SRV of channel #m.

As described above, with the sixth embodiment, it is possible to realize the connection setting which enables signals to be inputted or outputted between different channels. In the WDM transmission system, such connection setting is equivalent to wavelength conversion.

Furthermore, in the case of Add connection shown in FIG. 4, for example, the signal inputted to Tributary 1 of channel #1 can be outputted to the West SRV of channel #m. That is, any tributary signal of channels #1 to #m can be outputted to the output ports 104*a* to 104*f* of any channel. Therefore, with the sixth embodiment, it is possible to select the wavelength of the signal inputted to Tributary.

(Seventh Embodiment)

FIG. 15 is a block diagram showing the configuration of a optical switch section according to a seventh embodiment of the present invention. In FIG. 15, reference numerals 701*a* to 701*f* indicate input ports, 702*a* to 702*f* indicate 1×3 optical splitters for splitting an input signal into three sub-signals, 703*a* to 703*f* indicate 3×1 optical switches, and 704*a* to 704*e* indicate output ports. The 3×1 optical switches are optical elements that select one of the three input signals and output the selected one.

The optical signals from the input ports 701*a* to 701*f* are split into three sub-signals by the 1×3 optical splitters 702*a* to 702*f*, respectively. The split output from the 1×3 optical splitter 702*a* is inputted to the 3×1 optical switches 703*c*, 703*d*, 703*e*. The split output from the 1×3 optical splitter 702*b* is inputted to the 3×1 optical switches 703*c*, 703*e*, 703*f*. The split output from the 1×3 optical splitter 702*c* is inputted to the 3×1 optical switches 703*a*, 703*b*, 703*f*. The split output from the 1×3 optical splitter 702*d* is inputted to the 3×1 optical switches 703*a*, 703*e*, 703*f*. The split output from the 1×3 optical splitter 702*e* is inputted to the 3×1 optical switches 703*a*, 703*b*, 703*d*. The split output from the 1×3 optical splitter 702*f* is inputted to the 3×1 optical switches 703*b*, 703*c*, 703*d*.

With the configuration of FIG. 15, the input signal is split into three sub-signals. In the seventh embodiment, the maximum number of ports to which the same input signal is outputted is assumed to be 3 and the number of sub-signals into which the input signal is split is set at 3. That is, there is a possibility that the signal inputted to one input port will be outputted at two or three output ports.

Then, the split output signals from each optical splitter are connected to the optical switches connected to the output ports at which the split output signals might be outputted. For example, there is a possibility that the input signal from the West SRV will be outputted at output ports 704*c*, 704*d*, 704*e*. Thus, the split output signal from the optical splitter 702 is connected to the optical switches 703*c*, 703*d*, 703*e*. Then, each optical switch selectively outputs one of the inputted signals at the output port.

According to the connection relationship of FIG. 4, the input signal is outputted to a maximum of three ports. Therefore, in the seventh embodiment, the trisecting splitters and 3×1 optical switches are used. With such a configuration, it is possible to set all the connection states shown in FIG. 4.

(Eighth Embodiment)

FIG. 16 is a block diagram showing the configuration of a optical switch section according to an eighth embodiment of the present invention. The configuration of FIG. 16 is an expansion of the configuration of FIG. 15. In the eighth embodiment, a line switch corresponding to a plurality of channels (#1 to #m) will be explained.

In the line switch of FIG. 16, each of the channels #1 to #m is provided with the West SRV, West PRT, East SRV, East PRT, Tributary 1, and Tributary 2. Between the m input ports and m output ports for channels #1 to #m, 1×3 optical splitters connected in the same manner as in the seventh embodiment and six 3m×m optical switches are provided.

Specifically, the 1×3 optical splitters 702*a* to 702*f* shown in FIG. 12 are provided for each of channels #1 to #m. The split outputs of each splitters are connected to the 3m×m optical switches in the same manner as in FIG. 15.

With such a configuration, it is possible to set all the connection states shown in FIG. 4 as in the seventh embodiment. In addition, since the switching of signals between different channels can be done, wavelength conversion and wavelength selection can also be made.

(Ninth Embodiment)

Figure 17:
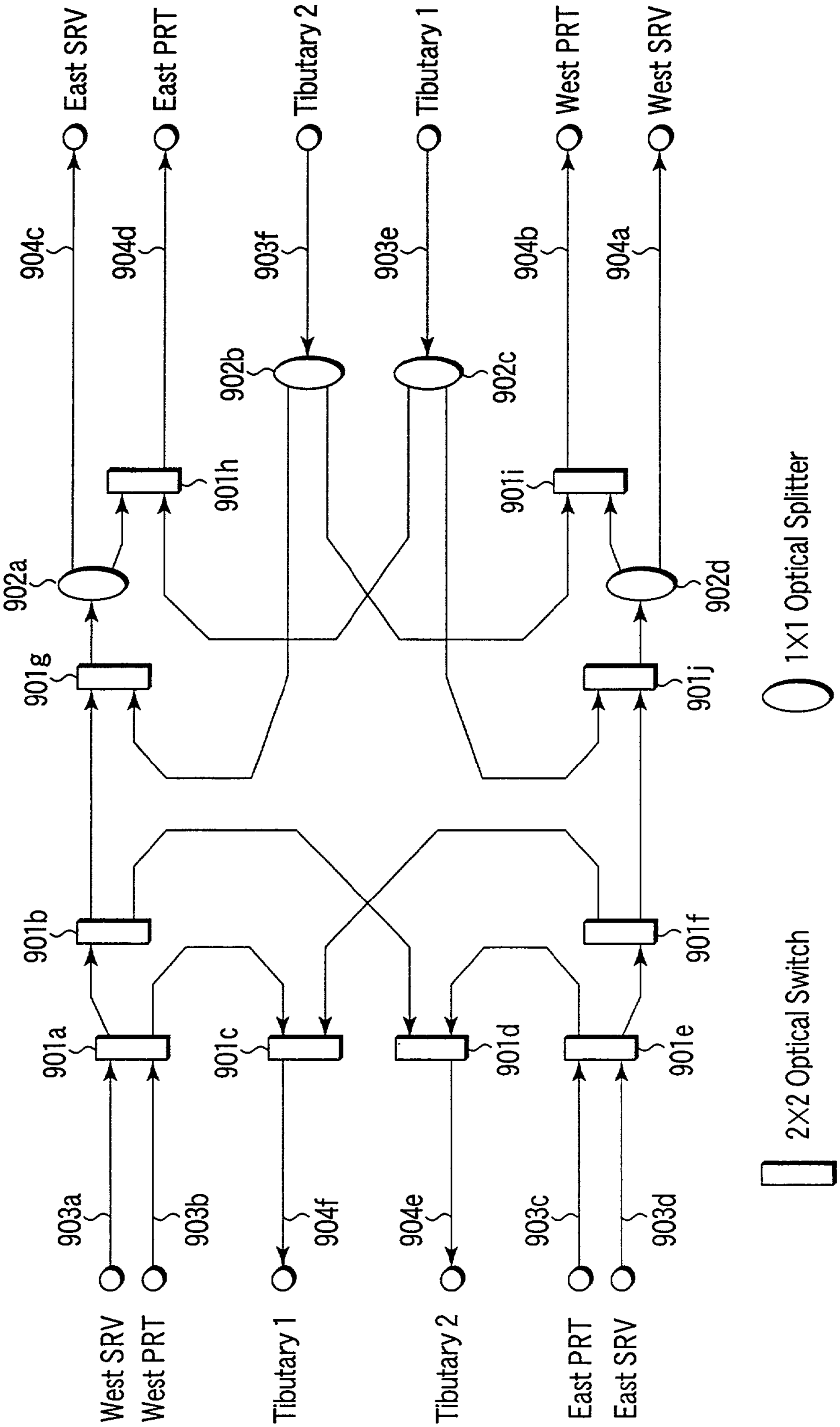
FIG. 17 is a block diagram showing the configuration of a optical switch section according to a ninth embodiment of the present invention.

FIG. 17 is a diagram to help explain a optical switch section according to a ninth embodiment of the present invention. In FIG. 17, reference numerals 901*a* to 901*j* indicate 2×2 optical switches and 902*a* to 902*d* indicate 1×2 optical splitters. The signal inputted to the West SRV either passes through the optical switches 901*a*, 901*b*, 901*d* and is outputted to Tributary 1 or passes through the optical switches 901*a*, 901*b*, 901*g* and optical splitter 902*a* and is outputted at the East SRV.

The signal inputted to Tributary 1 can pass through optical splitter 902*c*, optical switch 901*j*, and optical splitter 902*d* and be outputted at the West SRV.

The signal inputted to the East SRV either passes through the optical switches 901*e*, 901*f*, 901*c* and is outputted to Tributary 2 or passes through the optical switches 901*e*, 901*f*, 901*j* and optical splitter 902*d* and is outputted at the West SRV.

The signal inputted to Tributary 2 can pass through optical splitter 902*b*, optical switch 901*g*, and optical splitter 902*a* and be outputted at the East SRV.

The optical switch 901*a* switches either the optical signal from input port 903*a* or the optical signal from input port 903*b* between its two output terminals. The optical switch 901*b* selectively outputs the optical signal from one output terminal of the optical switch 901*a* at any one of its two output terminals. The optical switch 901*e* switches either the optical signal from input port 903*c* or the optical signal from input port 903*d* between its two output terminals.

The optical switch 901*f* selectively outputs the optical signal from one output terminal of the optical switch 901*e* at any one of its two output terminals. The optical switch 901*c* selectively outputs either the optical signal from the other output terminal of the optical switch 901*a* or the optical signal from one output terminal of the optical switch 901*f* at output port 904*f*. The optical switch 901*d* selectively outputs either the optical signal from the other output terminal of the optical switch 901*e* or the optical signal from one output terminal of the optical switch 901*b* at output port 904*e*.

The optical splitter 902*b* splits the optical signal from the input port 903*f* and outputs them at its two output terminals. The optical splitter 902*c* splits the optical signal from the input port 903*e* and outputs them at its two output terminals.

The optical switch 901*g* selectively outputs either the optical signal from the other output terminal of the optical switch 901*b* or the optical signal from one output terminal of the optical splitter 902*b*. The optical switch 901*j* selectively outputs either the optical signal from the other output terminal of the optical switch 901*f* or the optical signal from one output terminal of the optical splitter 902*c*.

The optical splitter 902*a* splits the optical signal outputted from the optical switch 901*g* and outputs one split optical signal from its one output terminal to the output port 904*c* and the other split optical signal at its other output terminal. The optical switch 901*h* selectively outputs either the optical signal from the other output terminal of the optical splitter 902*a* or the optical signal from the other output terminal of the optical splitter 902*c* at the output port 904*d*.

The optical splitter 902*d* splits the optical signal outputted from the optical switch 901*j* and outputs one split optical signal from its one output terminal to the output port 904*a* and the other split optical signal at its other output terminal. The optical switch 901*i* selectively outputs either the optical signal from the other output terminal of the optical splitter 902*d* or the optical signal from the other output terminal of the optical splitter 902*b* at the output port 904*b*.

With such a configuration, it is possible to realize the setting of Add/Drop connection and Through connection (section (a) and section (d)) in the normal state shown in FIG. 4.

Furthermore, the signal outputted from the East SRV is split in half by the optical splitter 902*a*, which enables the signal to be outputted at the East PRT as well. Similarly, the signal outputted from the West SRV is split in half by the optical splitter 902*d*, which enables the signal to be outputted at the West PRT as well.

In addition, the signal inputted to Tributary 1 is split in half by the optical splitter 902*c*. This enables the same signal as the signal outputted to the West SRV to be outputted at the East PRT. Similarly, the signal inputted to Tributary 2 is split in half by the optical splitter 902*b*. This enables the input signal to Tributary 2 to be outputted at both the East SRV and West PRT. From these things, it is possible to realize the bridge function.

Moreover, either the input signal to the West SRV or the input signal to the West PRT can pass through the optical switches 901*a*, 901*b*, 901*d* and be outputted at Tributary 1. In addition, either the input signal to the East SRV or the input signal to the East PRT can pass through the switches 901*e*, 901*d* and be outputted at Tributary 1.

Similarly, either the input signal to the West SRV or the input signal to the West PRT can pass through the optical switches 901*a*, 901*c* and be outputted at Tributary 2. In addition, either the input signal to the East SRV or the input signal to the East PRT can pass through the switches 901*e*, 901*f*, 901*c* and be outputted at Tributary 2. From these things, it is possible to realize the switch function.

From these features, it is possible to realize the connection states shown in sections (b), (c), (e), and (f) of FIG. 4. Therefore, all the connection states shown in FIG. 4 can be realized.

<Embodiments to Help Explain a Line Switch for Point-to-Multi-point Connection>

Next, a optical switch section for Point-to-Multi-point connection will be explained. First, a Point-to-Multi-point connection path will be described.

In FIG. 6, pass B is added at Tributary 1 of node 4 and dropped at Tributary 2 of node 1 and Tributary 2 of node 2. Specifically, at Tributary 1 of node 4, path B is added to the West SRV. At node 1, path B is not only dropped to Tributary 2 but also outputted to the West SRV. Furthermore, node 2 receives path B from the East SRV and drops it at Tributary 2. As described above, there are a plurality of places to which path B is dropped for only one place to which path B is added. Such a path is called a Point-to-Multi-point connection path.

Like path B, path C in FIG. 6 is an example of a Point-to-Multi-point connection path. Path C, however, differs from path B in that path C is split at node 2 to which it is added and the resulting paths are outputted at both of the West SRV and East SRV.

Node 1 to node 4 constituting a network have to realize the path setting of various states as described above. Moreover, node 1 to node 4 are required to have the function of resetting the path using protection lines to prevent communication from being cut off even if a failure has occurred in the service line or nodes.

Figure 18:
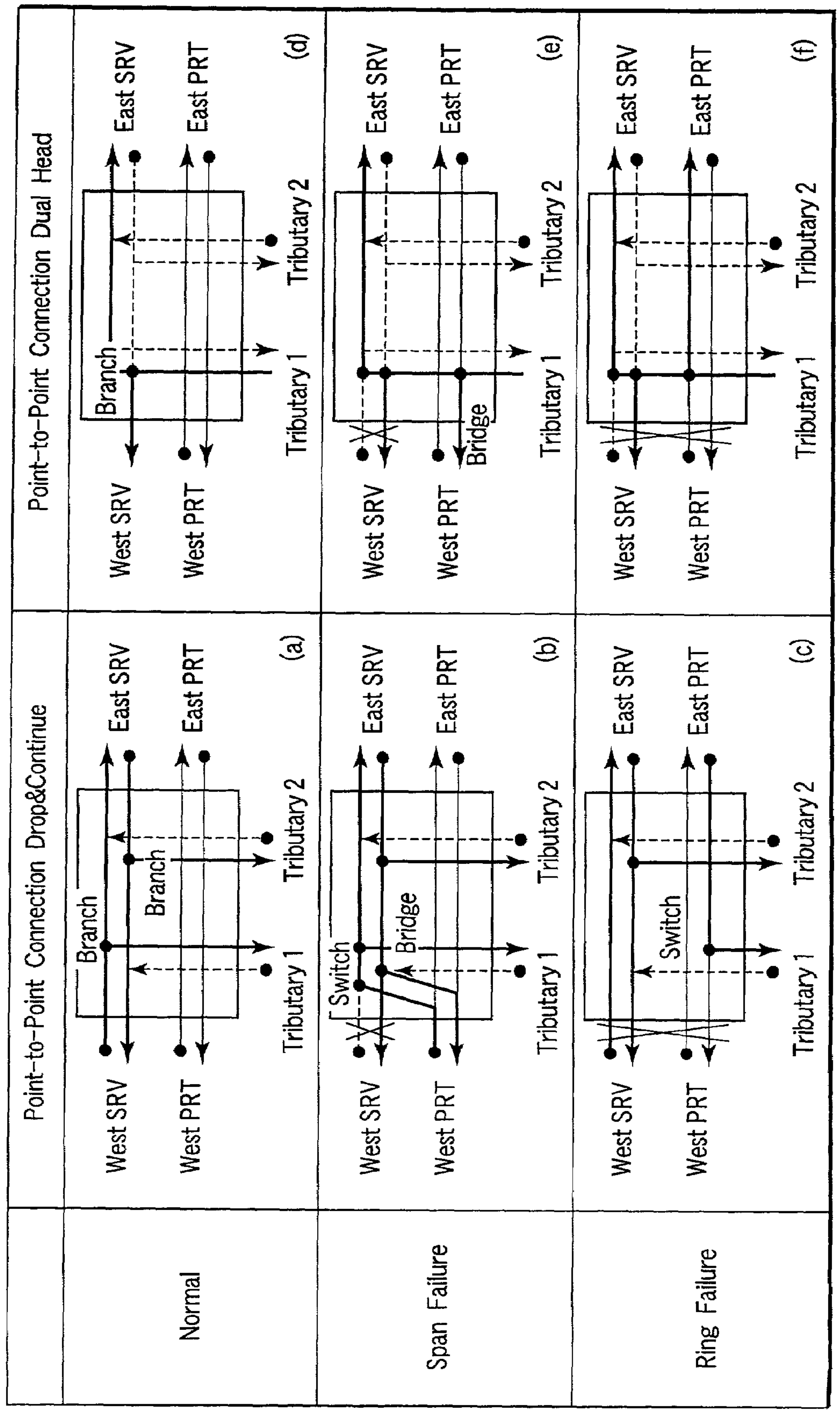
FIG. 18 shows the connection relationship between input and output signals at a node when a Point-to-Multi-point connection path is set on the network.

FIG. 18 shows the connection relationship between input and output signals at a node in each of the normal, span failure, and ring failure states, when a Point-to-Multi-point connection path exists on a network. When a Point-to-Multi-point connection path is set, the connection relationship shown in FIG. 6 may be set at each node, in addition to the connection relationship shown in FIG. 18.

As shown in section (a) of FIG. 18, the signal inputted to the West SRV is not only dropped to Tributary 1 in Drop & Continue node related to the Point-to-Multi-point connection path, but also split in the node and outputted at the East SRV. Similarly, the signal inputted to the East SRV is not only dropped to Tributary 2 but also outputted at the West SRV.

As shown in section (b) of FIG. 18, if a span failure has occurred in the West-SRV line in the normal state, span switching is effected. Specifically, the path is switched from the West-SRV line to the West-PRT line. Even after the span switching has been completed, the signal inputted to the East SRV still remains connected to the West SRV and is also bridged to the West PRT. The place to which the signal dropped to Tributary 1 is inputted is switched from the West SRV to West PRT.

As shown in section (c) of FIG. 18, if a ring failure has occurred in the West SRV line and the West PRT line in the normal state, ring switching is effected. The place to which the signal dropped at Tributary 1 is inputted is switched from the West SRV to East PRT.

Section (a) to section (c) in FIG. 18 show actions at nodes existing in the intermediate part of a Point-to-Multi-point connection path. At a node existing at the end part of the Point-to-Multi-point path, only the route of the signal to be dropped is changed.

Section (d) in FIG. 18 shows an example of the signal connection at a Dual Head node of a Point-to-Multi-point path. The node shown in section (d) splits in half the signal inputted to Tributary 1 and outputs them at both of the West SRV and East SRV.

As shown in section (e) in FIG. 18, if a span failure has occurred in the West SRV line in the normal state, span switching is effected. Even after the span switching has been completed, the signal externally inputted to Tributary 1 still remains connected to the West SRV and is also bridged with the West PRT.

As shown in section (f) in FIG. 18, if a ring failure has occurred in the West SRV line and West PRT transmission line in the normal state, ring switching is effected. Even after the ring switching has been completed, the signal externally inputted to Tributary 1 still remains connected to the West SRV and is also bridged with the East PRT.

Each of section (d) to section (f) in FIG. 18 show the starting point of a Point-to-Multi-point connection, i.e., a node that transmits signals to both the West and East. This type of node may transmit a signal to only either the West or East. In this case, only the setting of the Add signal is effected at the transmission node. In switching at the time of the occurrence of a failure, only "bridge" related to the Add signal is done as in section (a) to section (c) of FIG. 4.

(Tenth Embodiment)

Figure 19:
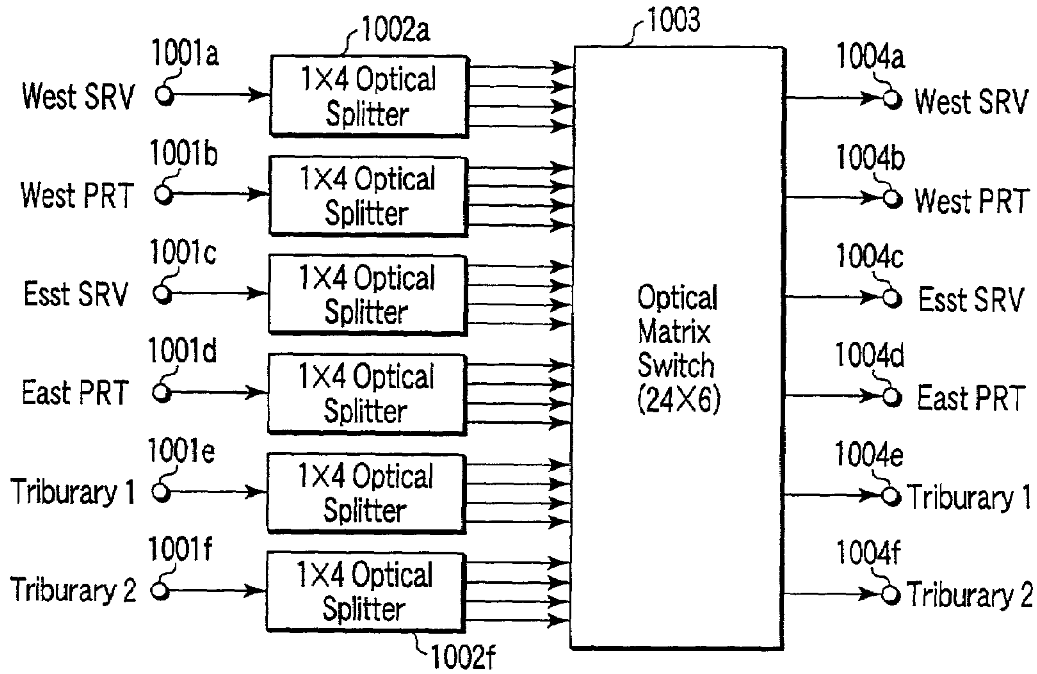
FIG. 19 is a block diagram showing the configuration of a optical switch section according to a tenth embodiment of the present invention.

FIG. 19 is a block diagram showing the configuration of a optical switch section according to a tenth embodiment of the present invention. In FIG. 19, reference numerals 1001*a* to 1001*f* indicate input ports, 1002*a* to 1002*f* indicate 1×4 optical splitters for splitting the input signal into four sub-signals, 1003 indicates an optical matrix switch, and 1004*a* to 1004*f* indicate output ports.

With the configuration of FIG. 19, the input signal is split into four sub-signals, which are then inputted to the optical matrix switch 1003. As a result, all the input signals can be outputted at a maximum of four output ports. This makes it possible to realize not only the connection settings shown in FIG. 4 but also all the connection settings in the normal state and failure state in FIG. 18.

Figure 7:
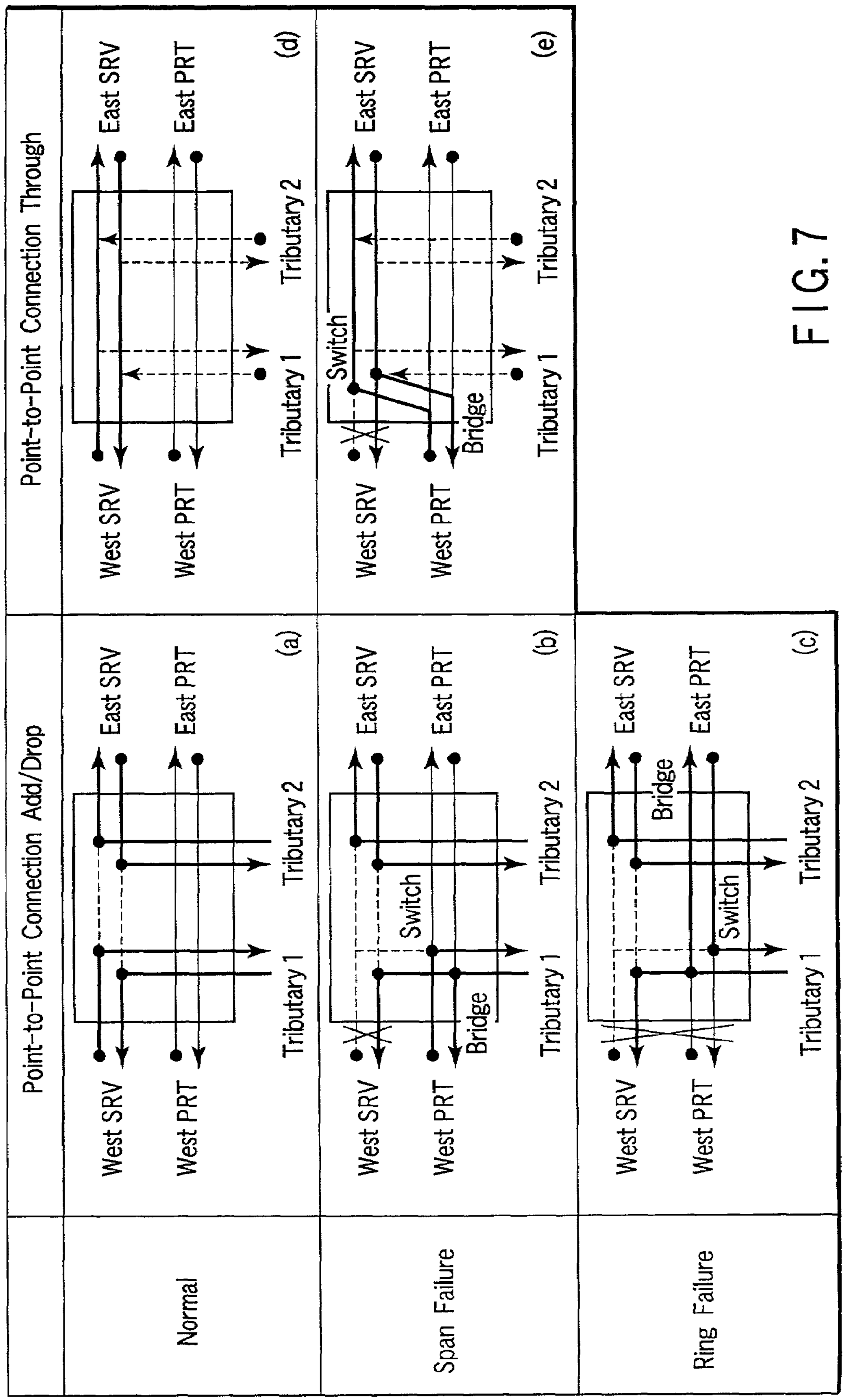
FIG. 7 shows the connection relationship between input and output signals at a node for each state when there is a Point-to-Point connection path on a network.

FIGS. 7 and 18 show only the connection relationship in the normal state and failure state at a node in the Add/Drop connection state, Through connection state, Drop & Continue connection state, and Dual Homing connection state. The line switch of the tenth embodiment, however, also enables loop-back connection and in-node folding connection to be realized.

(Eleventh Embodiment)

Figure 20:
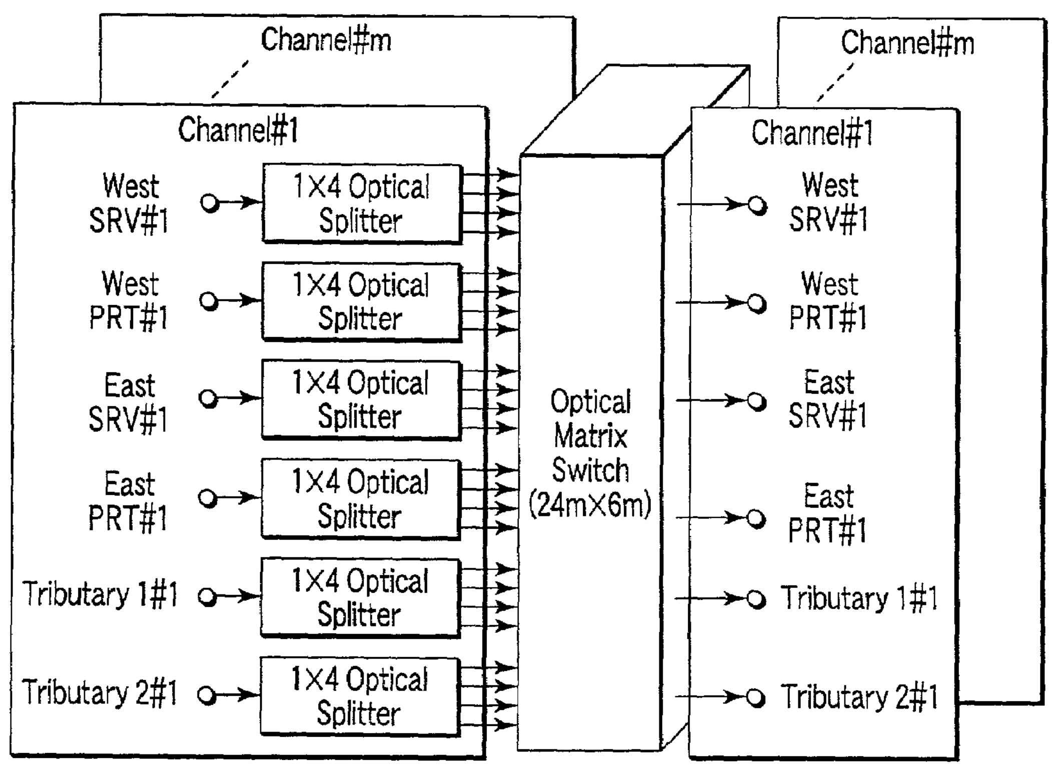
FIG. 20 is a block diagram showing the configuration of a optical switch section according to an eleventh embodiment of the present invention.

FIG. 20 is a block diagram showing the configuration of a optical switch section according to an eleventh embodiment of the present invention. The configuration of FIG. 20 is an expansion of the configuration of FIG. 19. In the eleventh embodiment, a line switch corresponding to a plurality of channels (#1 to #m) will be explained. In the figure, m means the number of multiplexed wavelengths, that is, the number of channels.

In the line switch of FIG. 20, each of the channels #1 to #m is provided with the West SRV, West PRT, East SRV, East PRT, Tributary 1, and Tributary 2. Each channel is provided with 1×4 optical splitters connected in the same manner as in the tenth embodiment. Each splitter is connected to a 24m×6m optical matrix switch.

With such a configuration, the same connection relationship as in the tenth embodiment can be realized for each channel. Furthermore, since the connection setting of signals for a plurality of channels is processed by the single optical matrix switch, this enables the switching of signals between channels to be effected. As a result, wavelength conversion and wavelength selection can also be made.

(Twelfth Embodiment)

Figure 21:
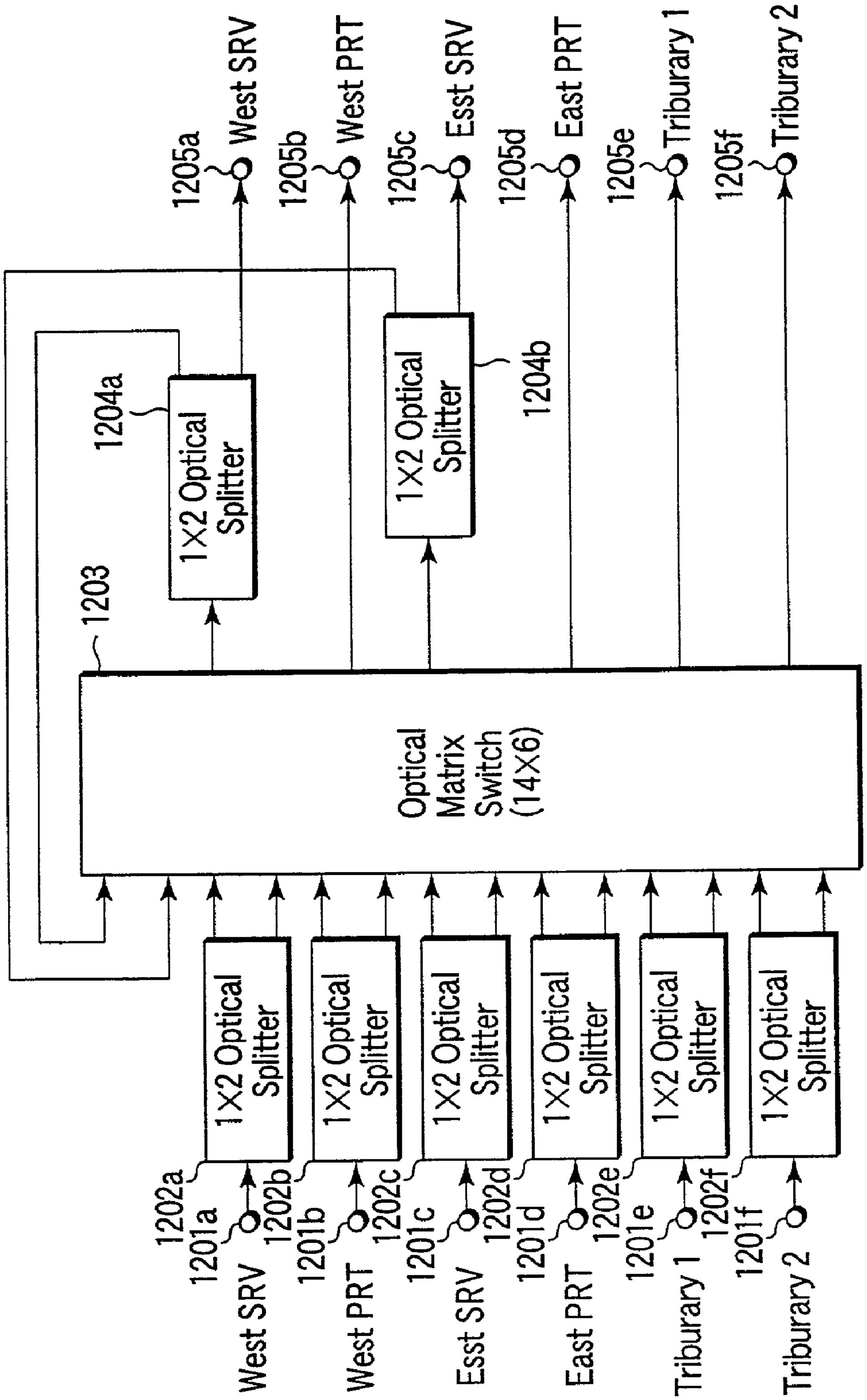
FIG. 21 is a block diagram showing the configuration of a optical switch section according to a twelfth embodiment of the present invention.

FIG. 21 is a block diagram showing the configuration of a optical switch section according to a twelfth embodiment of the present invention. In FIG. 21, reference numerals 1201*a* to 1201*f* indicate input ports, 1202*a* to 1202*f* indicate 1×2 optical splitters for splitting the input signal in half and outputting the split signals, 1203 indicates a 14×6 optical matrix switch, 1204*a* and 1204*b* indicate 1×2 optical splitters, and 1204*a* to 1204*e* indicate output ports.

The 1×2 optical splitter 1204*a* is connected to any one of the output terminals of the optical matrix switch 1203 and splits in half the output signal from the output terminal. One split output signal is connected to a West SRV output port 1205*a* and the other split output signal is connected to an input terminal of the optical matrix switch 1203.

The 1×2 optical splitter 1204*b* is connected to any one of the output terminals of the optical matrix switch 1203 and splits in half the output signal from the output terminal. One split output signal is connected to an East SRV output port 1205*c* and the other split output signal is connected to an input terminal of the optical matrix switch 1203.

With the configuration of FIG. 21, each input signal is split in half and the split signals are inputted to the optical matrix switch 1203. Therefore, all the input signals can be connected to a maximum of two output ports. This makes it possible to realize not only the connection settings shown in FIG. 4 but also the connection setting in the normal state shown in FIG. 18.

Furthermore, the two split signals from the 1×2 optical splitter are not only outputted to the West SRV and East SRV but also inputted again to the optical matrix switch 1203. This enables the same signal outputted to the West SRV and East SRV to be outputted to the West PRT or East PRT. As a result, the bridge function can be realized.

In addition, the switch function is also realized by changing the connection setting of the optical matrix switch 1203. Therefore, all the connection settings in the failure state shown in FIGS. 7 and 18 can be realized. Moreover, with the twelfth embodiment, loop-back connection and in-node folding connection can also be realized.

(Thirteenth Embodiment)

Figure 22:
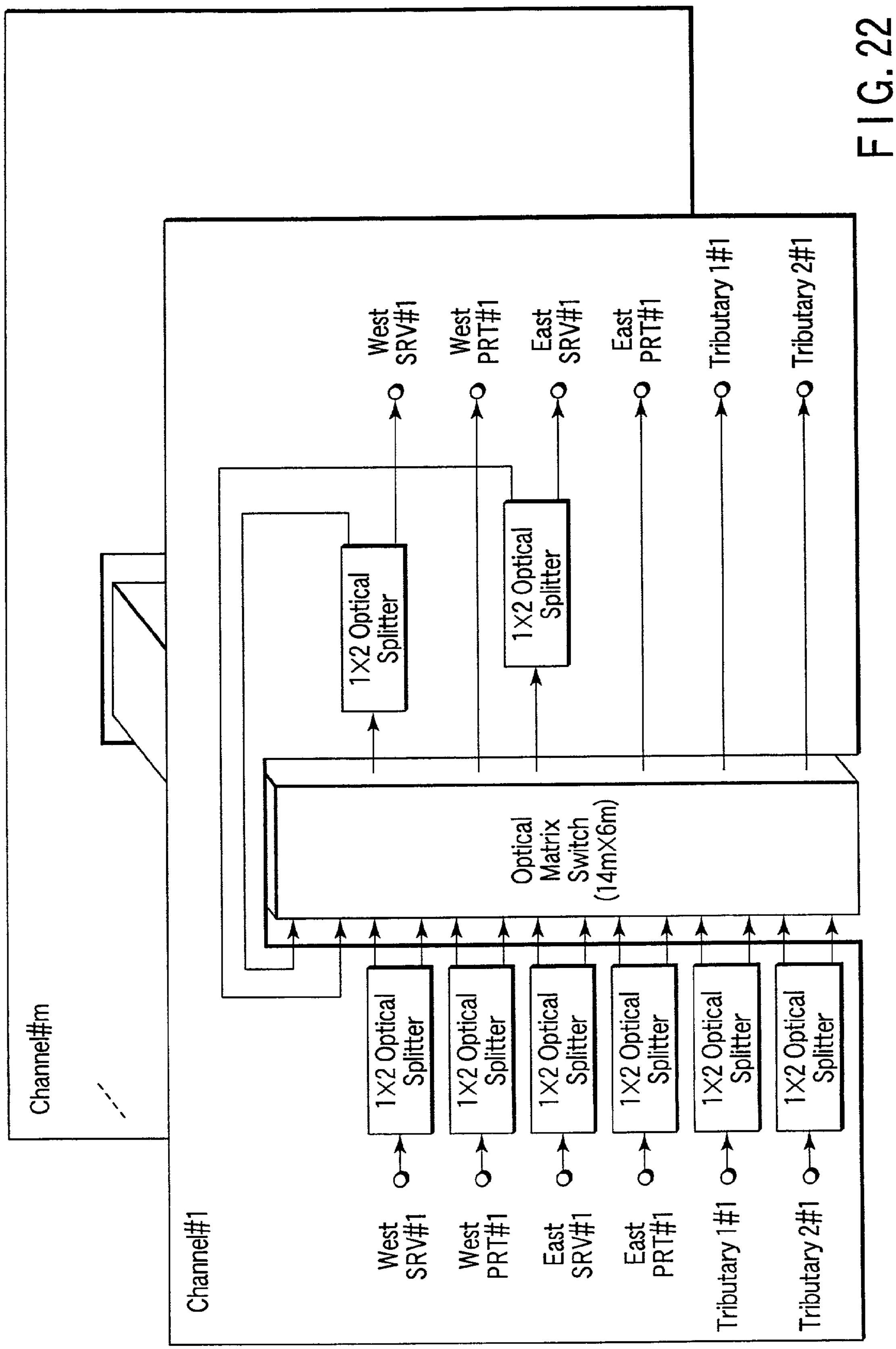
FIG. 22 is a block diagram showing the configuration of a optical switch section according to a thirteenth embodiment of the present invention.

FIG. 22 is a block diagram showing the configuration of a optical switch section according to a thirteenth embodiment of the present invention. The configuration of FIG. 22 is an expansion of the configuration of FIG. 21. In the thirteenth embodiment, a line switch corresponding to a plurality of channels (#1 to #m) will be explained.

In the line switch of FIG. 22, each of the channels #1 to #m is provided with the West SRV, West PRT, East SRV, East PRT, Tributary 1, and Tributary 2. Between the m input ports of channels #1 to #m and the m output ports of channels #1 to #m, a 14m×6m optical matrix switch and 1×2 optical splitter connected to the optical matrix switch as in the twelfth embodiment are provided.

With such a configuration, not only can all the settings in the normal state and failure state be done as in the twelfth embodiment, but wavelength conversion and wavelength selection can also be made.

(Fourteenth Embodiment)

Figure 23:
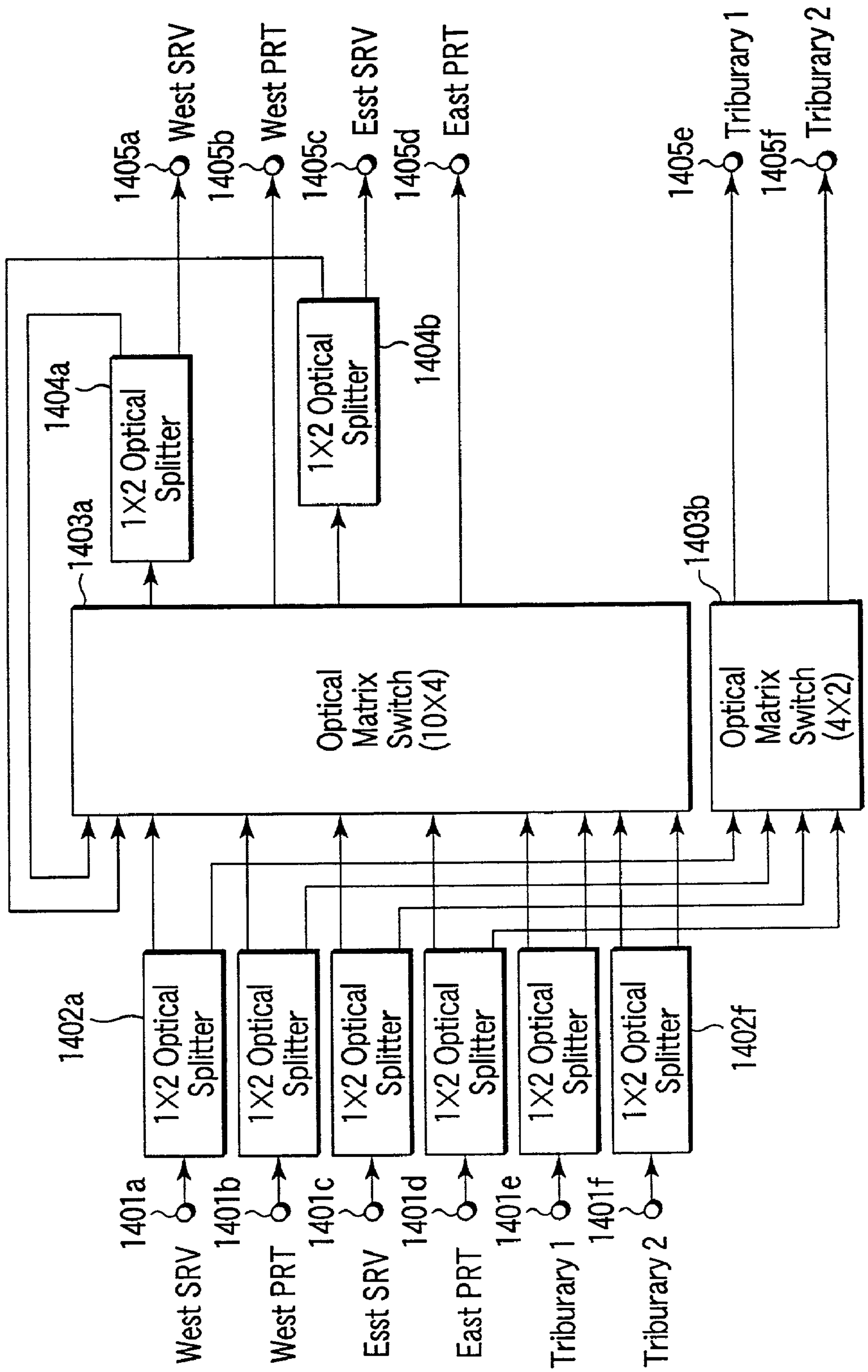
FIG. 23 is a block diagram showing the configuration of a optical switch section according to a fourteenth embodiment of the present invention.

FIG. 23 is a block diagram showing the configuration of a optical switch section according to a fourteenth embodiment of the present invention. In FIG. 23, reference numerals 1401*a* to 1401*f* indicate input ports, 1402*a* to 1402*f* indicate 1×2 optical splitters for splitting the input signal in half and outputting the split signals, 1403*a* indicates a 10×4 optical matrix switch, 1403*b* indicates a 4×2 optical matrix switch, 1404*a* and 1404*b* indicate 1×2 optical splitters, and 1405*a* to 1405*f* indicate output ports.

The 1×2 optical splitter 1404*a* is connected to an output terminal of the optical matrix switch 1403*a* and splits the output signal in half. One split output signal is connected to a West SRV output port and the other split output signal is connected to an input terminal of the optical matrix switch 1403*a*.

The 1×2 optical splitter 1404*b* is connected to an output terminal of the optical matrix switch 1403*a* and splits the output signal in half. One split output signal is connected to an East-SRV output port and the other split output signal is connected to an input terminal of the optical matrix switch 1403*a*.

The configuration of the fourteenth embodiment is such that the optical matrix switch 1203 of FIG. 21 is divided into two optical matrix switches 1403*a*, 1403*b*. The split output signals from the 1×2 optical splitters 1402*a* to 1402*d* are inputted to the optical matrix switches 1403*a* and 1403*b*. The split output signals from the 1×2 optical splitters 1402*e* and 1402*f* are both inputted to the optical matrix switch 1403*a*.

One of the output terminals of the optical matrix switch 1403*b* is connected to an output port 1405*e* (Tributary 1) and the other is connected to an output port 1405*f* (Tributary 2).

Two of the output terminals of the optical matrix switch 1403*a* are connected to an output port 1405*b* (West PRT) and an output port 1405*d* (East PRT) in a one-to-one correspondence. The remaining two output terminals of the optical matrix switch 1403*a* are connected to the 1×2 optical splitters 1402*a* and 1402*b* in a one-to-one correspondence.

One of the split output signals of the 1×2 optical splitter 1402*a* is connected to the output port 1405*a* (West SRV). The other split output signal is inputted to the optical matrix switch 1403*a*.

One of the split output signals of the 1×2 optical splitter 1402*b* is connected to the output port 1405*c* (East SRV). The other split output signal is inputted to the optical matrix switch 1403*a*.

With the configuration of FIG. 23, one of the halved West and East SRV and PRT input signals passes through the optical matrix switch 1403*b* and is outputted to either Tributary 1 or Tributary 2. Thus, these four signals can be connected to the two Tributary output ports arbitrarily.

Furthermore, the other split signals of the West and East SRV and PRT input signals can pass through the optical matrix switch 1403*a* and be outputted to the West and East SRV and PRT output ports arbitrarily.

Therefore, the individual West and East SRV and PRT input signals can be outputted to Tributary and the West and East SRV and PRT arbitrarily.

Each input signal to Tributary is split and both of the split signals are inputted to the optical matrix switch 1403*a*. Thus, these signals can be connected to a maximum of two output ports of the West and East SRV and PRT. Consequently, the connection setting in the normal state shown in FIG. 18 can be realized in addition to the connection setting shown in FIG. 4.

Furthermore, the signals split by the 1×2 optical splitters 1404*a*, 1404*b* can be not only outputted to the West SRV and East SRV but also caused to pass through the optical matrix switch 1403*a* again and be outputted to the West PRT or East PRT. As a result, the bridge function can be realized.

In addition, by changing the connection setting state of the optical matrix switches 1403*a*, 1403*b*, the switch function can be realized. Thus, all the connection settings in the failure state shown in FIGS. 7 and 18 can be realized.

Moreover, use of the line switch of the fourteenth embodiment enables loop-back connection and in-node folding connection to be realized.

(Fifteenth Embodiment)

Figure 24:
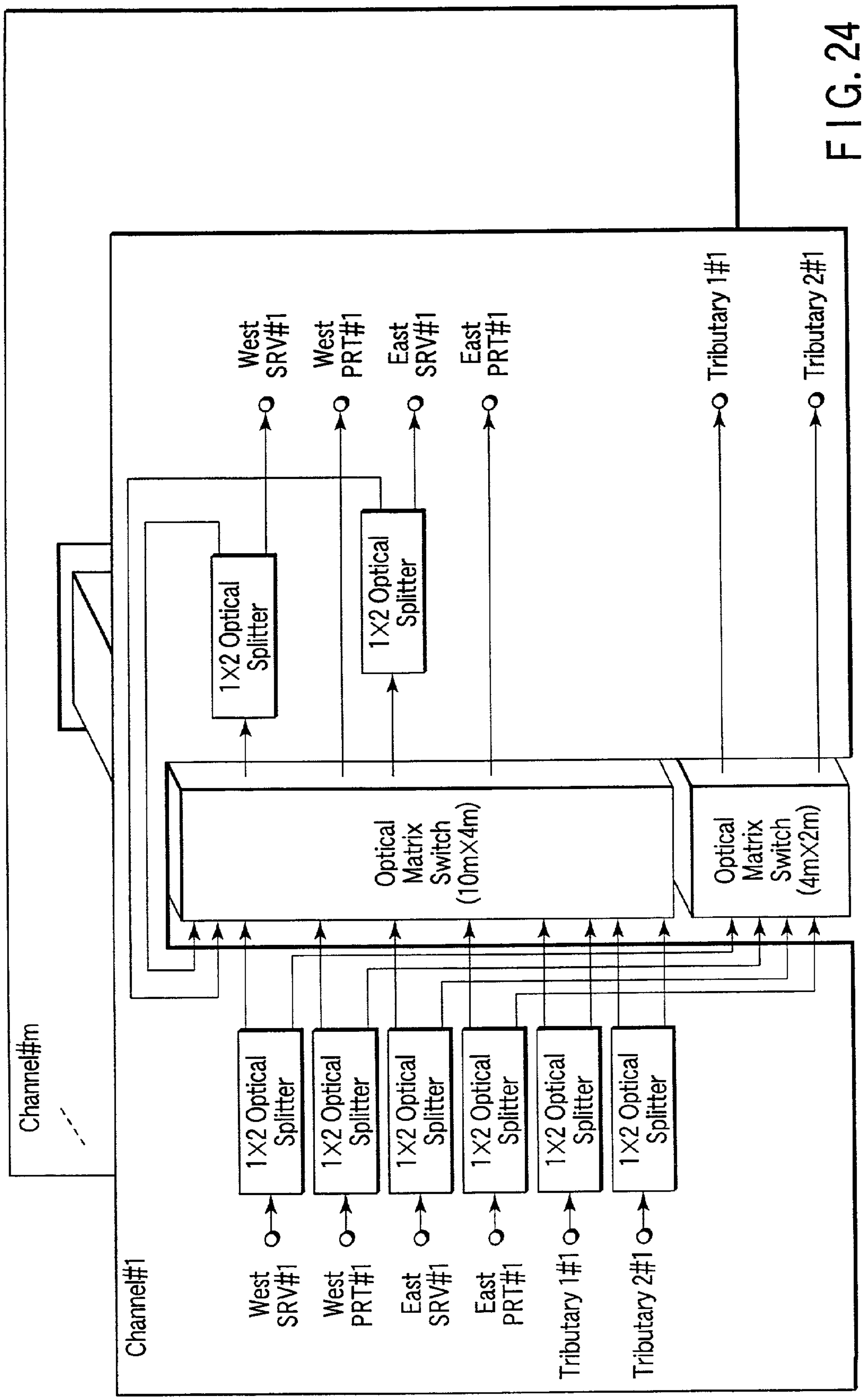
FIG. 24 is a block diagram showing the configuration of a optical switch section according to a fifteenth embodiment of the present invention.

FIG. 24 is a block diagram showing the configuration of a optical switch section according to a fifteenth embodiment of the present invention. The configuration of FIG. 24 is an expansion of the configuration of FIG. 23. In the fifteenth embodiment, a line switch corresponding to a plurality of channels (#1 to #m) will be explained.

In the line switch of FIG. 24, each of the channels #1 to #m is provided with the West SRV, West PRT, East SRV, East PRT, Tributary 1, and Tributary 2. Each channel is provided with 1×2 optical splitters connected in the same manner as in the fourteenth embodiment. One optical matrix switch has a size of 10m×6m and the other optical matrix switch has a size of 4m×2m.

With such a configuration, not only can all the settings in the normal state and failure state shown in FIG. 4 be done as in the fourteenth embodiment, but wavelength conversion and wavelength selection can also be made.

(Sixteenth Embodiment)

Figure 25:
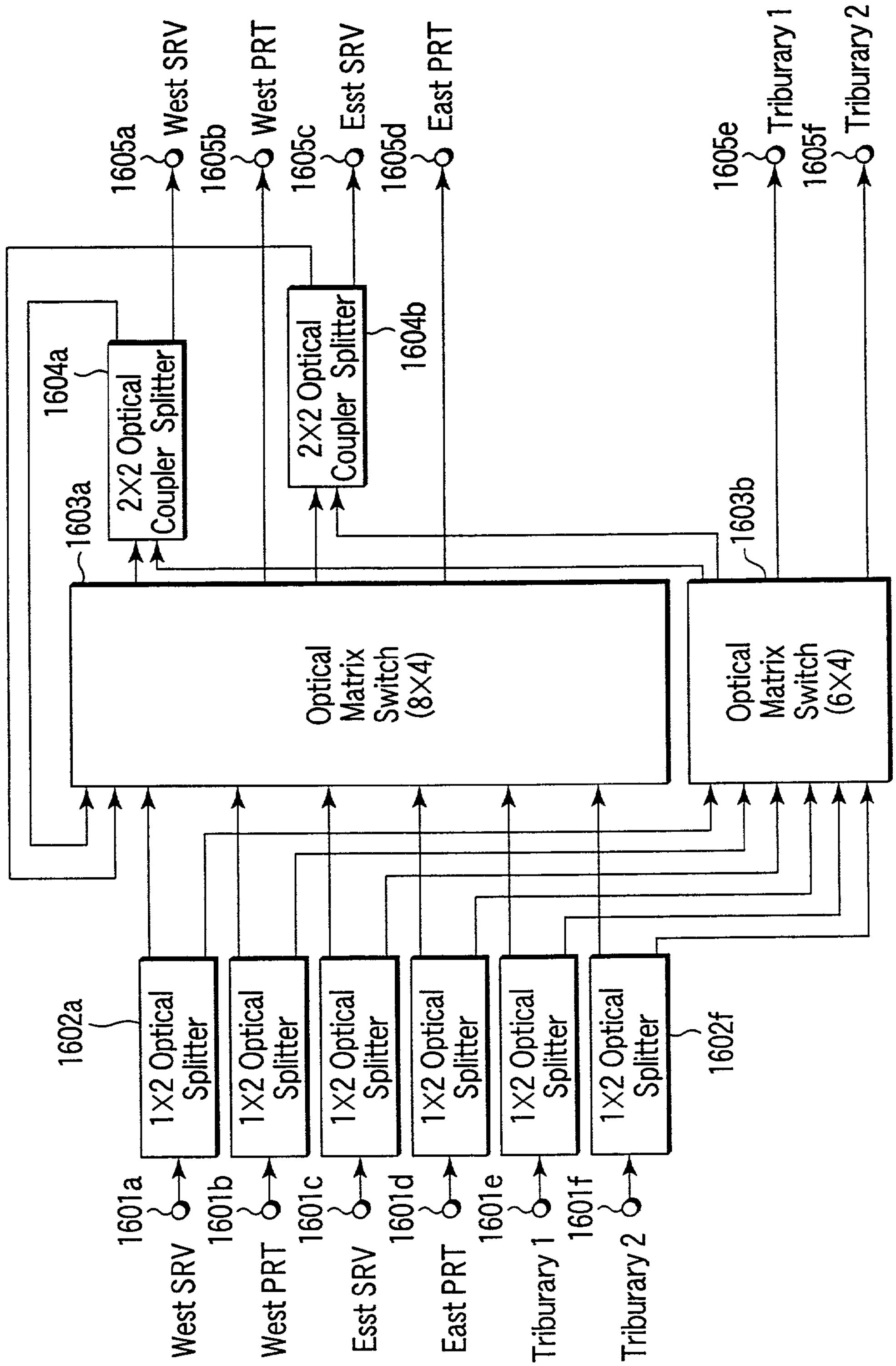
FIG. 25 is a block diagram showing the configuration of a optical switch section according to a sixteenth embodiment of the present invention.

FIG. 25 is a block diagram showing the configuration of a optical switch section according to a sixteenth embodiment of the present invention. In FIG. 25, reference numerals 1601*a* to 1601*f* indicate input ports, 1602*a* to 1602*f* indicate 1×2 optical splitters for splitting the input signal in half and outputting the split signals, 1603*a* indicates an 8×4 optical matrix switch, 1603*b* indicates a 6×4 optical matrix switch, 1604*a* and 1604*b* indicate 2×2 optical coupler splitters, and 1605*a* to 1605*f* indicate output ports.

The 2×2 optical coupler splitter 1604*a* is connected to output terminals of the optical matrix switches 1603*a*, 1603*b* and splits the output signal of each matrix switch in half. One split output signal is connected to a West SRV output port and the other split output signal is connected again to an input terminal of the optical matrix switch 1603*a*.

The 2×2 optical coupler splitter 1604*b* is connected to output terminals of the optical matrix switches 1603*a*, 1603*b* and splits the output signal of each matrix switch in half. One split output signal is connected to an East SRV output port and the other split output signal is connected again to an input terminal of the optical matrix switch 1603*a*.

The configuration of the sixteenth embodiment is such that the optical matrix switch 1203 of FIG. 21 is divided into two optical matrix switches 1603*a*, 1603*b*. The split output signals from the 1×2 optical splitters 1602*a* to 1602*f* are inputted to the optical matrix switches 1603*a* and 1603*b*.

The output port 1605*b* (West PRT) and output port 1605*d* (East PRT) are connected to the optical matrix switch 1603*a*. The output port 1605*e* (Tributary 1) and output port 1605*f* (Tributary 2) are connected to the optical matrix switch 1603*b*.

With the configuration of FIG. 25, one of the two split input signals can pass through the optical matrix switch 1603*b* and be outputted to either Tributary 1 or Tributary 2. Thus, the six signals inputted to the optical matrix switch 1603*b* can be connected to the two Tributary output ports arbitrarily. In addition, the other one of the two split input signals can pass through the optical matrix switch 1603*a* and be connected to the West and East SRV and PRT output ports arbitrarily.

Therefore, the input signals to the West and East SRV and PRT can be outputted to the two Tributary ports and the West and East SRV and PRT output ports.

The individual input signals to the Tributary ports are split by the corresponding 1×2 optical splitters 1602*e* and 1602*f* and the resulting split signals are inputted to both of the optical matrix switches 1603*a*, 1603*b*. The split signals pass through the individual optical matrix switches and are combined at the 2×2 optical coupler splitters and the resulting signals are outputted to the West and East SRV ports. Thus, the input signals to Tributary can be connected to a maximum of two output ports for the West and East SRV and PRT. This makes it possible to realize the connection setting in the normal state shown in FIG. 18 in addition to the connection settings shown in FIG. 4.

Furthermore, the signals split by the two 1×2 optical splitters can not only be outputted to the West and East SRV but also pass through the optical matrix switch 1603*a* again and be outputted to either the West or East PRT. Thus, it is possible to realize the bridge function. In addition, the switch function can also be realized by changing the setting of the optical matrix switches 1603*a*, 1603*b*. Therefore, all the connection settings shown in FIGS. 7 and 18 can be realized.

Furthermore, the line switch of the sixteenth embodiment enables loop-back connection and in-node folding connection to be realized.

(Seventeenth Embodiment)

Figure 26:
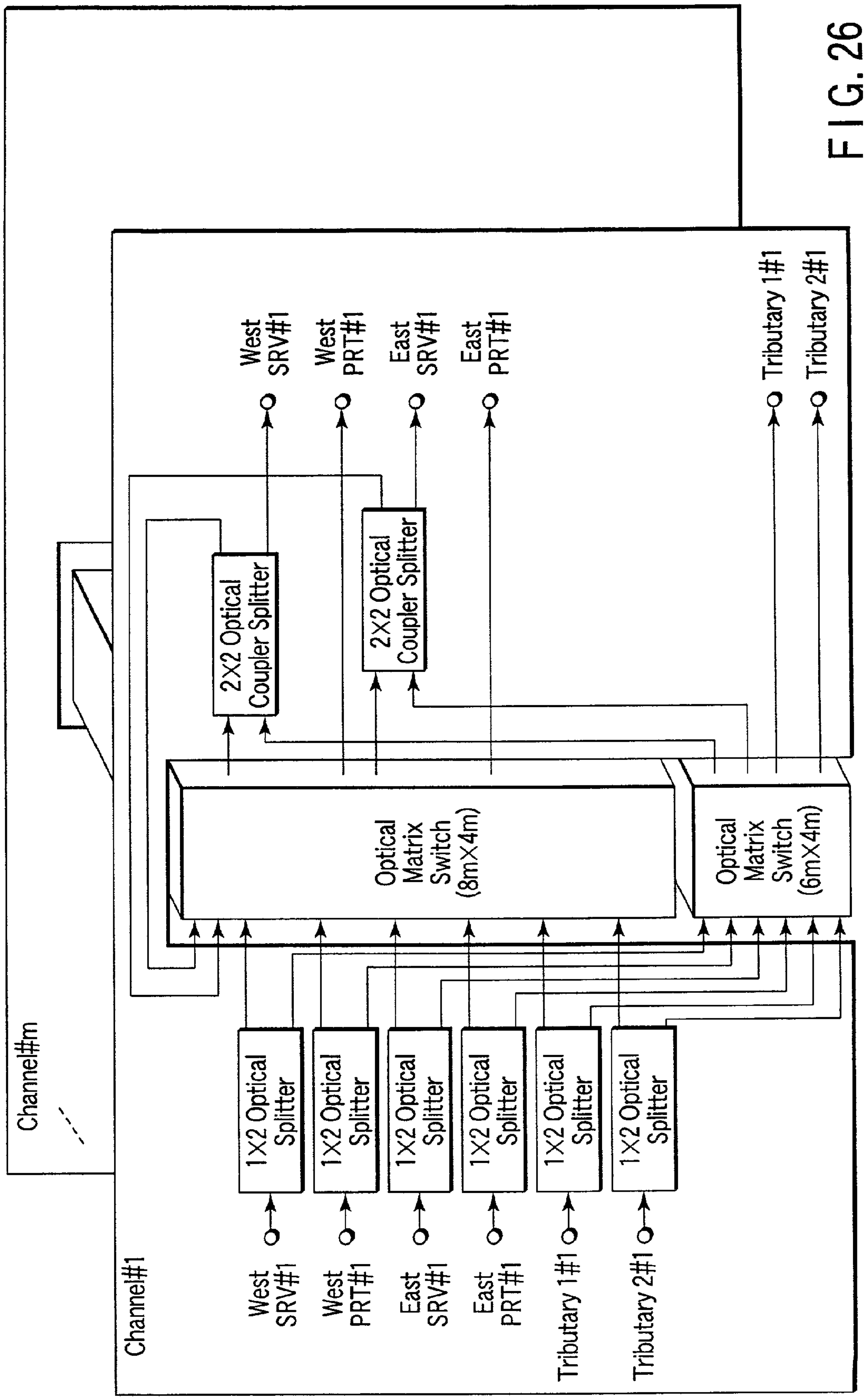
FIG. 26 is a block diagram showing the configuration of a optical switch section according to a seventeenth embodiment of the present invention.

FIG. 26 is a block diagram showing the configuration of a optical switch section according to a seventeenth embodiment of the present invention. The configuration of FIG. 26 is an expansion of the configuration of FIG. 25. In the seventeenth embodiment, a line switch corresponding to a plurality of channels (#1 to #m) will be explained.

In the line switch of FIG. 26, each of the channels #1 to #m is provided with the West SRV, West PRT, East SRV, East PRT, Tributary 1, and Tributary 2. Each channel is provided with 1×2 optical splitters connected in the same manner as in the sixteenth embodiment. One optical matrix switch has a size of 8m×4m and the other optical matrix switch has a size of 6m×4m.

With such a configuration, not only can all the settings in the normal state and failure state shown in FIG. 4 be done as in the sixteenth embodiment, but wavelength conversion and wavelength selection can also be made.

(Eighteenth Embodiment)

FIG. 27 is a block diagram showing the configuration of a optical switch section according to an eighteenth embodiment of the present invention. In FIG. 27, reference numerals 1801*a* to 1801*f* indicate input ports, 1803*a* to 1803*f* indicate 1×2 optical splitters for splitting the input signal in half and outputting the split signals, 1805 indicates an optical matrix switch with an Add/Drop ports, 1803*g* and 1803*h* indicate 1×2 optical splitters each of which splits in half the output of the optical matrix switch 1805 and connects one split signal to an Add port of the optical matrix switch 1805, and 1802*a* to 1802*f* indicate output ports.

With the configuration of FIG. 27, each of the input signals from the West SRV, East SRV, Tributary 1, and Tributary 2 is split in half and the split signals are inputted to the optical matrix switch 1805. Each of the input signals from the West PRT and East PRT is split in half. One split input signal is connected to an input terminal of the optical matrix switch 1805 and the other split input signal is connected to an Add port of the optical matrix switch 1805.

The output signals from the optical matrix switch 1805 are split in half by the 1×2 optical splitters 1803*g*, 1803*h*. One split signal from each of the splitters 1803*g*, 1803*h* is connected to an Add port of the optical matrix switch 1805. As result, it is possible to output the same signal at the West SRV, West PRT, East SRV, and East PRT.

With the above configuration, the signals inputted to the West SRV, East SRV, Tributary 1, and Tributary 2 can be outputted to a maximum of four output ports of the West SRV, West PRT, East SRV, and East PRT.

Furthermore, the signal inputted to the West PRT can be outputted to a maximum of three output ports, including an arbitrary output port, East-SRV output port, and East-PRT output port. Similarly, the signal inputted to the East PRT can be outputted to a maximum of three output ports, including an arbitrary output port, West-SRV output port, and West-PRT output port. Therefore, it is possible to realize all the connection settings in the normal state and failure state shown in FIG. 18 in addition to the connection settings shown in FIG. 4.

Furthermore, the line switch of the eighteenth embodiment enables loop-back connection and in-node folding connection to be realized.

(Nineteenth Embodiment)

Figure 28:
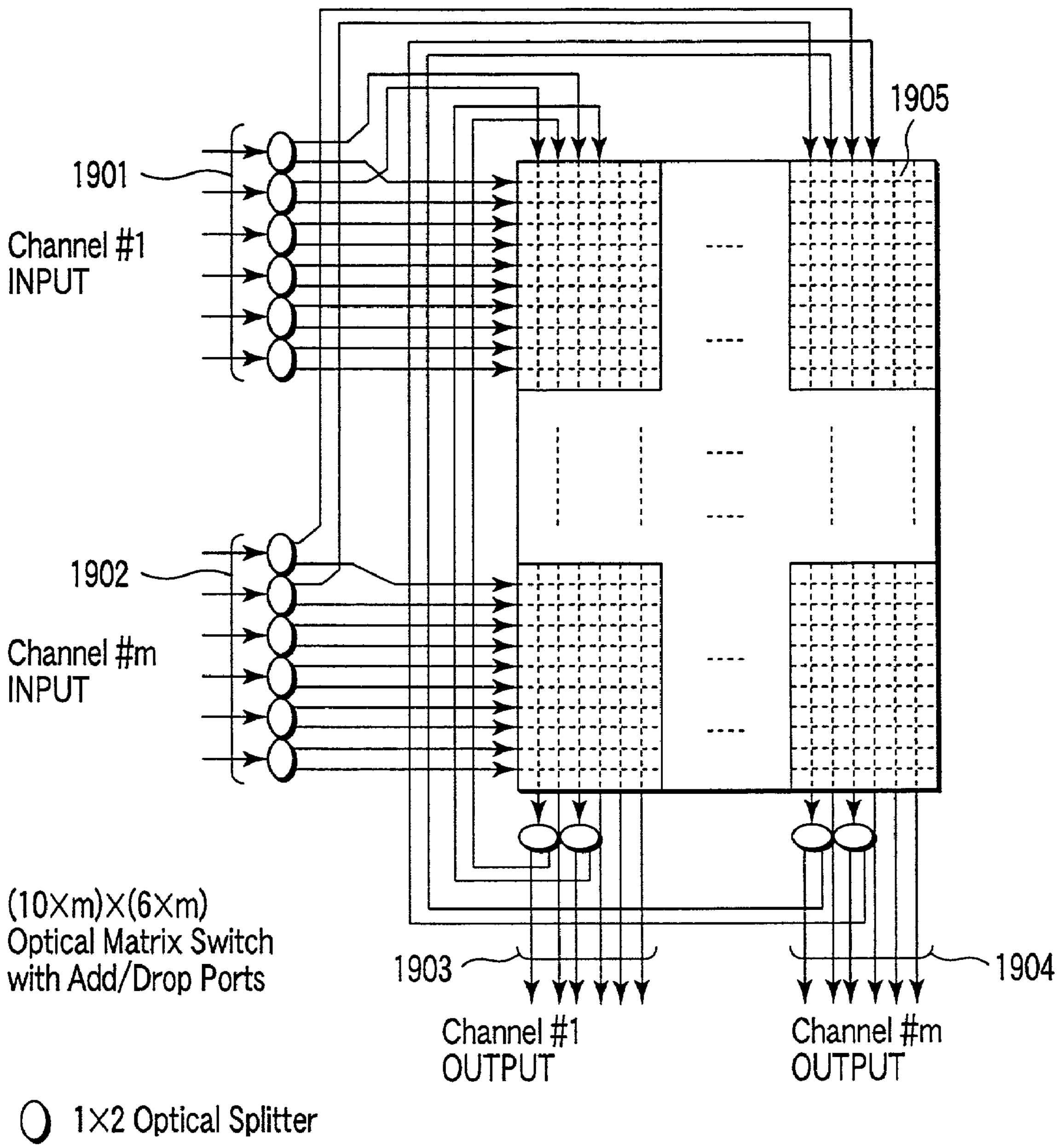
FIG. 28 is a block diagram showing the configuration of a optical switch section according to a nineteenth embodiment of the present invention.

FIG. 28 is a block diagram showing the configuration of a optical switch section according to a nineteenth embodiment of the present invention. The configuration of FIG. 28 is an expansion of the configuration of FIG. 27. In the nineteenth embodiment, a line switch corresponding to a plurality of channels (#1 to #m) will be explained.

In the line switch of FIG. 28, each of the channels #1 to #m is provided with the West SRV, West PRT, East SRV, East PRT, Tributary 1, and Tributary 2. In FIG. 28, reference numeral 1901 indicates an input port group corresponding to channel #1. The input port group 1901 is provided with the West SRV, West PRT, East SRV, East PRT, Tributary 1, and Tributary 2 input ports. Similarly, reference numeral 1902 indicates an input port group corresponding to channel #m. The other channels are also provided with a plurality of input ports as described above.

Reference numeral 1903 indicates an output port group corresponding to channel #1. The output port group 1903 is provided with the West SRV, West PRT, East SRV, East PRT, Tributary 1, and Tributary 2 output ports. Similarly, reference numeral 1904 indicates an output port group corresponding to channel #m. The other channels are also provided with a plurality of output ports as described above.

Reference numeral 1905 indicates a 10m×6m optical matrix switch. The optical matrix switch 1905 includes an m×m number of 10×6 optical matrix switches. Each 10×6 optical matrix switch has the same configuration as that of FIG. 27 and includes an Add port and Drop port.

In FIG. 28, a 1×2 optical splitter is provided for each channel. The connection relationship between the input ports, output ports, 10×6 optical matrix switches, and 1×2 optical splitters is the same as in the eighteenth embodiment.

With such a configuration, the same connection relationship as in the eighteenth embodiment can be realized for each channel. Since the connection setting of the signals for a plurality of channels is processed by the single optical matrix switch 1905, the switching of signals between channels can be done. That is, wavelength conversion can be realized.

Furthermore, in the case of Add connection shown in FIG. 4, for example, the signal inputted to Tributary 1 of channel #1 can be outputted to the West SRV of channel #m. That is, any Tributary of channel #1 to channel #m can be outputted to the output port of any channel. Therefore, the input signal from Tributary can be subjected to wavelength selection.

(Twentieth Embodiment)

Figure 29:
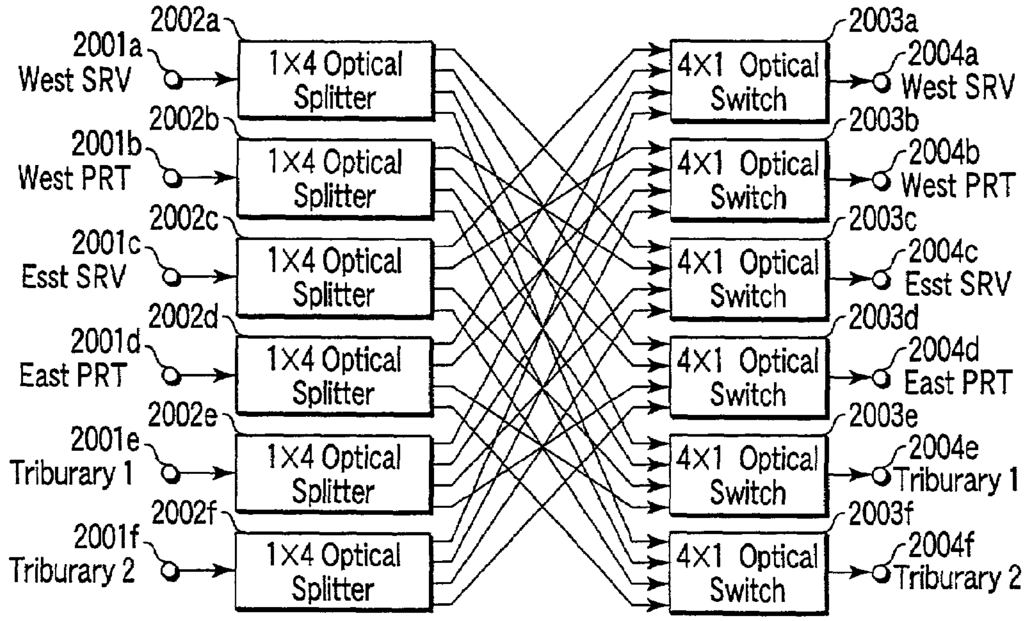
FIG. 29 is a block diagram showing the configuration of a optical switch section according to a twentieth embodiment of the present invention.

FIG. 29 is a block diagram showing the configuration of a optical switch section according to a twentieth embodiment of the present invention. In FIG. 29, reference numerals 2001*a* to 2001*f* indicate input ports, 2002*a* to 2002*f* indicate 1×4 optical splitters for splitting the input signal into four sub-signals and outputting the split signals, 2003*a* to 2003*f* indicate 4×1 optical switches, and 2004*a* to 2004*e* indicate output ports. The 4×1 optical switches are optical elements each of which selects one of the four input signals and outputs the selected signal.

The optical signals from the input ports 2001*a* to 2001*f* are split into four sub-signals at the 1×4 optical splitters 2002*a* to 2002*f*, respectively. The split outputs from the 1×4 optical splitter 2002*a* are inputted to the 4×1 optical switches 2003*c*, 2003*d*, 2003*e*, 2003*f*. The split outputs from the 1×4 optical splitter 200b*b* are inputted to the 4×1 optical switches 2003*c*, 2003*d*, 2003*e*, 2003*f*. The split outputs from the 1×4 optical splitter 2002*c* are inputted to the 4×1 optical switches 2003*a*, 2003*b*, 2003*e*, 2003*f*. The split outputs from the 1×4 optical splitter 2002*d* are inputted to the 4×1 optical switches 2003*a*, 2003*b*, 2003*e*, 2003*f*. The split outputs from the 1×4 optical splitter 2002*e* are inputted to the 4×1 optical switches 2003*a*, 2003*b*, 2003*c*, 2003*d*. The split outputs from the 1×4 optical splitter 2002*f* are inputted to the 4×1 optical switches 2003*a*, 2003*b*, 2003*c*, 2003*d*.

With the configurations of FIG. 15, the input signal is split into four sub-signals. In the twentieth embodiment, the maximum number of ports to which the same input signal is outputted is assumed to be 4 and the number of sub-signals into which the input signal is split is set at 4. That is, there is a possibility that the signal inputted to a single input port will be outputted at one, two, three, or four output ports.

The split output signals of each optical splitter are connected to the optical switches connected to the output ports at which the signal might be outputted. For example, the input signal from the West SRV might be outputted at the output ports 2004*c*, 2004*d*, 2004*e*, or 2004*f*. Therefore, the split output signals from the optical splitter 2002*a* are connected to the optical switches 2003*c*, 2003*d*, 2003*e*, and 2003*f*. Then, each optical switch selectively outputs one of the inputted signals at the output port.

According to the connection relationship shown in FIG. 18, the input signal is outputted at a maximum of four ports. Therefore, in the twentieth embodiment, quadrisecting splitters and 4×1 optical switches are used. With this configuration, it is possible to set all the connection states in the normal state and failure state shown in FIG. 18. Furthermore, to realize the connection relationship shown in FIG. 4, the input signal has only to be outputted to a maximum of three ports. Therefore, with the twentieth embodiment, it is also possible to effect the connection settings in the normal state and failure state shown in FIG. 4.

(Twenty-first Embodiment)

Figure 30:
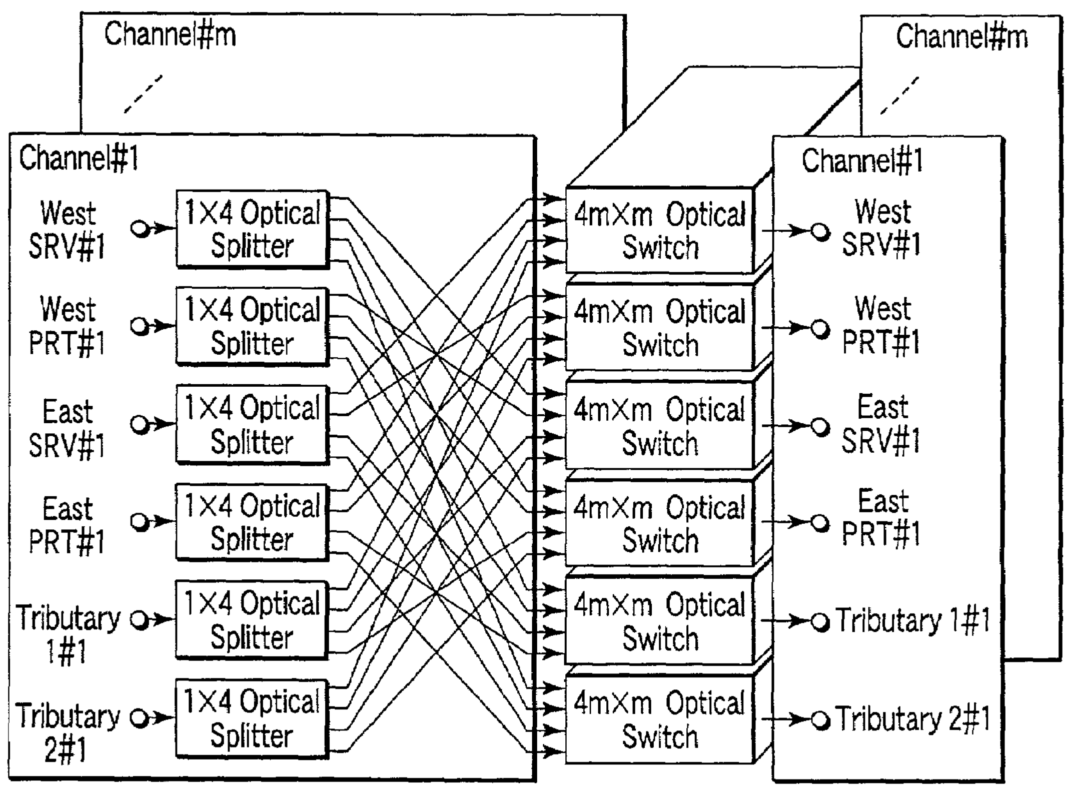
FIG. 30 is a block diagram showing the configuration of a optical switch section according to a twenty-first embodiment of the present invention.

FIG. 30 is a block diagram showing the configuration of a optical switch section according to a twenty-first embodiment of the present invention. The configuration of FIG. 30 is an expansion of the configuration of FIG. 29. In the twenty-first embodiment, a line switch corresponding to a plurality of channels (#1 to #m) will be explained.

In the line switch of FIG. 30, each of the channels #1 to #m is provided with the West SRV, West PRT, East SRV, East PRT, Tributary 1, and Tributary 2. Between the m input ports and m output ports of channel #1 to channel #m, 1×4 optical splitters connected in the same manner as in the twentieth embodiment and six 4m×m optical switches are provided.

Specifically, the 1×4 optical splitters 2002*a* to 2002*f* shown in FIG. 29 are provided for each of the channels #1 to #m. The split outputs of each splitter are connected to the corresponding 4m×m optical switch in the same manner as in FIG. 29.

With this configuration, not only can all the settings in the normal state and failure state shown in FIGS. 7 and 18 be effected as in the twentieth embodiment, but wavelength conversion and wavelength selection can also be made.

(Twenty-second Embodiment)

Figure 31:
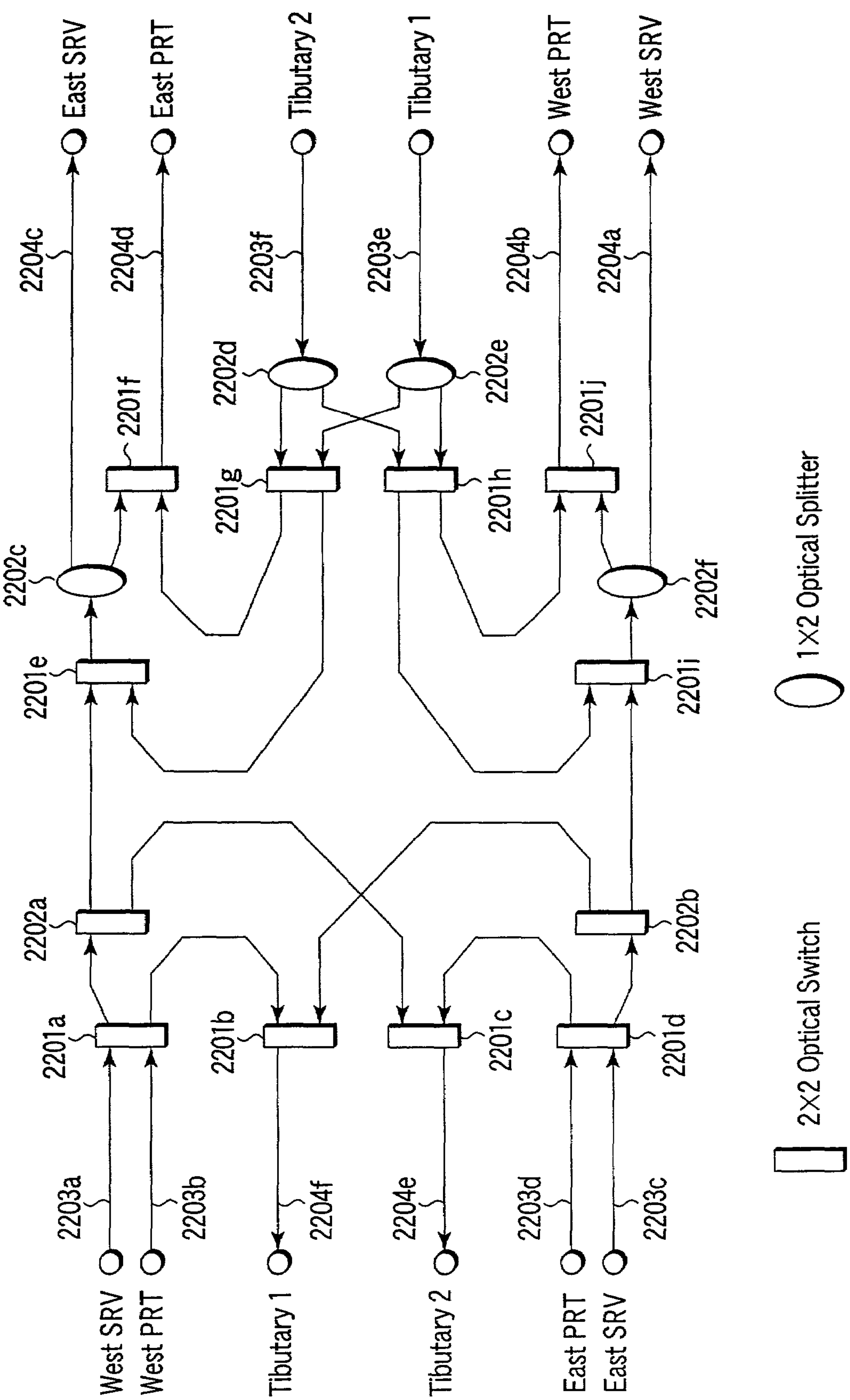
FIG. 31 is a block diagram showing the configuration of a optical switch section according to a twenty-second embodiment of the present invention.

FIG. 31 is a block diagram showing the configuration of a optical switch section according to a twenty-second embodiment of the present invention. In FIG. 31, reference numerals 2202*a* to 2202*f* indicate 1×2 optical splitters, 2201*a* to 2201*j* indicate 2×2 optical switches, 2203*a* to 2203*f* indicate input ports, and 2204*a* to 2204*f* indicate output ports.

The signal inputted to the West SRV either passes through the optical switch 2201*a*, optical splitter 2202*a*, and optical switch 2201*c* and is outputted to Tributary 1 or passes the optical switch 2201*a*, optical splitter 2202*a*, optical switch 2201*e*, and optical splitter 2202*c* and is outputted to the East SRV.

The signal inputted to Tributary 1 can pass through the optical splitter 2202*e*, optical switches 2201*h*, 2201*i*, and optical splitter 2202*f* and be outputted to the West SRV. The signal inputted to the East SRV either passes through the optical switch 2201*d*, optical splitter 2202*b*, and optical switch 2201*b* and is outputted to Tributary 2 or passes the optical switch 2201*d*, optical splitter 2202*b*, optical switch 2201*i*, and optical splitter 2202*f* and is outputted to the West SRV. The signal inputted to Tributary 2 can pass through the optical splitter 2202*d*, optical switches 2201*g*, 2201*e*, and optical splitter 2202*c* and be outputted to the East SRV.

The optical switch 2201*a* switches the optical signals from the input port 2203*a* and the input port 2203*b* between its two output terminals. The optical splitter 2202*a* splits the optical signal from one output terminal of the optical switch 2201*a* and outputs the split signals at its two output terminals. The optical switch 2201*d* switches the optical signals from the input port 2203*c* and the input port 2203*d* between its two output terminals.

The optical splitter 2202*b* splits the optical signal from one output terminal of the optical switch 2201*d* and outputs the split signals at its two output terminals. The optical switch 2201*b* selectively outputs either the optical signal from the other output terminal of the optical switch 2201*a* or the optical signal from one output terminal of the optical splitter 2202*b* to the output port 2204*f*. The optical switch 2201*c* selectively outputs either the optical signal from the other output terminal of the optical switch 2201*d* or the optical signal from one output terminal of the optical splitter 2202*a* to the output port 2204*e*.

The optical splitter 2202*d* splits the optical signal from the input port 2203*f* and outputs the split signals at its two output terminals. The optical splitter 2202*e* splits the optical signal from the input port 2203*e* and outputs the split signals at its two output terminals. The optical switch 2201*g* switches the optical signals from one output terminal of the optical splitter 2202*d* and one output terminal of the optical splitter 2202*e* between its two output terminals.

The optical switch 2201*h* switches the optical signals from the other output terminal of the optical splitter 2202*d* and the other output terminal of the optical splitter 2202*e* between its two output terminals. The optical switch 2201*e* selectively outputs either the optical signal from the other output terminal of the optical splitter 2202*a* or the optical signal from one output terminal of the optical switch 2201*g*. The optical splitter 2202*c* splits the optical signal outputted from the optical switch 2201*e* and outputs one split optical signal from one of its output terminals to the output port 2204*c* and the other split optical signal from its other output terminal.

The optical switch 2201*f* selectively outputs either the optical signal from the other output terminal of the optical splitter 2202*c* or the optical signal from the other output terminal of the optical switch 2201*g* to the output port 2204*d*. The optical switch 2201*i* selectively outputs either the optical signal from the other output terminal of the optical splitter 2202*b* or the optical signal from one output terminal of the optical switch 2201*h*. The optical splitter 2202*f* splits the optical signal outputted from the optical switch 2201*i* and outputs one split optical signal from one of its output terminals to the output port 2204*a* and the other split optical signal at its other output terminal. The optical switch 2201*j* selectively outputs either the optical signal from the other output terminal of the optical splitter 2202*f* or the optical signal from the other output terminal of the optical switch 2201*h* to the output port 2204*b*.

With this configuration, it is possible to realize the settings for Add/Drop connection and Through connection in the normal state shown in FIG. 4.

Furthermore, the signal outputted from the East SRV can be split in half by the optical splitter 2202*c* and be outputted at the East PRT. Similarly, the signal outputted from the West SRV can be split in half by the optical splitter 2202*f* and be outputted at the West PRT. In addition, the signals inputted to Tributary 1 and Tributary 2 are split in half by the optical splitters 2202*e* and 2202*d*, respectively. One split signal passes through the optical switches 2201*h* and 2201*i* and is further split in half by the optical splitter 2202*f*. Alternatively, one split signal passes through the optical switches 2201*g* and 2201*e* and is further split in half by the optical splitter 2202*c*.

Therefore, the same signal can be outputted to a maximum of four ports, that is, the West SRV, West, PRT, East SRV, and East PRT. This makes it possible to realize the bridge function.

Furthermore, with the above configuration, either the signal inputted to the West SRV or the signal inputted to the West PRT can be selectively outputted at Tributary 1 or Tributary 2. Similarly, either the signal inputted to the East SRV or the signal inputted to the East PRT can be selectively outputted at Tributary 1 or Tributary 2. This enables the switch function to be realized.

Those features make it possible to realize not only the connection setting in the failure state shown in FIG. 4 but also all the Point-to-Multi-point connection settings shown in FIG. 18.

<Embodiment to Help Explain an Optical Transmission Apparatus which Includes a Redundancy System and a Cross-connect Switch and is Applied to a 4-Fiber System>

(Twenty-third Embodiment)

Next, an embodiment of an optical transmission apparatus according to the present invention will be explained. The optical transmission apparatus explained below is provided with the optical switches described in any one of the first to twenty-second embodiments.

First, protection switching effected in the optical transmission apparatus of FIG. 5 will be described by reference to FIGS. 32 to 41. In FIGS. 32 to 41, the configuration of only the part related to one wavelength is shown for convenience's sake. Specifically, in the figures, let the number of multiplexed wavelengths on the line side (that is, the higher order side) be 1 and the number of channels on the Tributary side (that is, the lower order side) be 1.

The optical transmission apparatus of the twenty-third embodiment includes a redundancy system capable of being switched and an optical cross-connect section for assigning wavelengths between the line side and the Tributary side and is used in a 4-fiber transmission system.

Figure 32:
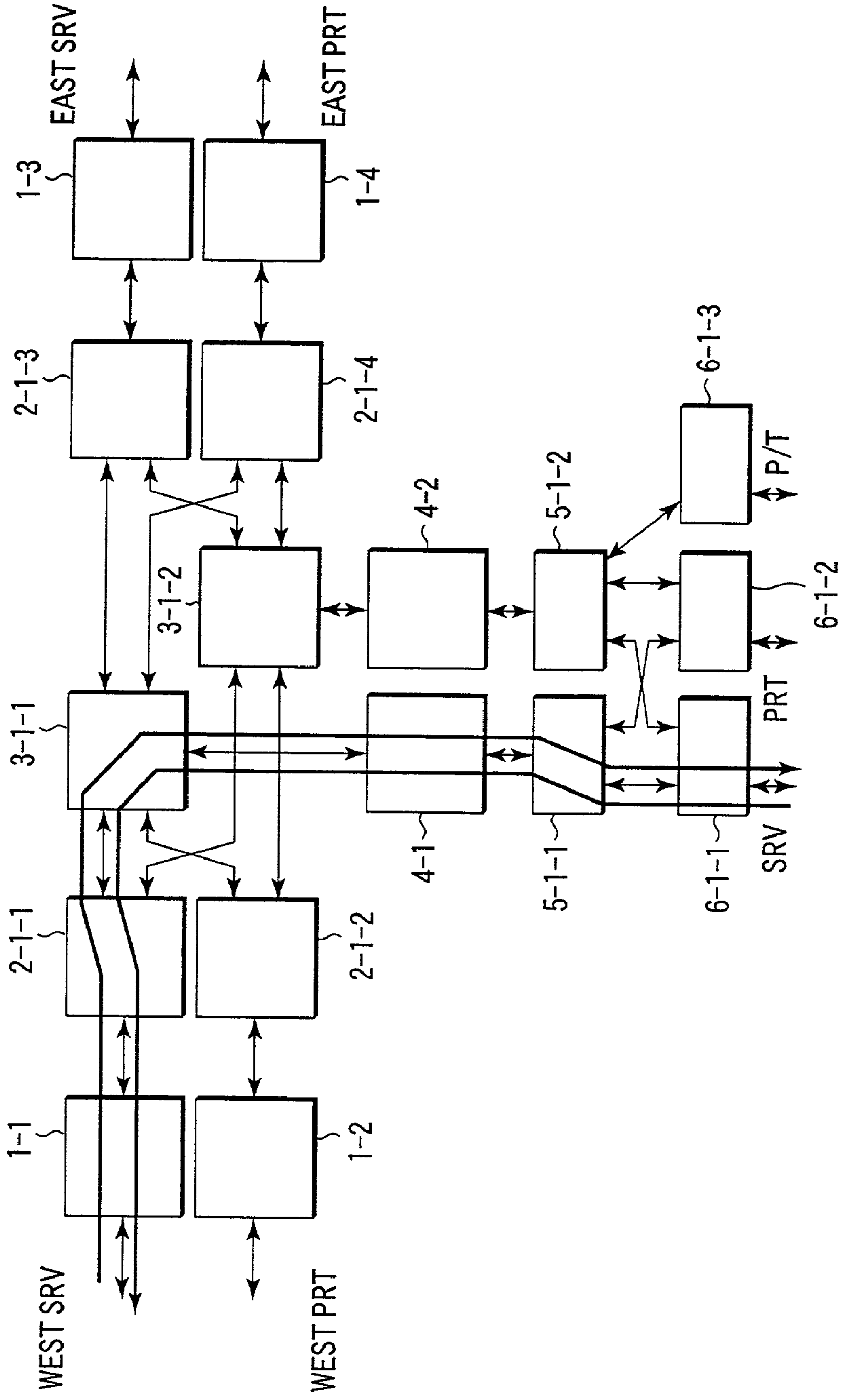
FIG. 32 shows a flow of traffic in the normal state when the optical transmission apparatus of FIG. 4 holds service traffic in the WEST direction in the form of Add/Drop.

FIG. 32 shows the flow of traffic in the normal state in a case where the optical transmission apparatus of FIG. 5 holds service traffic in the form of Add/Drop in the WEST direction. In the explanation below, it is assumed that the flow of a signal from the Tributary side to the line side is in the Add direction and the flow of a signal from the line side to the Tributary side is in the Drop direction.

[Add direction]

After the service traffic held in the tributary interface section (SRV) 6-1-1 is subjected to a signal form converting process, a signal monitoring process, or a terminating process as needed, it is split and the split signals are outputted to the tributary switch section (SRV) 5-1-1 and the tributary switch section (PRT) 5-1-2. When the tributary interface side is normal, the tributary switch section (SRV) 5-1-1 selects the signal from the tributary interface section (SRV) 6-1-1 and outputs it to the optical cross-connect section (SRV) 4-1.

The optical cross-connect section (SRV) 4-1 connects the Add-direction service traffic selected at the tributary switch section (SRV) 5-1-1 to a wavelength channel according to the connection setting and outputs the traffic to the line switch section (SRV) 3-1-1. The line switch section (SRV) 3-1-1 outputs the Add-direction service traffic from the optical cross-connect section (SRV) 4-1 to the line interface section (WEST SRV) 2-1-1.

When all the line switch section (SRV) 3-1-1, optical cross-connect section (SRV) 4-1, and tributary switch section (SRV) 5-1-1 are normal, the line interface section (West SRV) 2-1-1 selects the output from the line switch section (SRV) 3-1-1. If a failure has been sensed in any one of the function blocks, the output from the line switch section (PRT) 3-1-2 is selected. Then, after a line overhead signal is inserted into the selected output signal as needed, the resulting signal is outputted to the wavelength-division multiplexing and demultiplexing section (West SRV) 1-1.

The wavelength-division multiplexing and demultiplexing section (West SRV) 1-1 wavelength-multiplexes the signal from the line interface section (West SRV) 2-1-1 with the signal from the line interface section (West SRV) for another wavelength and outputs the resulting signal to the service line SL (WEST SRV).

[Drop Direction]

The wavelength-division multiplex signal held in the wavelength-division multiplexing and demultiplexing section (West SRV) 1-1 is subjected to wavelength demultiplexing and the resulting signal is outputted to the line interface section (West SRV) 2-1-1. The line interface section (West SRV) 2-1-1 splits the inputted signal and outputs the split signals to the line switch section (SRV) 3-1-1 and the line switch section (PRT) 3-1-2.

The line switch section (SRV) 3-1-1, in the normal state, selects the signal from the line interface section (West SRV) 2-1-1 and outputs the selected signal as service traffic in the Drop direction to the optical cross-connect section (SRV) 4-1.

The optical cross-connect section (SRV) 4-1 connects the Drop-direction service traffic from the line switch section (SRV) 3-1-1 to a tributary channel according to the connection setting and outputs the traffic to the tributary switch section (SRV) 5-1-1.

The tributary switch section (SRV) 5-1-1 splits the Drop-direction service traffic from the optical cross-connect section (SRV) 4-1 and outputs the split signals to the tributary interface section (SRV) 6-1-1 and tributary interface section (PRT) 6-1-2.

When all the line switch section (SRV) 3-1-1, optical cross-connect section (SRV) 4-1, and tributary switch section (SRV) 5-1-1 are normal, the tributary interface section (SRV) 6-1-1 selects the output from the tributary switch section (SRV) 5-1-1. If a failure has been sensed in any of the function blocks, the output from the tributary switch (PRT) 5-1-2 is selected. Then, a tributary overhead signal is inserted into the selected signal and the resulting signal is outputted as a tributary signal.

An intermediate stage of protection switching when a failure has occurred in the service line SL (WEST SRV) of FIG. 32 will be explained by reference to FIG. 33.

[Add Direction]

Only the part where the flow of service traffic differs from the state shown in FIG. 32 will be explained. The line switch section (SRV) 3-1-1 splits the Add-direction service traffic from the optical cross-connect section (SRV) 4-1 and outputs the split signals to the line interface section (WEST SRV) 2-1-1 and line interface section (WEST PRT) 2-1-2.

The operation of the line interface section (West SRV) 2-1-1 and wavelength-division multiplexing and demultiplexing section (West SRV) 1-1 is the same as in the normal state.

The line interface section (WEST PRT) 2-1-2 selects the output signal from the line switch section (SRV) 3-1-1, inserts a line overhead signal to the selected signal as needed, and outputs the resulting signal to the wavelength-division multiplexing and demultiplexing section (WEST SRV) 1-1.

The wavelength-division multiplexing and demultiplexing section (WEST PRT) 1-2 wavelength-multiplexes the signal from the line interface section (WEST PRT) 2-1-2 with the signal from the line interface section (WEST PRT) for another wavelength, and outputs the resulting signal to the protection line PL (WEST PRT).

The line switch section (SRV) 3-1-1 bridges the optical signal given via the optical cross-connect section (SRV) 4-1. This enables a node (not shown) facing the WEST side to receive service traffic via the protection line. Therefore, before switching is done to the protection line, not only can the normality of the received signal be checked, but the instantaneous cutoff time in switching can also be minimized.

[Drop Direction]

In this state, the flow of service traffic is the same as in FIG. 32.

Figure 33:
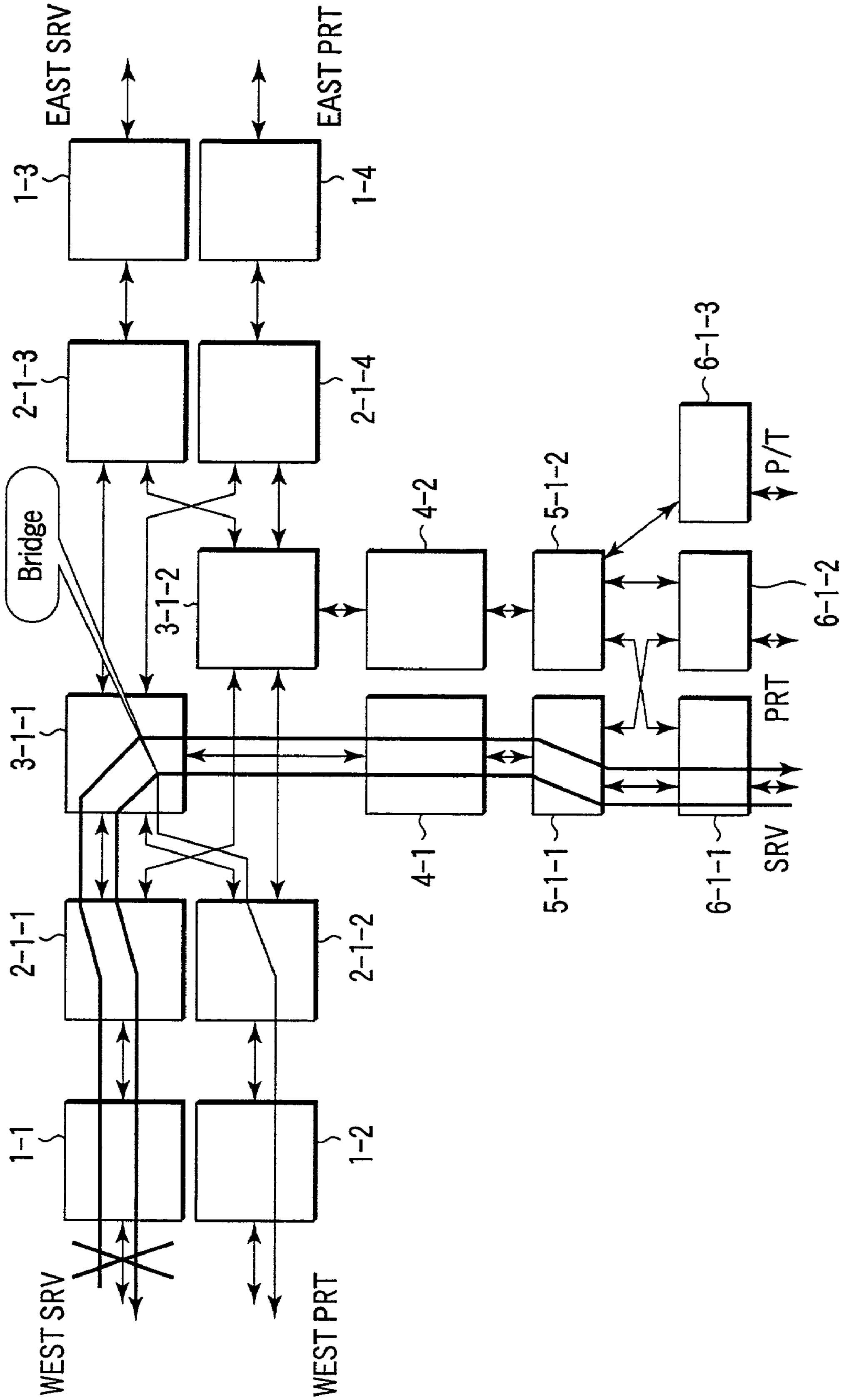
FIG. 33 shows a flow of traffic in the mid-course stage of protection switching when a failure has occurred in the service line SL (WEST SRV) in FIG. 32.
Figure 34:
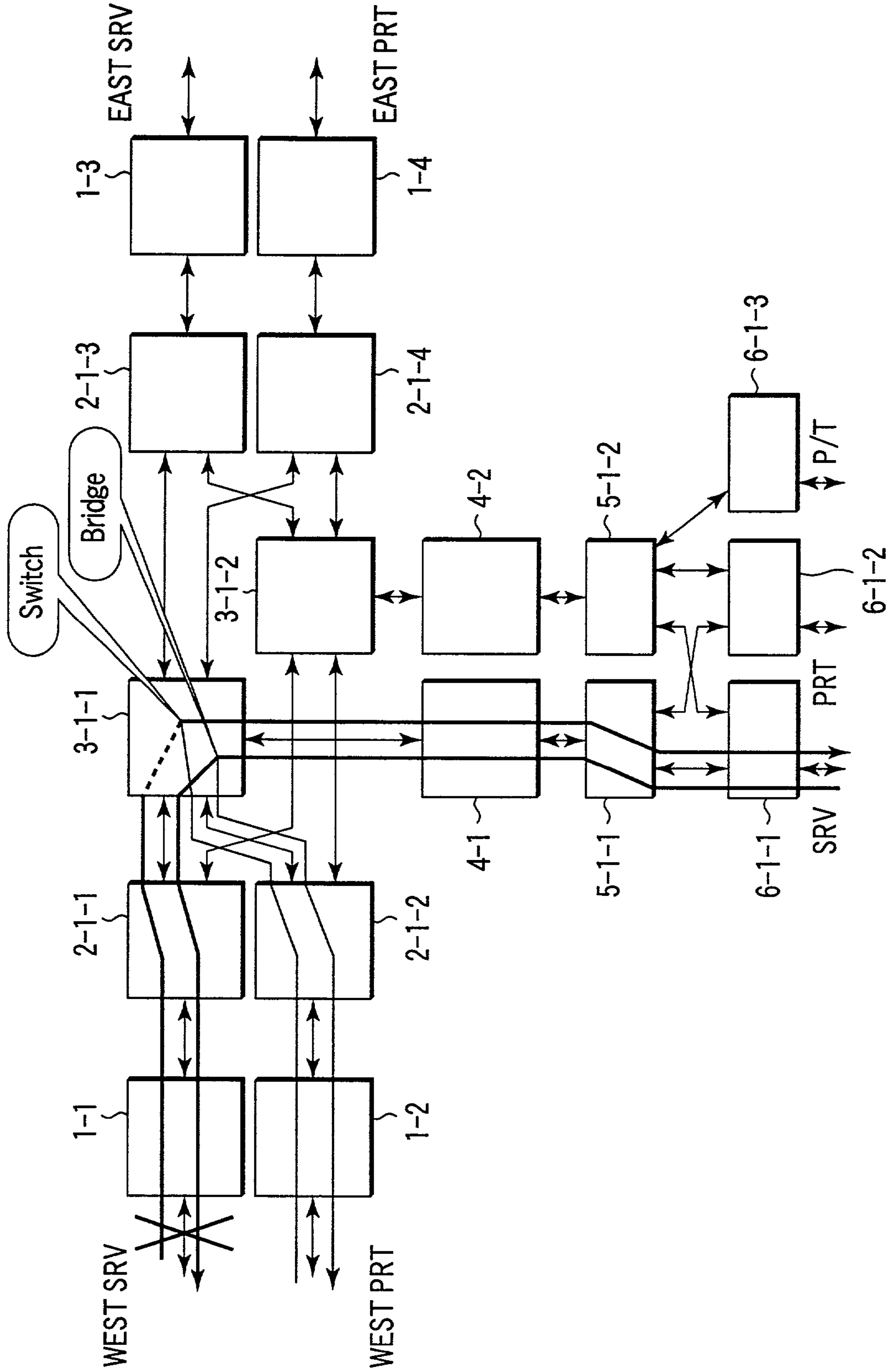
FIG. 34 shows a flow of traffic at the final stage of protection switching when a failure has occurred in the service line SL (WEST SRV) in FIG. 32.

FIG. 34 shows the state of traffic at the final stage of protection switching following FIG. 33 when a failure has occurred in the service line SL (WEST SRV).

[Add Direction]

The flow of service traffic in the Add direction is the same as in FIG. 33.

[Drop Direction]

Only the part where the flow of service traffic differs from the state of FIG. 32 will be explained. The operation of the wavelength-division multiplexing and demultiplexing section (West SRV) 1-1 and line interface section (West SRV) 2-1-1 is the same as in the normal state.

The wavelength-division multiplex signal held in the wavelength-division multiplexing and demultiplexing section (WEST PRT) 1-2 is wavelength-demultiplexed and the resulting signal is outputted to the line interface section (WEST PRT) 2-1-2. The line interface section (WEST PRT) 2-1-2 splits the received signal and outputs the split signals to the line switch section (SRV) 3-1-1 and line switch section (PRT) 3-1-2.

Because there is a failure in the service line SL (WEST SRV), the line switch section (SRV) 3-1-1 selects the signal from the line interface section (WEST PRT) 2-1-2 and outputs the selected signal as Drop-direction service traffic to the optical cross-connect section (SRV) 4-1. The processes from this point on are the same as in the normal state.

Figure 35:
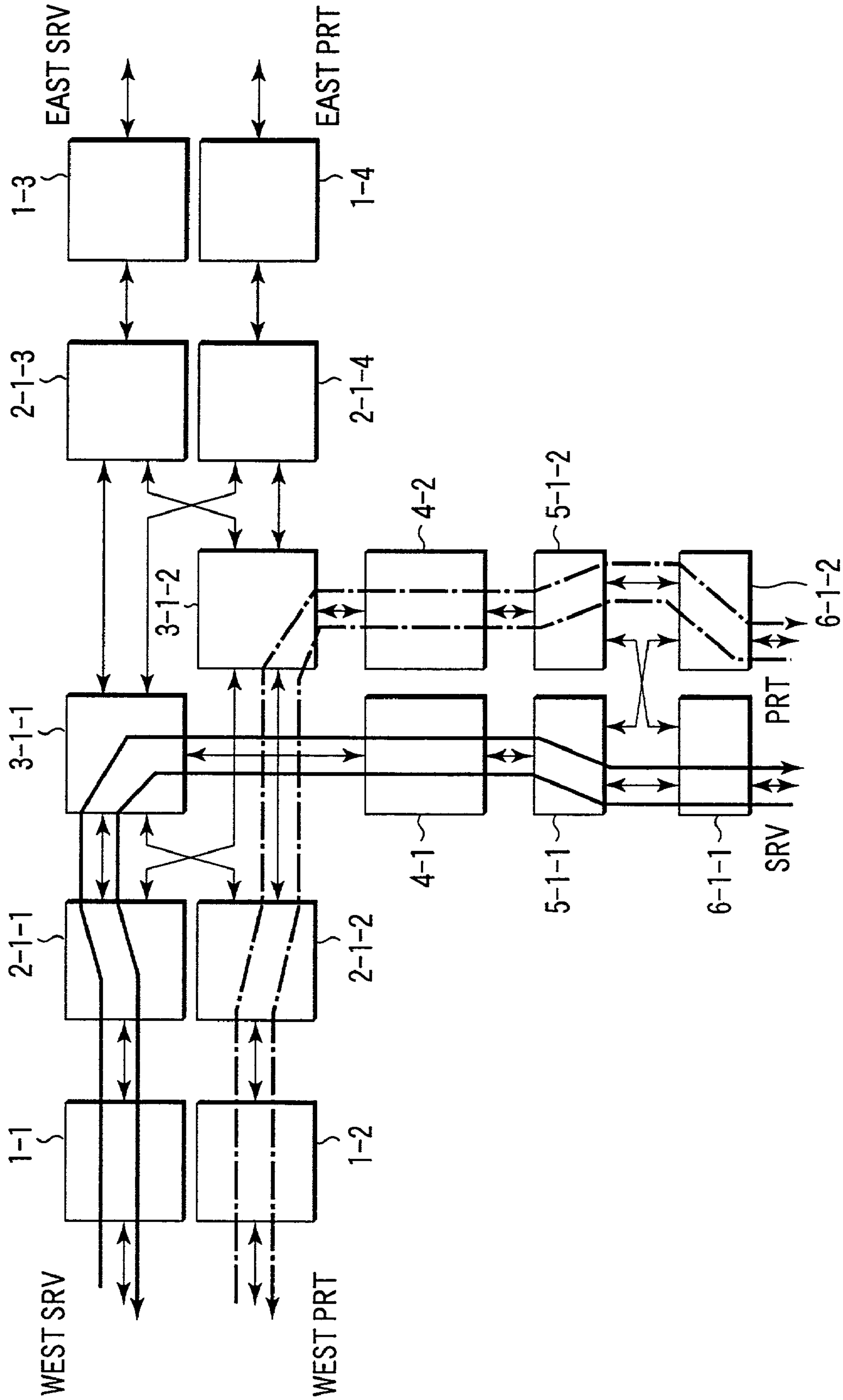
FIG. 35 shows a flow of traffic in the normal state when the optical transmission apparatus holds not only service traffic in the WEST direction in the form of Add/Drop but also part-time traffic in the WEST direction in the form of Add/Drop.

An example of setting another traffic is shown in FIG. 35. FIG. 35 shows the flow of traffic in the normal state when service traffic is held in Add/Drop form in the WEST direction and part-time traffic is held in Add/Drop form in the WEST direction.

In FIG. 35, the flow of service traffic is the same as in FIG. 32, where the protection system for the node is not used. In this case, part-time traffic can be held via the protection system. Hereinafter, the flow of part-time traffic will be explained.

[Add Direction]

The part-time traffic held in the tributary interface section (PRT) 6-1-2 is subjected to a signal form converting process, a signal monitoring process, or a terminating process as needed, and the resulting signal is outputted to the tributary switch section (PRT) 5-1-2.

When the tributary interface section (SRV) 6-1-1 is normal, the tributary switch section (PRT) 5-1-2 selects the signal from the tributary interface section (PRT) 6-1-2 and outputs the selected signal to the optical cross-connect section (PRT) 4-2.

The optical cross-connect section (PRT) 4-2 connects the Add-direction part-time traffic selected at the tributary switch section (PRT) 5-1-2 to a wavelength channel according to the connection setting and outputs the traffic to the line switch section (PRT) 3-1-2.

The line switch section (PRT) 3-1-2 outputs the Add-direction part-time traffic from the optical cross-connect section (PRT) 4-2 to the line interface section (WEST PRT) 2-1-2.

The line interface section (WEST PRT) 2-1-2, in the normal state, selects the signal from the line switch section (PRT) 3-1-2, inserts a line overhead signal into the selected signal, and outputs the resulting signal to the wavelength-division multiplexing and demultiplexing section (WEST PRT) 1-2.

The wavelength-division multiplexing and demultiplexing section (WEST PRT) 1-2 wavelength-multiplexes the signal from the line interface section (WEST PRT) 2-1-2 with the signal from the line interface section (WEST PRT) for another wavelength and outputs the resulting signal to the protection line PL (WEST PRT).

[Drop Direction]

The wavelength-division multiplex signal held in the wavelength-division multiplexing and demultiplexing section (WEST PRT) 1-2 is wavelength-demultiplexed and the resulting signal is outputted to the line interface section (WEST PRT) 2-1-2. The line interface section (WEST PRT) 2-1-2 splits the received signal and outputs the split signals to the line switch section (SRV) 3-1-1 and line switch section (PRT) 3-1-2.

When the line switch section (SRV) 3-1-1, optical cross-connect section (SRV) 4-1, and tributary switch section (SRV) 5-1-1 are normal, the line switch section (PRT) 3-1-2 selects the signal from the line interface section (WEST PRT) 2-1-2 and outputs the selected signal as Drop-direction part-time traffic to the optical cross-connect section (PRT) 4-2.

The optical cross-connect section (PRT) 4-2 connects the Drop-direction part-time traffic from the line switch section (PRT) 3-1-2 to a tributary channel according to the connecting setting and outputs the traffic to the tributary switch section (PRT) 5-1-2.

The tributary switch section (PRT) 5-1-2 splits the Drop-direction part-time traffic from the optical cross-connect section (PRT) 4-2 and outputs the split signals to the tributary interface section (SRV) 6-1-1 and tributary interface section (PRT) 6-1-2.

When the line switch section (SRV) 3-1-1, optical cross-connect section (SRV) 4-1, and tributary switch section (SRV) 5-1-1 are normal, the tributary interface section (PRT) 6-1-2 selects the output signal from the tributary switch section (PRT) 5-1-2, inserts a tributary overhead signal into the selected signal as needed, and outputs the resulting signal to the tributary line protection system.

Figure 36:
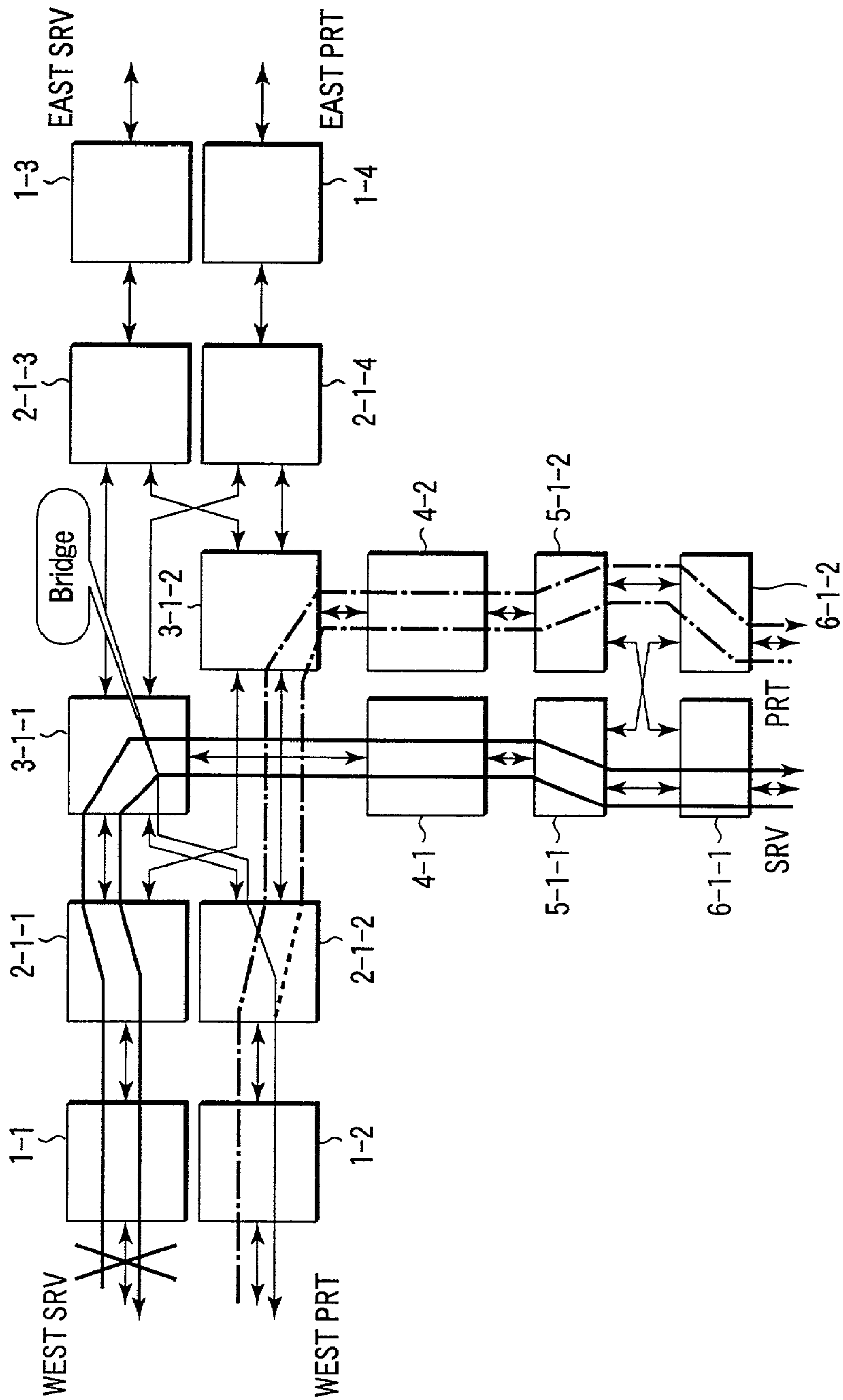
FIG. 36 shows a flow of traffic in the mid-course stage of protection switching when a failure has occurred in the service line SL (WEST SRV) in FIG. 35.

FIG. 36 shows the flow of traffic at an intermediate stage of protection switching when a failure has occurred in the service line SL (WEST SRV) in the state shown in FIG. 35. The flow of service traffic is the same as in FIG. 33. Hereinafter, only the part where the flow of part-time traffic differs from the state shown in FIG. 35 will be explained.

[Add Direction]

As a result of a failure in the service line SL (WEST SRV), the line interface section (WEST PRT) 2-1-2 selects the signal from the line switch section (SRV) 3-1-1 to bridge service traffic to the protection line PL (WEST PRT). Then, the line interface section (WEST PRT) 2-1-2 inserts a line overhead signal into the selected signal as needed and outputs the service traffic to the wavelength-division multiplexing and demultiplexing section (WEST PRT) 1-2.

The wavelength-division multiplexing and demultiplexing section (WEST PRT) 1-2 wavelength-multiplexes the signal from the line interface section (WEST PRT) 2-1-2 with the signal from the line interface section (WEST PRT) for another wavelength and outputs the resulting signal to the protection line PL (WEST PRT).

At this stage, the part-time traffic being transmitted via the protection line PL (WEST PRT) is cut off.

[Drop Direction]

In this state, the flow of part-time traffic is the same as in FIG. 35.

Figure 37:
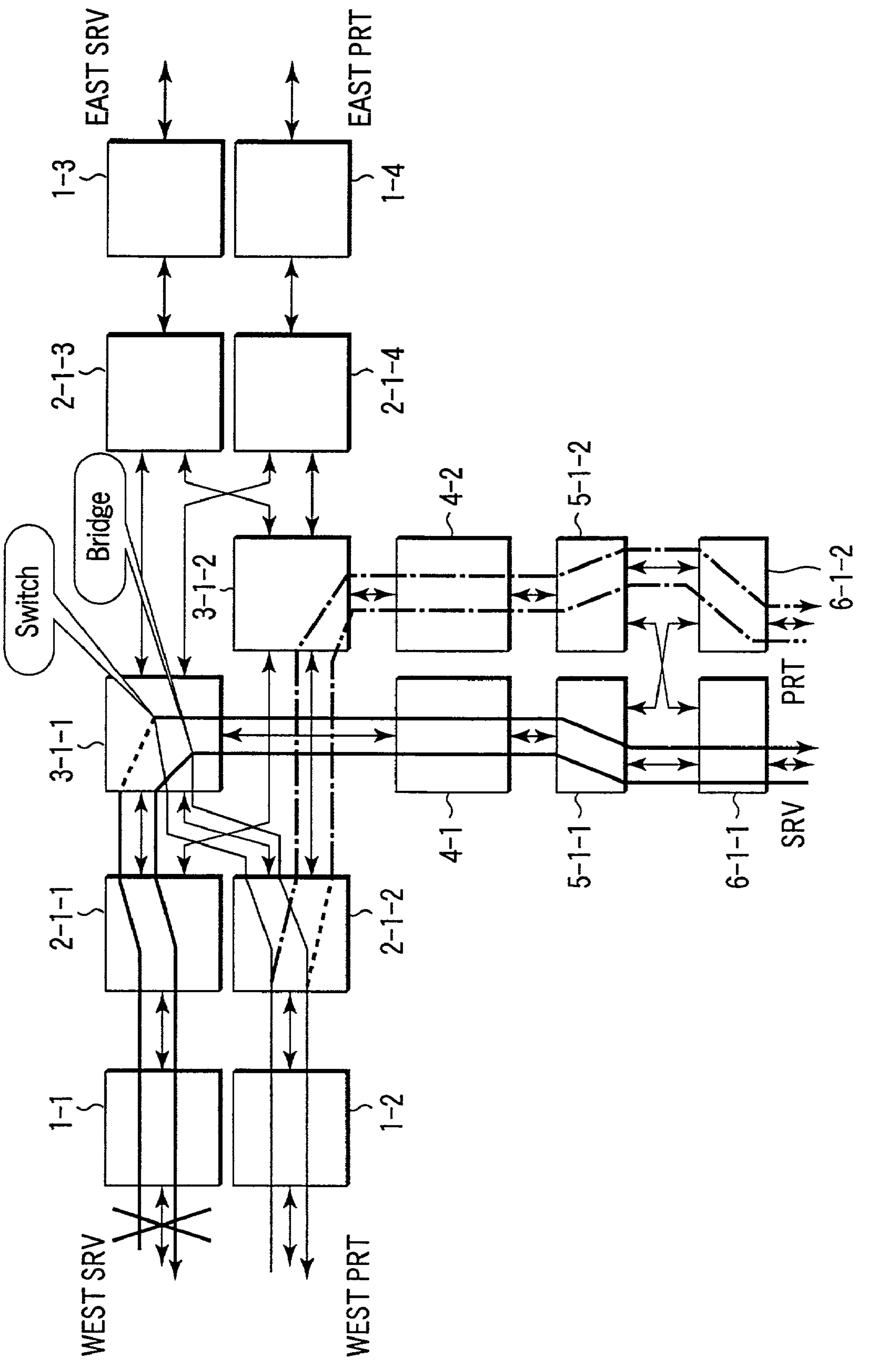
FIG. 37 shows a flow of traffic at the final stage of protection switching when a failure has occurred in the service line SL (WEST SRV) in FIG. 35.

FIG. 37 shows the flow of traffic at the final stage of protection switching when a failure has occurred in the service line SL (WEST SRV) in the state shown in FIG. 35. The flow of service traffic is the same as in FIG. 34. Hereinafter, only the part where the flow of part-time traffic differs from the state shown in FIG. 36 will be explained.

[Add Direction]

The flow of part-time traffic in the Add direction is the same as in FIG. 36.

[Drop Direction]

Since at a node (not shown) facing the WEST side, service traffic has been bridged to the protection line at the stage shown in FIG. 36, part-time traffic cannot be received via the protection line PL (West PRT).

Figure 38:
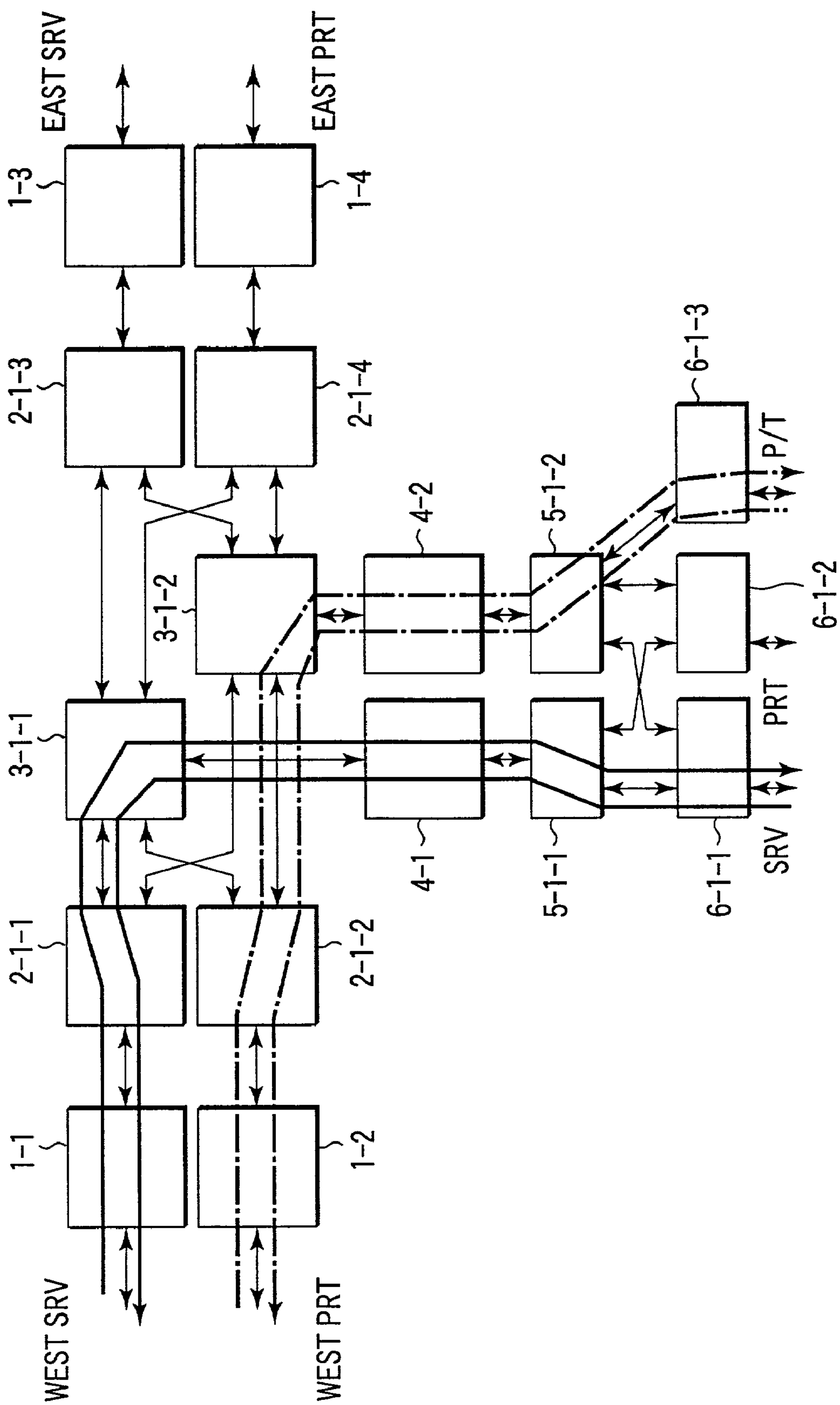
FIG. 38 shows a flow of traffic in the normal state when the optical transmission apparatus holds not only service traffic in the WEST direction in the form of Add/Drop but also part-time traffic in the WEST direction in the form of Add/Drop.

FIG. 38 shows the flow of traffic in the normal state when service traffic is held in Add/Drop form in the WEST direction and part-time traffic is held in Add/Drop form in the WEST direction.

In FIG. 38, the flow of service traffic is the same as in FIG. 32, where the protection system for the node is not used. In this case, part-time traffic can be held via the protection system. Hereinafter, the flow of part-time traffic will be explained.

[Add Direction]

The part-time traffic held in the tributary interface section (P/T) 6-1-3 is subjected to a signal form converting process, a signal monitoring process, or a terminating process as needed, and the resulting signal is outputted to the tributary switch section (PRT) 5-1-2.

When the tributary interface section (SRV) is normal, the tributary switch section (PRT) 5-1-2 selects the signal from the tributary interface section (P/T) 6-1-3 and outputs the selected signal to the optical cross-connect section (PRT) 4-2.

The optical cross-connect section (PRT) 4-2 connects the Add-direction part-time traffic selected at the tributary switch section (PRT) 5-1-2 to a wavelength channel according to the connection setting and outputs the traffic to the line switch section (PRT) 3-1-2.

The line switch section (PRT) 3-1-2 outputs the Add-direction part-time traffic from the optical cross-connect section (PRT) 4-2 to the line interface section (WEST PRT) 2-1-2.

The line interface section (WEST PRT) 2-1-2, in the normal state, selects the signal from the line switch section (PRT) 3-1-2, inserts a line overhead signal into the selected signal, and outputs the resulting signal to the wavelength-division multiplexing and demultiplexing section (WEST PRT) 1-2.

The wavelength-division multiplexing and demultiplexing section (WEST PRT) 1-2 wavelength-multiplexes the signal from the line interface section (WEST PRT) 2-1-2 with the signal from the line interface section (WEST PRT) for another wavelength and outputs the resulting signal to the protection line PL (WEST PRT).

[Drop Direction]

The wavelength-division multiplex signal held in the wavelength-division multiplexing and demultiplexing section (WEST PRT) 1-2 is wavelength-demultiplexed and the resulting signal is outputted to the line interface section (WEST PRT) 2-1-2.

The line interface section (WEST PRT) 2-1-2 splits the inputted signal and outputs the split signals to the line switch section (SRV) 3-1-1 and line switch section (PRT) 3-1-2.

When the line switch section (SRV) 3-1-1, optical cross-connect section (SRV) 4-1, and tributary switch section (SRV) 5-1-1 are normal, the line switch section (PRT) 3-1-2 selects the signal from the line interface section (WEST PRT) 2-1-2 and outputs the selected signal as Drop-direction part-time traffic to the optical cross-connect section (PRT) 4-2.

The optical cross-connect section (PRT) 4-2 connects the Drop-direction part-time traffic from the line switch section (PRT) 3-1-2 to a tributary channel according to the connecting setting and outputs the traffic to the tributary switch section (PRT) 5-1-2.

The tributary switch section (PRT) 5-1-2 outputs the Drop-direction part-time traffic from the optical cross-connect section (PRT) 4-2 to the tributary interface section (P/T) 6-1-3.

When the line switch section (SRV) 3-1-1, optical cross-connect section (SRV) 4-1, and tributary switch section (SRV) 5-1-1 are normal, the tributary interface section (P/T) 6-1-3 selects the output signal from the tributary switch section (PRT) 5-1-2, inserts a tributary overhead signal into the selected signal as needed, and outputs the resulting signal to the tributary line (P/T).

Figure 39:
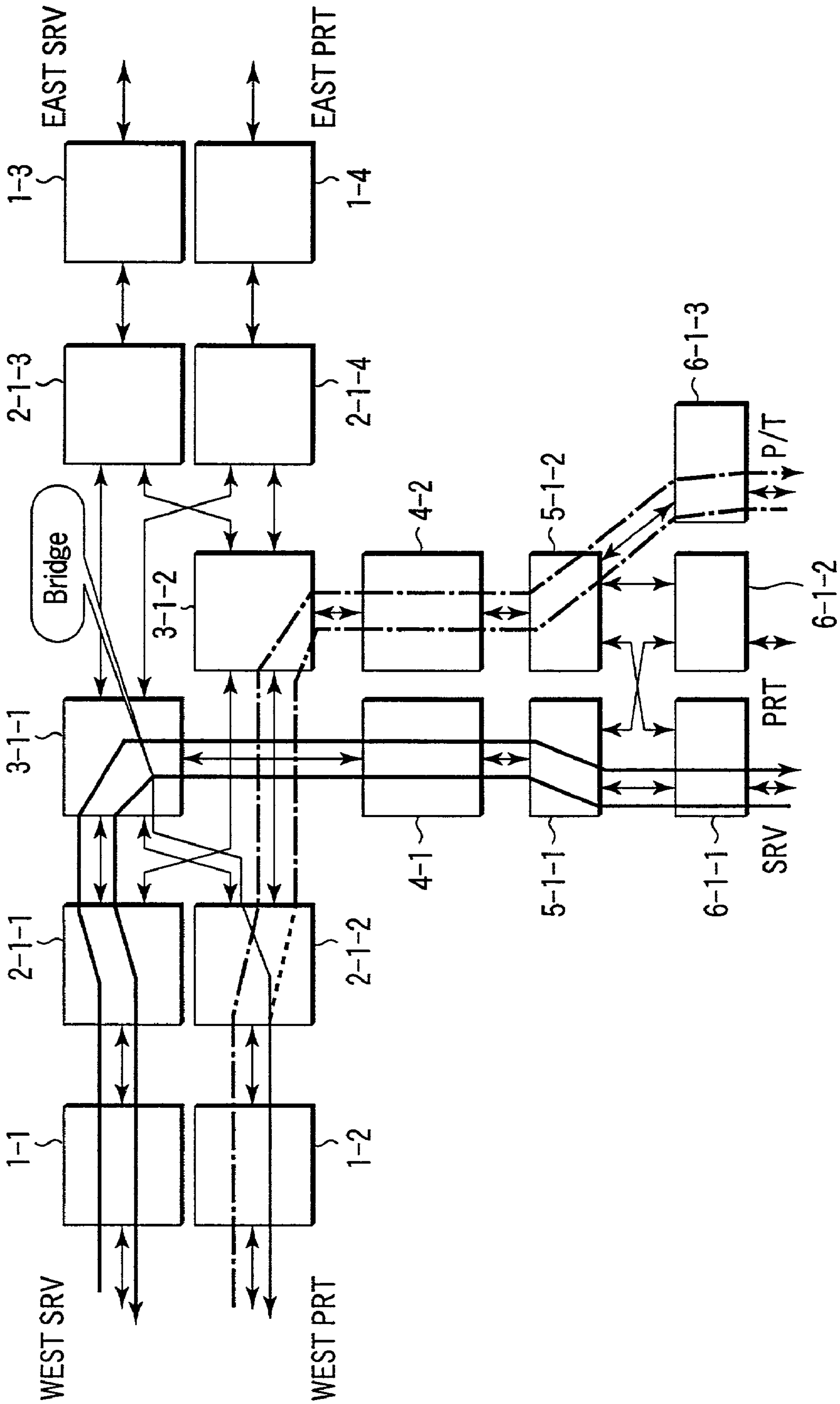
FIG. 39 shows a flow of traffic in the mid-course stage of protection switching when a failure has occurred in the service line SL (WEST SRV) in FIG. 38.

FIG. 39 shows the flow of traffic at an intermediate stage of protection switching when a failure has occurred in the service line SL (WEST SRV) in the state shown in FIG. 38. The flow of service traffic is the same as in FIG. 33. Hereinafter, only the part where the flow of part-time traffic differs from the state shown in FIG. 38 will be explained.

[Add Direction]

As a result of a failure in the service line SL (WEST SRV), the line interface section (WEST PRT) 2-1-2 selects the signal from the line switch section (SRV) 3-1-1 to bridge service traffic to the protection line PL (WEST PRT). Then, the line interface section (WEST PRT) 2-1-2 inserts a line overhead signal into the selected signal as needed and outputs the service traffic to the wavelength-division multiplexing and demultiplexing section (WEST PRT) 1-2.

The wavelength-division multiplexing and demultiplexing section (WEST PRT) 1-2 wavelength-multiplexes the signal from the line interface section (WEST PRT) 2-1-2 with the signal from the line interface section (WEST PRT) for another wavelength and outputs the resulting signal to the protection line PL (WEST PRT).

At this stage, the part-time traffic being transmitted via the protection line PL (WEST PRT) is cut off.

[Drop Direction]

In this state, the flow of part-time traffic is the same as in FIG. 38.

Figure 40:
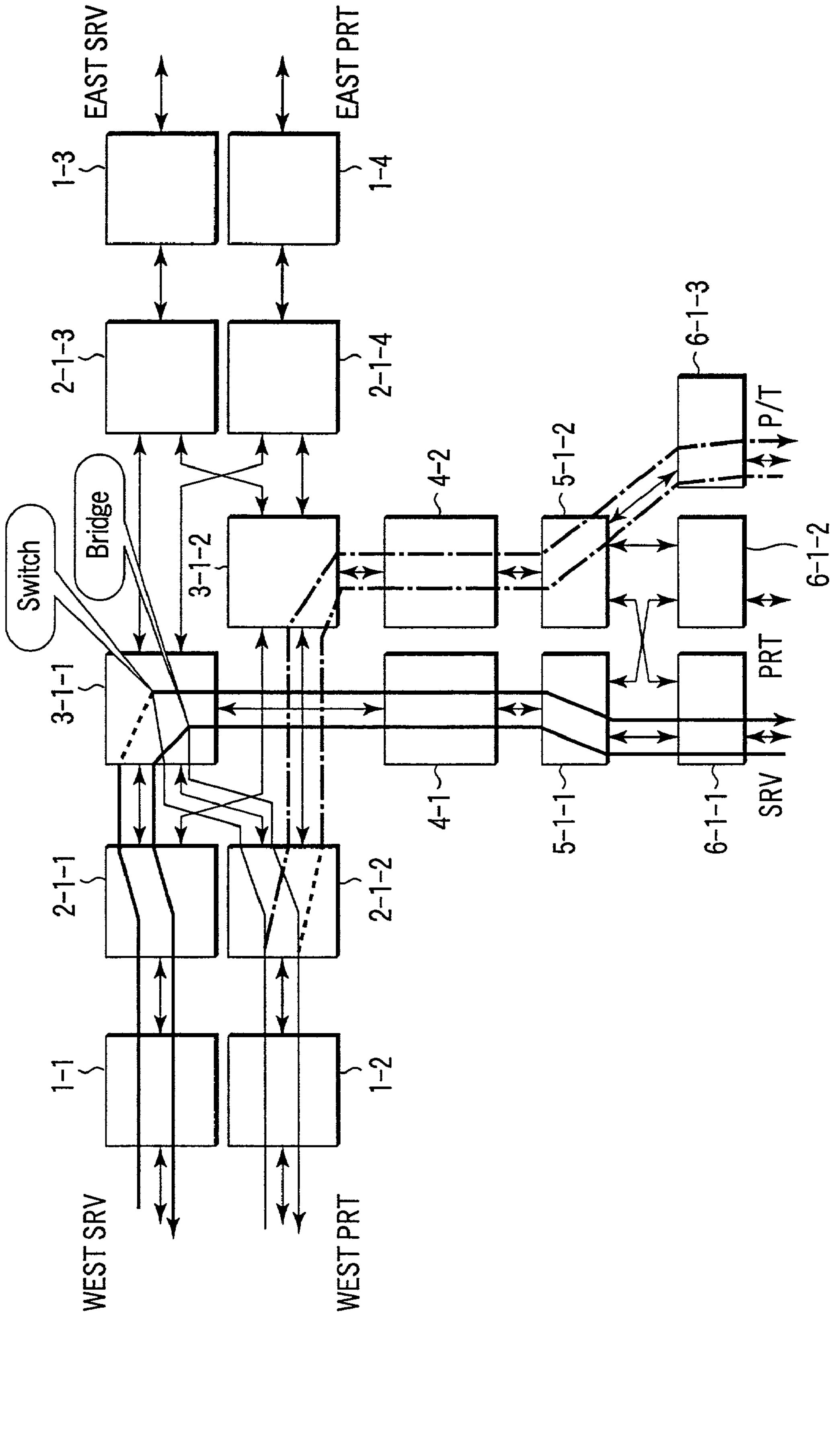
FIG. 40 shows a flow of traffic at the final stage of protection switching when a failure has occurred in the service line SL (WEST SRV) in FIG. 38.

FIG. 40 shows the flow of traffic at the final stage of protection switching when a failure has occurred in the service line SL (WEST SRV) in the state shown in FIG. 38. The flow of service traffic is the same as in FIG. 34. Hereinafter, only the part where the flow of part-time traffic differs from the state shown in FIG. 39 will be explained.

[Add Direction]

The flow of part-time traffic in the Add direction is the same as in FIG. 39.

[Drop Direction]

Since at a node (not shown) facing the WEST side, service traffic has been bridged to the protection line at the stage shown in FIG. 39, part-time traffic cannot be received via the protection line PL (West PRT).

Figure 41:
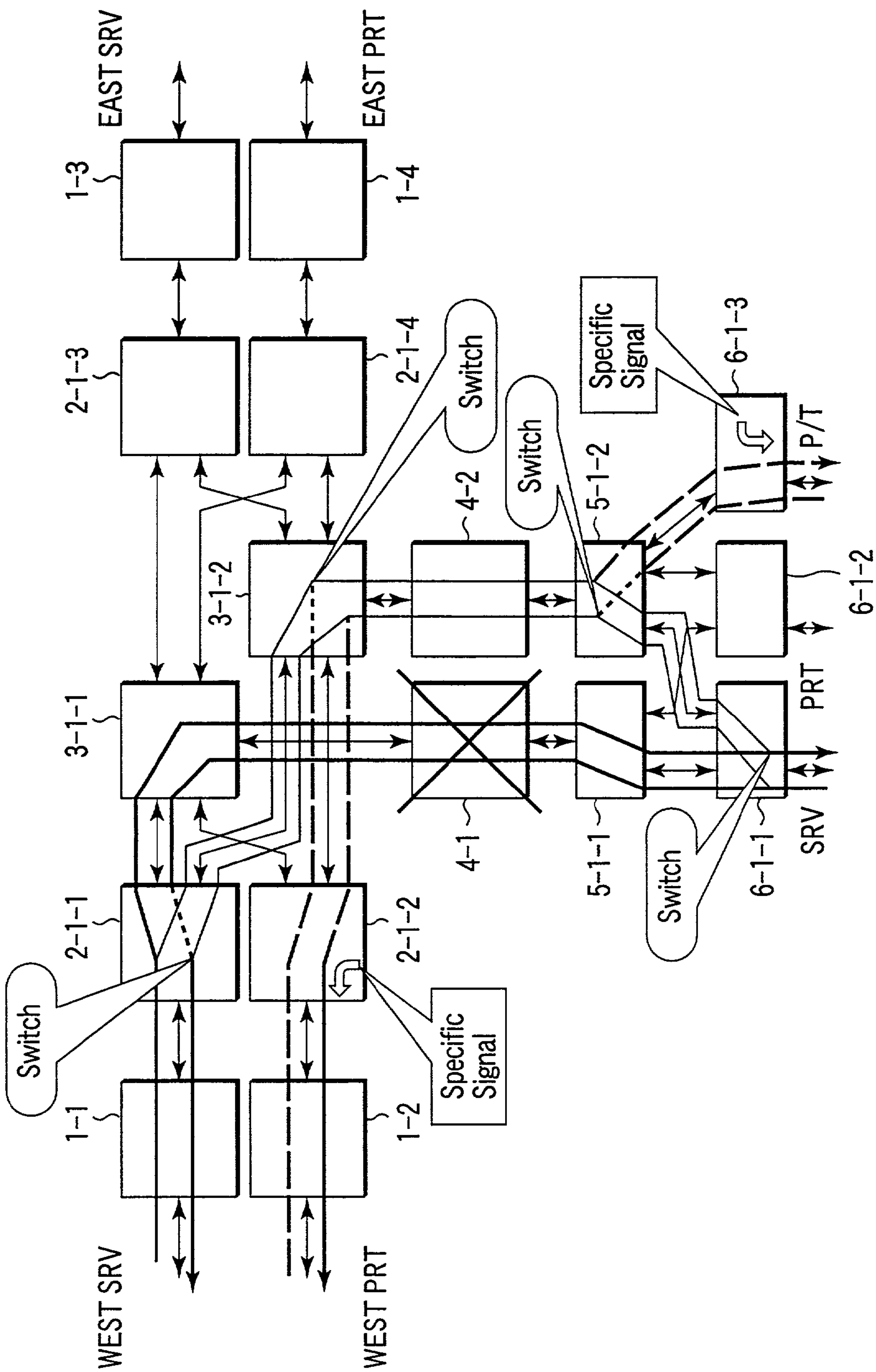
FIG. 41 shows a flow of traffic in the normal state, when the optical transmission apparatus holds not only service traffic in the WEST direction in the form of Add/Drop but also part-time traffic in the WEST direction in the form of Add/Drop and when a failure has occurred in the optical cross-connect section (SRV) 4-1 with a redundant configuration within the node and the service traffic is switched to the protection-system function block side.

FIG. 41 shows the flow of traffic when a node holds service traffic in Add/Drop form in the WEST direction and the node holds part-time traffic in Add/Drop form in the WEST direction and when a failure has occurred in the optical cross-connect section (SRV) 4-1 using a redundancy configuration in the node and therefore the service traffic has been switched to the protection-system function block side.

FIG. 41 also shows a specific signal inserting function for preventing the misconnection between service traffic and part-time traffic during protection switching.

The specific signal inserting function can be applied to not only a case where a failure has occurred in a function block using a redundancy configuration in the node explained later but also a case where part-time traffic is held as shown in FIGS. 36, 37, 39, and 40 and service traffic is processed by a protection-system function block.

A signal obtaining by collapsing the information in the payload of a transmission frame, such as P-AIS (Path Alarm Indication Signal) or UNEQ (Unequipped) in a conventional SDH transmission system, may be used as the specific signal.

[Add Direction]

In FIG. 41, after the service traffic held in the tributary interface section (SRV) 6-1-1 is subjected to a signal form converting process, a signal monitoring process, or a terminating process as needed, the resulting traffic is split and the split signals are outputted to the tributary switch section (SRV) 5-1-1 and tributary switch section (PRT) 5-1-2.

The operations of the tributary switch section (SRV) 5-1-1, optical cross-connect section (SRV) 4-1, and line switch section (SRV) 3-1-1 are the same as those before protection switching (see FIG. 32).

When the tributary interface side is normal, the tributary switch section (PRT) 5-1-2 selects the signal from the tributary interface section (SRV) 6-1-1 and outputs the selected signal to the optical cross-connect section (PRT) 4-2.

The optical cross-connect section (PRT) 4-2 connects the Add-direction service traffic selected at the tributary switch section (PRT) 5-1-2 to a wavelength channel according to the connection setting and outputs the traffic to the line switch section (PRT) 3-1-2.

The line switch section (PRT) 3-1-2 outputs the Add-direction service traffic from the optical cross-connect section (PRT) 4-2 to the line interface section (WEST SRV) 2-1-2.

Because a failure has been sensed in the optical cross-connect section (SRV) 4-1, the line interface section (West SRV) 2-1-1 selects the signal from the line switch section (PRT) 3-1-2, inserts a line overhead signal into the selected signal, and outputs the resulting signal to the wavelength-division multiplexing and demultiplexing section (West SRV) 1-1.

The wavelength-division multiplexing and demultiplexing section (West SRV) 1-1 wavelength-multiplexes the signal from the line interface section (West SRV) 2-1-1 with the signal from the line interface section (West SRV) for another wavelength and outputs the resulting signal to the service line SL (WEST SRV).

Because the line switch section (PRT) 3-1-2, optical cross-connect section (PRT) 4-2, and tributary switch section (PRT) 5-1-2 are used as a detour circuit for service traffic due to a failure in the optical cross-connect section (SRV) 4-1, part-time traffic cannot be transmitted.

At this time, the line interface section (WEST PRT) 2-1-2 inserts a specific signal into the protection line, thereby preventing service traffic from flowing into the protection line PL (WEST PRT). The time that the specific signal is inserted is before protection switching is started and the time that the insertion of the specific signal is stopped is after the completion of revertive switching.

Inserting the specific signal prevents the misconnection between service traffic and part-time traffic in the Add direction.

[Drop Direction]

The wavelength-division multiplex signal held in the wavelength-division multiplexing and demultiplexing section (West SRV) 1-1 is wavelength-demultiplexed and the resulting signal is outputted to the line interface section (West SRV) 2-1-1.

The line interface section (West SRV) 2-1-1 subjects the inputted signal to a terminating process as needed, splits the resulting signal, and outputs the split signals to the line switch section (SRV) 3-1-1 and line switch section (PRT) 3-1-2.

The operations of the line switch section (SRV) 3-1-1, optical cross-connect section (SRV) 4-1, and tributary switch section (SRV) 5-1-1 are the same as those before protection switching (see FIG. 32).

Because a failure has occurred in the optical cross-connect section (SRV) 4-1, the line switch section (SRV) 3-1-2 selects the signal from the line interface section (West SRV) 2-1-1 and outputs the selected signal as the Drop-direction service traffic to the optical cross-connect section (PRT) 4-2.

The optical cross-connect section (PRT) 4-2 connects the Drop-direction service traffic from the line switch section (SRV) 3-1-1 to a tributary channel according to the connection setting and outputs the traffic to the tributary switch section (PRT) 5-1-2.

The tributary switch section (PRT) 5-1-2 splits the Drop-direction service traffic from the optical cross-connect section (PRT) 4-2 and outputs the split signals to the tributary interface section (SRV) 6-1-1 and tributary interface section (PRT) 6-1-2.

Because a failure has been sensed in the optical cross-connect section (SRV) 4-1, the tributary interface section (SRV) 6-1-1 selects the signal from the tributary switch section (PRT) 5-1-2, inserts a tributary overhead signal into the selected signal as needed, and outputs the tributary signal.

Because the line switch section (PRT) 3-2, optical cross-connect section (PRT) 4-2, and tributary switch section (PRT) 5-1-2 are used as a detour circuit for service traffic due to a failure in the optical cross-connect section (SRV) 4-1, part-time traffic cannot be transmitted.

At this time, the tributary interface section (P/T) 6-1-3 inserts a specific signal, thereby preventing service traffic from flowing into the tributary part-time line.

The time that the specific signal is inserted is before protection switching is started and the time that the insertion of the specific signal is stopped is after the completion of revertive switching. This prevents the misconnection between service traffic and part-time traffic in the Drop direction.

<Embodiment to Help Explain an Optical Transmission Apparatus which Includes a Redundancy System and a Cross-connect Switch and is Applied to a 2-Fiber System>

(Twenty-fourth Embodiment)

Next, another embodiment of an optical transmission apparatus according to the present invention will be explained. The optical transmission apparatus of the twenty-fourth embodiment includes a switchable redundancy system and an optical cross-connect section for assigning wavelengths between the line side and the tributary side and is used in a 2-fiber transmission system.

FIG. 42 is a block diagram showing another configuration of an optical transmission apparatus according to the present invention. The optical transmission apparatus comprises wavelength-division multiplexing and demultiplexing sections (WEST: 1-1, EAST: 1-3), line redundancy units 7-1 to 7-s, tributary interface sections (ch 1 SRV: 6-1-1, ch 1 PRT: 6-1-2, ch 1 P/T use: 6-1-3), tributary switch sections (ch 1 SRV: 5-1-1, ch 1 PRT: 5-1-2, . . . (holding the tributaries for t channels)), and optical cross-connect sections (SRV: 4-1, PRT: 4-2).

The wavelength-division multiplexing and demultiplexing sections 1-1, 1-3 carry out a wavelength-division multiplexing/demultiplexing process of a wavelength-division multiplex signal whose degree of multiplexing is S (S is a natural number). The tributary interface sections 6-1-1, 6-1-2, 6-1-3 interface with the tributary side. The tributary switch sections 5-1-1 and 5-1-2 effects protection switching on the tributary side. The optical cross-connect sections 4-1, 4-2 connect the channels on the tributary interface side arbitrarily with the line switch sections provided for the respective wavelengths.

The line redundancy units 7-1 to 7-s each include line interface sections (WEST SRV: 2-1-1, WEST PRT: 2-1-2, EAST SRV:2-1-3, EAST PRT:2-1-4) for interfacing with the line side using specific wavelengths and line switch sections (SRV: 3-1-1, PRT: 3-2-2).

Here, the line switch sections (SRV) 3-1-1, 3-2-2 take the configuration of any one of the first to twenty-third embodiments. Therefore, the optical transmission apparatus of the twenty-fourth embodiment can not only make an Add/Drop/Through connection of the signal of each wavelength from the line interface section but also bridge the signal.

The basic operation of the optical transmission apparatus shown in FIG. 42 will be explained. Here, only the operation when a tributary signal is added or dropped to a line on the WEST side will be described.

[Add Direction]

In FIG. 42, after the service traffic held in the tributary interface sections (SRV) 6-1-1 and 6-1-2 is subjected to a signal form converting process, a signal monitoring process, and a terminating process as needed, the traffic is split and the split signals are outputted to the tributary switch section (SRV) 5-1-1 and tributary switch section (PRT) 5-1-2. When the tributary interface side is normal, the tributary switch section (SRV) 5-1-1 selects the signal from the tributary interface section (SRV) 6-1-1 and outputs the selected signal to the optical cross-connect section (SRV) 4-1. The optical cross-connect section (SRV) 4-1 connects the signal selected at the tributary switch section (SRV) 5-1-1 to the line redundancy unit 7-1 according to the connection setting.

The line switch section (SRV) 3-1-1 connects the service traffic to the line interface section (SRV) 2-1-1 according to the connection setting. The line interface section (SRV) 2-1-1 converts the signal form of the inputted signal as needed and outputs the converted signal as a signal of a specific wavelength.

The wavelength-division multiplexing and demultiplexing section 1-1 wavelength-multiplexes the signal inputted from the line interface section (SRV) 2-1-1 with the signal from the line interface section for another wavelength and outputs the resulting signal to the transmission line.

In this state, the redundancy function part and the line-side protection wavelength are in the unused state. Therefore, an unused protection-system function block can perform signal processing related to the extra traffic held in the tributary interface section (PRT) 6-1-2 or the part-time traffic held in the tributary interface section (P/T) 6-1-3.

In this state, if a failure has occurred in the WEST-side line or the line interface section (SRV) 2-1-1, the line switch section (SRV) 3-1-1 detours the path to the line interface section 2-1-2. Furthermore, if a failure has occurred in the WEST-side line, the line switch section (SRV) 3-1-1 detours the path to the line interface section (WEST PRT) 2-1-4.

[Drop Direction]

In FIG. 42, the wavelength-division multiplex light inputted to the wavelength-division multiplexing and demultiplexing section 1-1 is demultiplexed in wavelength units and one of the demultiplexed signals is inputted to the line interface section (WEST SRV) 2-1-1. The line interface section (WEST SRV) 2-1-1 converts the signal form of the inputted signal as needed, splits the converted signal, and outputs the split signals to the line switch section (SRV) 3-1-1 and line switch section (PRT) 3-1-2. The line switch section (SRV) 3-1-1 outputs the inputted signal to the optical cross-connect section (SRV) 4-1 according to the connection setting.

The optical cross-connect section (SRV) 4-1 outputs the inputted signal to the tributary switch section (SRV) 5-1-1 according to the connection setting. The tributary switch section (SRV) 5-1-1 splits the signal from the optical cross-connect section (SRV) 4-1 and outputs the split signals to the tributary interface section (SRV) 6-1-1 and tributary interface section (PRT) 6-1-2. Each tributary interface section converts the signal form of the received signal as needed and outputs the converted signal to an external unit.

In this state, the redundancy function part and the line-side protection-system wavelength are in the unused state. Therefore, an unused protection-system function block can perform signal processing related to the extra traffic or part-time traffic transmitted using a protection wavelength.

In this state, if a failure has occurred in the line interface section (WEST SRV) 2-1-1, the line switch section (SRV) 3-1-1 outputs the path detoured from the line interface section 2-1-2 to optical cross-connect section (SRV) 4-1. Furthermore, if a failure has occurred in the WEST-side line, the line switch section (SRV) 3-1-1 outputs the path detoured from the line interface section (WEST PRT) 2-1-4 to the optical cross-connect section (SRV) 4-1.

[Through Direction]

In FIG. 42, the wavelength-division multiplex light inputted to the wavelength-division multiplexing and demultiplexing section 1-1 is demultiplexed in wavelength units and one of the demultiplexed signals is inputted to the line interface section (WEST SRV) 2-1-1 in the line redundancy unit 7-1. The line interface section (WEST SRV) 2-1-1 converts the signal form of the inputted optical signal as needed and inputs the resulting signal to the line switch section (SRV) 3-1-1. The line switch section (SRV) 3-1-1 connects the path to the line interface section (SRV) 2-1-3 according to the connection setting. The line interface section (EAST SRV) 2-1-3 converts the signal form of the inputted path as needed and outputs the resulting signal as a signal of a specific wavelength. The wavelength-division multiplexing and demultiplexing section 1-3 wavelength-multiplexes the signals from the line interface sections corresponding to the individual wavelengths and outputs the resulting signal to the transmission line.

On the other hand, the wavelength-division multiplex signal inputted to the wavelength-division multiplexing and demultiplexing section 1-3 is demultiplexed in wavelength units and one of the demultiplexed signal is inputted to the line interface section 2-1-3 of the line redundancy unit 7-1. The line interface section (EAST SRV) 2-1-3 converts the signal form of the inputted optical signal as needed and inputs the resulting signal to the line switch section (SRV) 3-1-1. The line switch section (SRV) 3-1-1 connects the path to the line interface section (SRV) 2-1-1 according to the connection setting. The line interface section (WEST SRV) 2-1-1 converts the signal form of the inputted path and outputs the resulting signal as a signal of a specific wavelength. The wavelength-division multiplexing and demultiplexing section 1-1 wavelength-multiplexes the signals from the line interface sections for the individual wavelengths and outputs the resulting signal to the transmission line.

In this state, if a failure has occurred in the line interface section (WEST SRV) 2-1-1, the line switch section (SRV) 3-1-1 outputs the path detoured via the line interface section (WEST PRT) 2-1-2 to the line interface section (EAST SRV) 2-1-3.

Furthermore, if a failure has occurred in the line interface section (EAST SRV) 2-1-3, the line switch section (SRV) 3-1-1 detours the path by way of the line interface section (EAST PRT) 2-1-4.

The above configuration produces the following effects:

a) Use of the line switch section capable of splitting an optical signal and outputting the split signals enables the path to be detoured quickly in case of failure. Consequently, it is possible to shorten the time during which the pass is interrupted in the case of the switching or revertive switching of the path.

b) Use of the optical cross-connect section and line switch section enables any tributary channel to be connected to any wavelength on either the WEST side or the EAST side.

c) When there is no failure in the network, the extra traffic or part-time traffic can be held.

d) Furthermore, it is possible to provide the line interface section and tributary interface section with a specific signal inserting function. This prevents a misconnection between service traffic and extra traffic or between service traffic and part-time traffic in the failure state.

<Embodiment to Help Explain an Optical Transmission Apparatus which Includes a Redundancy System but No Cross-connect Switch and is Applied to a 4-Fiber System>

(Twenty-fifth Embodiment)

FIG. 43 is a block diagram showing another configuration of an optical transmission apparatus according to the present invention. The optical transmission apparatus of the twenty-fifth embodiment includes a switchable redundancy system, but is not provided with an optical cross-connect section for assigning wavelengths of optical signals between the line side and the tributary side. The optical transmission apparatus is used in a 4-fiber transmission system.

The optical transmission apparatus of FIG. 43 comprises wavelength-division multiplexing and demultiplexing sections (WEST SRV: 1-1, WEST PRT: 1-2, EAST SRV: 1-3, EAST PRT: 1-4), line redundancy units 7-1 to 7-s, and tributary units 8-1 to 8-t.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line side for each wavelength and line switch sections (SRV: 3-1-1, PRT: 3-1-2) having the same function as that in the twenty-fourth embodiment.

Each of the tributary units 8-1 to 8-t includes tributary switch sections (SRV: 5-1-1, PRT: 5-1-2) for effecting protection switching on the tributary side and tributary interface sections (SRV: 6-1-1, PRT: 6-1-2, P/T: 6-1-3) for interfacing with the tributary side.

The basic operation of the optical transmission apparatus shown in FIG. 43 will be explained, centering on a path set via the line redundancy unit 7-1.

[Add Direction]

(1) Service System

In FIG. 43, after the service traffic held in the tributary interface section (SRV) 6-1-1 is subjected to a signal form converting process, a signal monitoring process, or a terminating process as needed, the resulting traffic is outputted to the tributary switch section (SRV) 5-1-1. The signal outputted from the tributary switch section (SRV) 5-1-1 is connected to the line redundancy unit 7-1.

The line switch section (SRV) 3-1-1 in the line redundancy unit 7-1 connects the path to the line interface section (WEST SRV) 2-1-1 according to the connection setting. The line interface section (WEST SRV) 2-1-1 converts the signal form of the inputted path and outputs the resulting signal as a signal of a specific wavelength.

The wavelength-division multiplexing and demultiplexing section (WEST SRV) 1-1 wavelength-multiplexes the signals from the line interface sections for the individual wavelengths and outputs the resulting signal to the transmission line.

While in the above explanation, the service traffic from the tributary unit is connected to the WEST SRV, the same service traffic may be connected to the EAST SRV.

(2) Protection System

If a failure has occurred in the tributary-side service system, the service traffic held in the tributary interface section (PRT) 6-1-2 is subjected to a signal form converting process, a signal monitoring process, or a terminating process as needed and then the resulting traffic is outputted to the tributary switch section (SRV) 5-1-1. The connection from this point on is the same as that of the service traffic.

(3) Part-time System

After the part-time traffic held in the tributary interface section (P/T) 6-1-3 is subjected to a signal form converting process, a signal monitoring process, or a terminating process as needed, the resulting traffic is outputted to the tributary switch section (PRT) 5-1-2. The signal outputted from the tributary switch section (SRV) 5-1-1 is further connected to the line redundancy unit 7-1.

The line switch section (PRT) 3-1-2 in the line redundancy unit 7-1 connects the path to the line interface section (EAST PRT) 2-1-4 according to the connection setting. The line interface section (EAST PRT) 2-1-4 converts the signal form of the inputted path and outputs the resulting signal as a signal of a specific wavelength.

The wavelength-division multiplexing and demultiplexing section (EAST PRT) 1-4 wavelength-multiplexes the signals from the line interface sections for the individual wavelengths and outputs the resulting signal to the transmission line. While in the above explanation, the part-time traffic from the tributary unit is connected to the EAST PRT, the same part-time traffic may be connected to the WEST PRT.

(4) In Case of Failure

If a failure has occurred in the line interface section (WEST SRV) 2-1-1, the line switch section (SRV) 3-1-1 detours the service traffic to the line interface section (WEST PRT) 2-1-2. At this time, the connection form of the line switch section (SRV) 3-1-1 is in the bridge connection state where the same path is connected to not only the line interface section (WEST SRV) 2-1-1 but also the line interface section (WEST PRT) 2-1-2.

The line interface section (WEST PRT) 2-1-2 subjects the inputted path to signal conversion and outputs the resulting signal of a specific wavelength. The wavelength-division multiplexing and demultiplexing section (WEST PRT) 1-2 wavelength-multiplexes the signals from the line interface sections for the individual wavelengths and outputs the resulting signal to the transmission line.

If failures have occurred in both of the SRV and PRT on the WEST side, the path is detoured to the line interface section (WEST PRT) 2-1-4. In this case, the connection form of the line switch section (SRV) 3-1-1 is in the bridge connection state where the same path is connected to not only the line interface section (WEST SRV) 2-1-1 but also the line interface section (WEST PRT) 2-1-4.

The line interface section (WEST PRT) 2-1-4 subjects the inputted service traffic to signal conversion and outputs the resulting signal of a specific wavelength. The wavelength-division multiplexing and demultiplexing section (WEST PRT) 1-4 wavelength-multiplexes the signals from the line interface sections for the individual wavelengths and outputs the resulting signal to the transmission line. At this time, the part-time traffic is dropped from the EAST PRT.

[Drop Direction]

The wavelength-division multiplex light inputted to the wavelength-division multiplexing and demultiplexing section (WEST SRV) 1-1 is demultiplexed in wavelength units and one of the demultiplexed signal is inputted to the line interface section (WEST SRV) 2-1-1. The line interface section (WEST SRV) 2-1-1 converts the signal form of the inputted signal and inputs the resulting signal to the line switch section (SRV) 3-1-1. The line switch section (SRV) 3-1-1 outputs the inputted signal to the tributary interface section 8-1 according to the connection setting. The tributary interface section 8-1 converts the form of the signal to be inputted as needed and outputs the resulting signal to an external unit.

In this state, if a failure has occurred in the line(WEST SRV), wavelength-division multiplexing and demultiplexing section 1-1, or line interface section 2-1-1, the line switch section (SRV) 3-1-1 outputs the path detoured via the optical line(WEST PRT), wavelength-division multiplexing and demultiplexing section 1-2, and line interface section 2-1-2 to the optical cross-connect section.

Furthermore, if failures have occurred in both of the WEST SRV line and the WEST PRT line, the line switch section (SRV) 3-1-1 connects the path detoured via the EAST PRT line, wavelength-division multiplexing and demultiplexing section 1-4, and line interface section (WEST PRT) 2-1-4 to the tributary interface section 8-1. The tributary interface section 8-1 converts the signal form as needed and outputs the resulting signal to an external unit.

[Through Direction]

In FIG. 43, the wavelength-division multiplex signal inputted to the wavelength-division multiplexing and demultiplexing section 1-1 is demultiplexed into wavelength units and one of the demultiplexed signals is inputted to the line interface section (WEST SRV) 2-1-1 in the line redundancy unit 7-1. The line interface section (WEST SRV) 2-1-1 converts the signal form of the inputted optical signal as needed and inputs the resulting signal to the line switch section (SRV) 3-1-1. The line switch section (SRV) 3-1-1 connects the path to the line interface section (SRV) 2-1-3 according to the connection setting. The line interface section (EAST SRV) 2-1-3 converts the signal form of the inputted path as needed and outputs the resulting signal of a specific wavelength. The wavelength-division multiplexing and demultiplexing section 1-3 wavelength-multiplexes the signals from the line interface sections corresponding to the individual wavelengths and outputs the resulting signal to the transmission line.

In this state, if a failure has occurred in the WEST-SRV line, wavelength-division multiplexing and demultiplexing section 1-1, or line interface section 2-1-1, the line switch section (SRV) 3-1-1 outputs the path detoured via the WEST-PRT line, wavelengthdivision multiplexing and demultiplexing section 1-2, and line interface section 2-1-2 to the line interface section (EAST SRV) 2-1-3.

Furthermore, in this state, if a failure has occurred in the EAST-SRV line, wavelength-division multiplexing and demultiplexing section 1-3, or line interface section 2-1-3, the line switch section (SRV) 3-1-1 connects the same path to the line interface section (EAST SRV) 2-1-3 and line interface section (WEST PRT) 2-1-4. That is, the line switch section (SRV) 3-1-1 bridges the path. This enables the path to be detoured via the line interface section (WEST PRT) 2-1-4.

With the twenty-fifth embodiment, the following effects are produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

b) Since each section constituting the optical transmission apparatus is designed to have a redundancy structure, the path can be detoured in case of failure in the apparatus.

c) Since a 2-fiber pair transmission path is used as each of the WEST-side line and the EAST-side line, the path can be detoured in case of failure in the line.

d) Since each of the tributary switch sections and tributary lines is provided with a tributary interface section, the path can be detoured in case of failure in the tributary transmission.

e) Part-time traffic can be transmitted via the tributary interface section (P/T).

<Embodiment to Help Explain an Optical Transmission Apparatus which Includes a Redundancy System but No Cross-connect Switch and is Applied to a 2-Fiber System>

(Twenty-sixth Embodiment)

Figure 44:
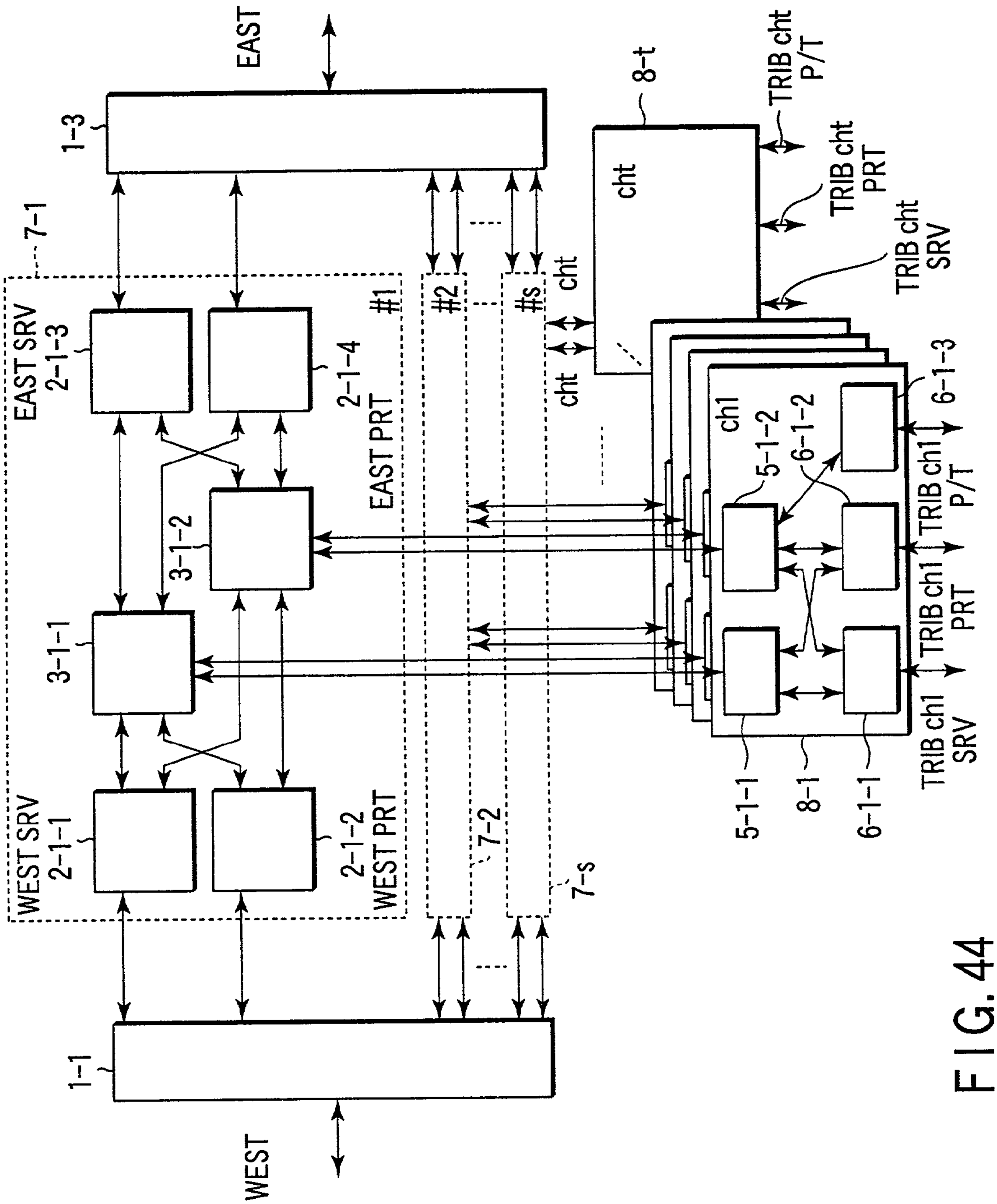
FIG. 44 is a block diagram showing another configuration of an optical transmission apparatus according to the present invention.

FIG. 44 is a block diagram showing another configuration of an optical transmission apparatus according to the present invention. The optical transmission apparatus of the twenty-sixth embodiment includes a switchable redundancy system, but is not provided with an optical cross-connect section for assigning wavelengths between the line side and the tributary side. The optical transmission apparatus is used in a 2-fiber transmission system.

The optical transmission apparatus of FIG. 44 comprises wavelength-division multiplexing and demultiplexing sections (WEST SRV: 1-1, EAST SRV: 1-3), line redundancy units 7-1 to 7-s, and tributary units 8-1 to 8-t.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line side for each wavelength and line switch sections (SRV: 3-1-1, PRT: 3-1-2) having the same function as that in the twenty-fourth embodiment.

Each of the tributary units 8-1 to 8-t includes tributary switch sections (SRV: 5-1-1, PRT: 5-1-2) for effecting protection switching on the tributary side and tributary interface sections (SRV: 6-1-1, PRT: 6-1-2, P/T: 6-1-3) for interfacing with the tributary side.

The basic operation of the optical transmission apparatus shown in FIG. 44 will be explained, centering on a path set via the line redundancy unit 7-1.

[Add Direction]

In FIG. 44, after the service traffic held in the tributary interface section (SRV) 6-1-1 is subjected to a signal form converting process, a signal monitoring process, or a terminating process as needed, the resulting traffic is outputted to the tributary switch section (SRV) 5-1-1. The signal outputted from the tributary switch section (SRV) 5-1-1 is connected to the line switch section 3-1-1.

The line switch section (SRV) 3-1-1 in the line redundancy unit 7-1 connects the path to the line interface section (WEST SRV) 2-1-1 according to the connection setting. The line interface section (WEST SRV) 2-1-1 converts the signal form of the inputted path and outputs the resulting signal of a specific wavelength.

The wavelength-division multiplexing and demultiplexing section (WEST SRV) 1-1 wavelength-multiplexes the signals from the line interface sections for the individual wavelengths and outputs the resulting signal to the transmission line.

In this state, if a failure has occurred in the line interface section (WEST SRV) 2-1-1, the line switch section (SRV) 3-1-1 detours the service traffic to the line interface section (WEST PRT) 2-1-2. If a failure has occurred in the WEST-side line, the line switch section (SRV) 3-1-1 detours the service traffic to the line interface section (WEST PRT) 2-1-4.

After the path held in the tributary interface section (P/T) 6-1-1 is subjected to a signal form converting process, a signal monitoring process, or a terminating process as needed, the resulting traffic is connected to the line redundancy unit 7-1.

The line switch section (PRT) 3-1-2 in the line redundancy unit 7-1 connects the path to the line interface section (EAST PRT) 2-1-3 according to the connection setting. The line interface section 2-1-3 converts the signal form of the inputted path as needed and outputs the resulting signal of a specific wavelength. The wavelength-division multiplexing and demultiplexing section (EAST) 1-3 wavelength-multiplexes the signals from the line interface sections for the individual wavelengths and outputs the resulting signal to the transmission line.

In this state, if a failure has occurred in the line interface section (EAST SRV) 2-1-3, the line switch section 3-1-2 detours the path to the line interface section (EAST PRT) 2-1-4. Furthermore, if a failure has occurred in the EAST-side line, the line switch section 3-1-2 detours the path to the line interface section (WEST PRT) 2-1-2.

With the above configuration, part-time traffic can be held.

After the part-time traffic held in the tributary interface section (P/T) 6-1-3 is subjected to a signal form converting process, a signal monitoring process, or a terminating process as needed, the resulting traffic is outputted to the tributary switch section (PRT) 5-1-2 and then connected to the line switch section 3-1-2.

The line switch section 3-1-2 connects the path to the line interface section (WEST PRT) 2-1-4 according to the connection setting. The line interface section (WEST PRT) 2-1-4 converts the signal form of the inputted path and outputs the resulting signal of a specific wavelength.

[Drop Direction]

In FIG. 44, the wavelength-division multiplex light held in the wavelength-division multiplexing and demultiplexing section (WEST) 1-1 is wavelength-demultiplexed and a part of the resulting signal is inputted to the line interface section (WEST PRT) 2-1-1.

The line interface section (WEST PRT) 2-1-2 outputs the inputted signal to the line switch section (SRV) 3-1-1.

The line switch section (SRV) 3-1-1 connects the inputted signal to the tributary interface section 8-1 according to the connection setting. The tributary interface section 8-1 converts the signal form of the connected signal as needed and then outputs the resulting signal to an external unit.

In this state, if a failure has occurred in the line interface section (WEST SRV) 2-1-1, the line switch section (SRV) 3-1-1 outputs the path detoured via the line interface section 2-1-2 to the tributary interface section 8-1. Furthermore, if a failure has occurred in the WEST-side line, the line switch section (SRV) 3-1-1 outputs the path detoured via the line interface section (WEST PRT) 2-1-4 to the tributary interface section 8-1.

In FIG. 44, the wavelength-division multiplex signal inputted to the wavelength-division multiplexing and demultiplexing section 1-3 is demultiplexed in wavelength units and one of the demultiplexed signals is inputted to the line interface section (EAST SRV) 2-1-3 in the line redundancy unit 7-1. The line interface section (EAST SRV) 2-1-3 converts the signal form of the inputted signal as needed and inputs the resulting signal to the line switch section (SRV) 3-1-1. The line switch section (SRV) 3-1-1 connects the path to the tributary interface section 8-1 according to the connection setting. The tributary interface section 8-1 converts the signal form of the inputted path as needed and outputs the resulting signal to an external unit.

In this state, if a failure has occurred in the line interface section (EAST SRV) 2-1-3, the line switch section 3-1-1 outputs the path detoured via the line interface section (WEST PRT) 2-1-4 to the tributary interface section 6-2. On the other hand, if a failure has occurred in the EAST-side line, the line switch section 3-1-1 outputs the path detoured via the line interface section (WEST PRT) 2-1-2 to the tributary interface section 8-2.

[Through Direction]

In FIG. 44, the wavelength-division multiplex signal inputted to the wavelength-division multiplexing and demultiplexing section 1-1 is demultiplexed in wavelength units and one of the split signals is inputted to the line interface section (WEST SRV) 2-1-1 in the line redundancy unit 7-1. The line interface section (WEST SRV) 2-1-1 converts the signal form of the inputted optical signal as needed and inputs the resulting signal to the line switch section (SRV) 3-1-1. The line switch section (SRV) 3-1-1 connects the path to the line interface section (SRV) 2-1-3 according to the connection setting. The line interface section (SRV) 2-1-3 converts the signal form of the inputted path as needed and outputs the resulting signal of a specific wavelength. The wavelength-division multiplexing and demultiplexing section 1-3 wavelength-multiplexes the signals from the line interface sections corresponding to the individual wavelengths and outputs the resulting signal to the transmission line.

On the other hand, the wavelength-division multiplex signal inputted to the wavelength-division multiplexing and demultiplexing section 1-1 is demultiplexed in wavelength units and one of the split signals is inputted to the line interface section (WEST PRT) 2-1-1 in the line redundancy unit 7-1. The line interface section (WEST PRT) 2-1-1 converts the signal form of the inputted optical signal as needed and inputs the resulting signal to the line switch section (SRV) 3-1-1. The line switch section (SRV) 3-1-1 connects the path to the line interface section (PRT) 2-1-4 according to the connection setting. The line interface section 2-1-4 converts the signal form of the inputted path as needed and outputs the resulting signal of a specific wavelength.

The wavelength-division multiplexing and demultiplexing section 1-3 wavelength-multiplexes the signals from the line interface sections corresponding to the individual wavelengths and outputs the resulting signal to the transmission line.

In this state, if a failure has occurred in the line interface section (WEST SRV) 2-1-1, the line switch section (SRV) 3-1-1 outputs the path detoured via the line interface section (WEST PRT) 2-1-2 to the line interface section (EAST SRV) 2-1-3.

Furthermore, if a failure has occurred in the line interface section (EAST SRV) 2-1-3, the line switch section (SRV) 3-1-1 detours the path via the line interface section (EAST SRV) 2-1-4.

With the twenty-sixth embodiment, the following effects are produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

b) Since only one fiber pair is used as each of the WEST-side line and EAST-side line, the cost of the transmission paths can be reduced.

c) Since each section constituting the optical transmission apparatus is designed to have a redundancy structure, the path can be detoured in case of failure in the apparatus.

d) Since each of the tributary switch sections and tributary transmission paths is provided with a tributary interface section, the path can be detoured in case of failure in the tributary transmission.

e) The optical cross-connect section can connect any tributary to any wavelength on the WEST side or EAST side.

f) Part-time traffic can be transmitted via the tributary interface section (P/T).

<Embodiment to Help Explain an Optical Transmission Apparatus which Includes a Cross-connect Switch but No Redundancy System and is Applied to a 4-Fiber System>

(Twenty-seventh Embodiment)

Figure 45:
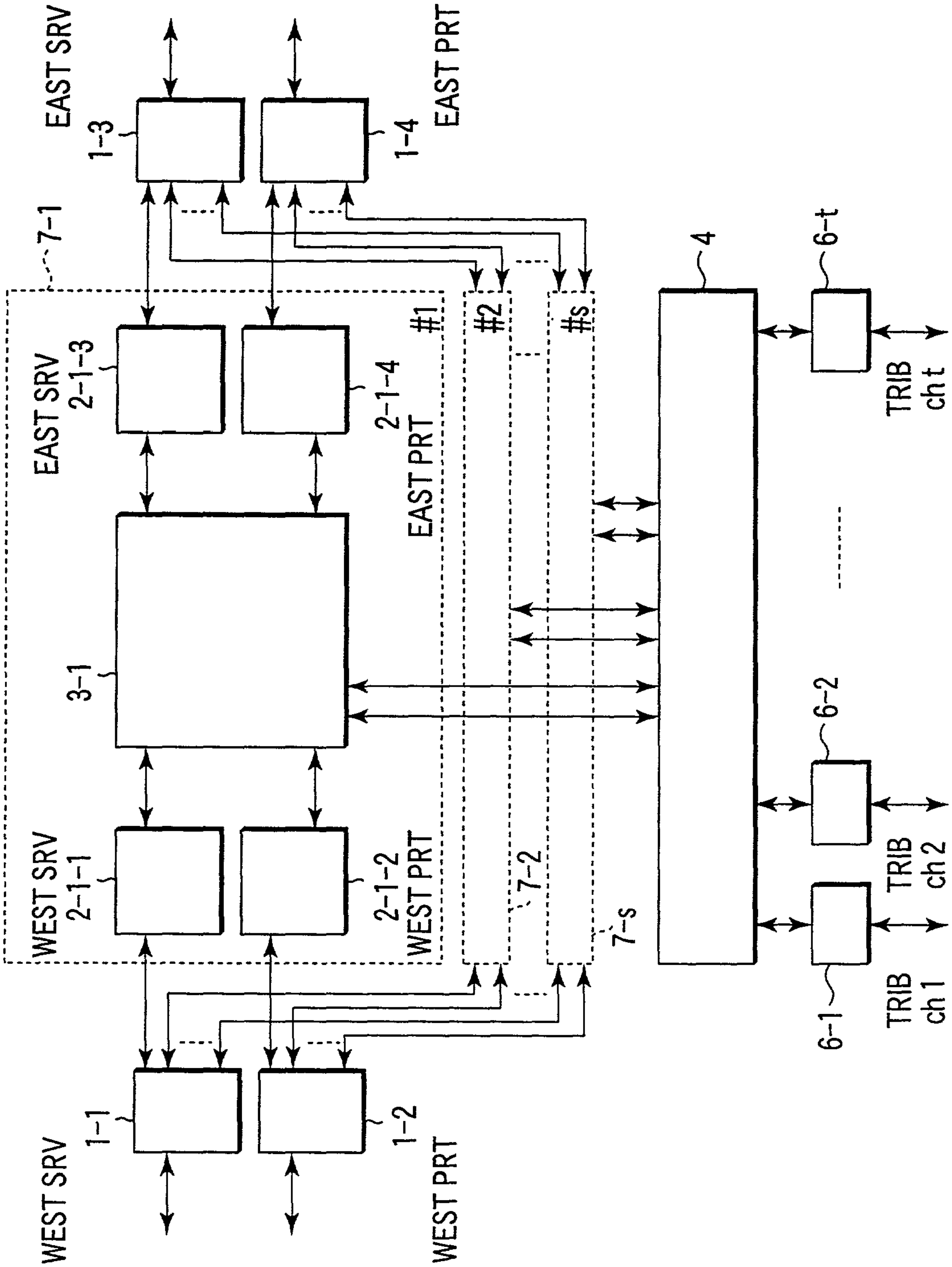
FIG. 45 is a block diagram showing another configuration of an optical transmission apparatus according to the present invention.

FIG. 45 is a block diagram showing another configuration of an optical transmission apparatus according to the present invention. The optical transmission apparatus of the twenty-seventh embodiment includes no switchable redundancy system and is provided with an optical cross-connect section for assigning wavelengths between the line side and the tributary side. The optical transmission apparatus is used in a 4-fiber transmission system.

The optical transmission apparatus of FIG. 45 comprises wavelength-division multiplexing and demultiplexing sections (WEST SRV: 1-1, WEST PRT: 1-2, EAST SRV: 1-3, EAST PRT: 1-4) for performing wavelength-division multiplexing and demultiplexing, line redundancy units 7-1 to 7-s, tributary interface sections (6-1 for ch 1, 6-2 for ch 2, 6-t for ch t), and an optical cross-connect section 4 for setting arbitrarily the connection between the tributary interface channels and the line switch sections provided for the individual wavelengths.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line side using a specific wavelength and a line switch section 3 having the same function as that in the twenty-fourth embodiment.

The basic operation of the optical transmission apparatus shown in FIG. 45 will be explained, centering on a path set via the line redundancy unit 7-1.

[Add Direction]

In FIG. 45, after the service traffic held in the tributary interface section 6-1 is subjected to a signal form converting process, a signal monitoring process, or a terminating process as needed, the resulting traffic is outputted to the optical cross-connect section 4. The optical cross-connect section 4 connects the signal from the tributary interface section 6-1 to the line redundancy unit 7-1 according to the connection setting.

The line switch section 3-1 in the line redundancy unit 7-1 connects the path to the line interface section (WEST SRV) 2-1-1 according to the connection setting. The line interface section (WEST SRV) 2-1-1 converts the signal form of the inputted path as needed and outputs the resulting signal of a specific wavelength.

The wavelength-division multiplexing and demultiplexing section (WEST SRV) 1-1 wavelength-multiplexes the signals from the line interface sections for the individual wavelengths and outputs the resulting signal to the transmission line.

In this state, if a failure has occurred in the WEST-SRV line, wavelength-division multiplexing and demultiplexing section 1-1, or line interface section (WEST SRV) 2-1-1, the line switch section 3-1 detours the path to the line interface section (WEST PRT) 2-1-2. On the other hand, if failures have occurred simultaneously in the WEST-side SRV system and PRT system, the line switch section 3-1 detours the path to the line interface section (EAST PRT) 2-1-4.

In FIG. 45, after the path held in the tributary interface section 6-t (ch t) is subjected to a signal form converting process, a signal monitoring process, or a terminating process as needed, the resulting signal is outputted to the optical cross-connect section 4. The optical cross-connect section 4 connects the signal from the tributary section 6-t to the line redundancy unit 7-1 according to the connection setting. The line switch section 3-1 in the line redundancy unit 7-1 connects the path to the line interface section (EAST PRT) 2-1-3 according to the connection setting. The line interface section 2-1-3 converts the signal form of the inputted path and outputs the resulting signal of a specific wavelength. The wavelength-division multiplexing and demultiplexing section (EAST) 1-3 wavelength-multiplexes the signals from the line interface sections for the individual wavelengths and outputs the resulting signal to the transmission line.

In this state, if a failure has occurred in the EAST-SRV line, wavelength-division multiplexing and demultiplexing section 1-3, or line interface section 2-1-3, the line switch section 3-1 detours the path to the line interface section (EAST PRT) 2-1-4. On the other hand, if failures have occurred simultaneously in the EAST-side SRV system and PRT system, the line switch section 3-1 detours the path to the line interface section 2-1-2 (WEST PRT).

[Drop Direction]

In FIG. 45, the wavelength-division multiplex light held in the wavelength-division multiplexing and demultiplexing section (WEST SRV) 1-1 is demultiplexed in wavelength units and one of the separated signals is inputted to the line interface section (WEST SRV) 2-1-1 in the line redundancy unit 7-1. The line interface section (WEST SRV) 2-1-1 converts the signal form of the inputted signal as needed and outputs the resulting signal to the transmission line switch section 3-1. The line switch section 3-1 connects the inputted signal to the optical cross-correct section 4 according to the connection setting.

The optical cross-connect section 4 connects the inputted signal to the tributary interface section 6-1 according to the connection setting. The tributary interface section 6-1 converts the signal form of the inputted signal as needed and outputs the resulting signal to an external unit.

In this state, if a failure has occurred in the WEST-SRV line, wavelength-division multiplexing and demultiplexing section 1-1, or line interface section 2-1-1, the line switch section 3-1 outputs the path detoured via the line interface section (WEST PRT) 2-1-2 to the optical cross-connect section 4. On the other hand, if failures have occurred simultaneously in the WEST-side SRV system and PRT system, the line switch section 3-1 outputs the path detoured via the line interface section (EAST PRT) 2-1-4 to the optical cross-connect section 4.

In FIG. 45, the wavelength-division multiplex signal inputted to the wavelength-division multiplexing and demultiplexing section (EAST SRV) 1-3 is demultiplexed in wavelength units and one of the separated signals is inputted to the line interface section 2-1-3 in the line redundancy unit 7-1. The line interface section 2-1-3 converts the signal form of the inputted signal as needed and outputs the resulting signal to the transmission line switch section 3-1. The line switch section 3-1 connects the inputted signal to the optical cross-connect section 4 according to the connection setting.

The optical cross-connect section 4 connects the inputted signal to the tributary interface section 6-t according to the connection setting. The tributary interface section 6-t converts the signal form of the inputted path as needed and outputs the resulting signal to an external unit.

In this state, if a failure has occurred in the EAST-SRV line or line interface section 2-1-3, the line switch section 3-1 outputs the path detoured via the line interface section (EAST PRT) 2-1-4 to the optical cross-connect section 4. On the other hand, if failures have occurred simultaneously in the EAST-side SRV system and PRT system, the line switch section 3-1 outputs the path detoured via the line interface section (WEST PRT) 2-1-2 to the optical cross-connect section 4.

[Through Direction]

In FIG. 45, the wavelength-division multiplex signal inputted to the wavelength-division multiplexing and demultiplexing section (WEST SRV) 1-1 is demultiplexed in wavelength units and one of the split signals is inputted to the line interface section (WEST SRV) 2-1-1 in the line redundancy unit 7-1. The line interface section (WEST SRV) 2-1-1 converts the signal form of the inputted optical signal as needed and inputs the resulting signal to the line switch section 3-1. The line switch section 3-1 connects the path to the line interface section (EAST SRV) 2-1-3 according to the connection setting. The line interface section 2-1-3 converts the signal form of the inputted path as needed and outputs the resulting signal of a specific wavelength. The wavelength-division multiplexing and demultiplexing section (EAST SRV) 1-3 wavelength-multiplexes the signals from the line interface sections corresponding to the individual wavelengths and outputs the resulting signal to the transmission line.

The wavelength-division multiplex signal inputted to the wavelength-division multiplexing and demultiplexing section (WEST PRT) 1-2 is demultiplexed in wavelength units and one of the split signals is inputted to the line interface section (WEST PRT) 2-1-2 in the line redundancy unit 7-1. The line interface section 2-1-2 converts the signal form of the inputted optical signal as needed and outputs the resulting signal to the transmission line switch section 3-1. The line switch section 3-1 connects the path to the line interface section (EAST PRT) 2-1-4 according to the connection setting. The line interface section 2-1-4 converts the signal form of the inputted path as needed and outputs the resulting signal of a specific wavelength. The wavelength-division multiplexing and demultiplexing section (EAST PRT) 1-4 wavelength-multiplexes the signals from the line interface sections corresponding to the individual wavelengths and outputs the resulting signal to the transmission line.

In this state, if a failure has occurred in the WEST-SRV line, wavelength-division multiplexing and demultiplexing section 1-1 or line interface section 2-1-1, the line switch section 3-1 outputs the path detoured via the line interface section (WEST PRT) 2-1-2 to the line interface section (EAST SRV) 2-1-3. On the other hand, if a failure has occurred in the line interface section (EAST SRV) 2-1-3, the line switch section 3-1 detours the path via the line interface section (EAST PRT) 2-1-4.

With the twenty-seventh embodiment, the following effects are produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

b) Use of the optical cross-connect section and line switch section enables any tributary channel to be connected to any wavelength on the WEST side or EAST side.

<Embodiment to Help Explain an Optical Transmission Apparatus which Includes a Cross-connect Switch but No Redundancy System and is Applied to a 2-Fiber System>

(Twenty-eighth Embodiment)

Figure 46:
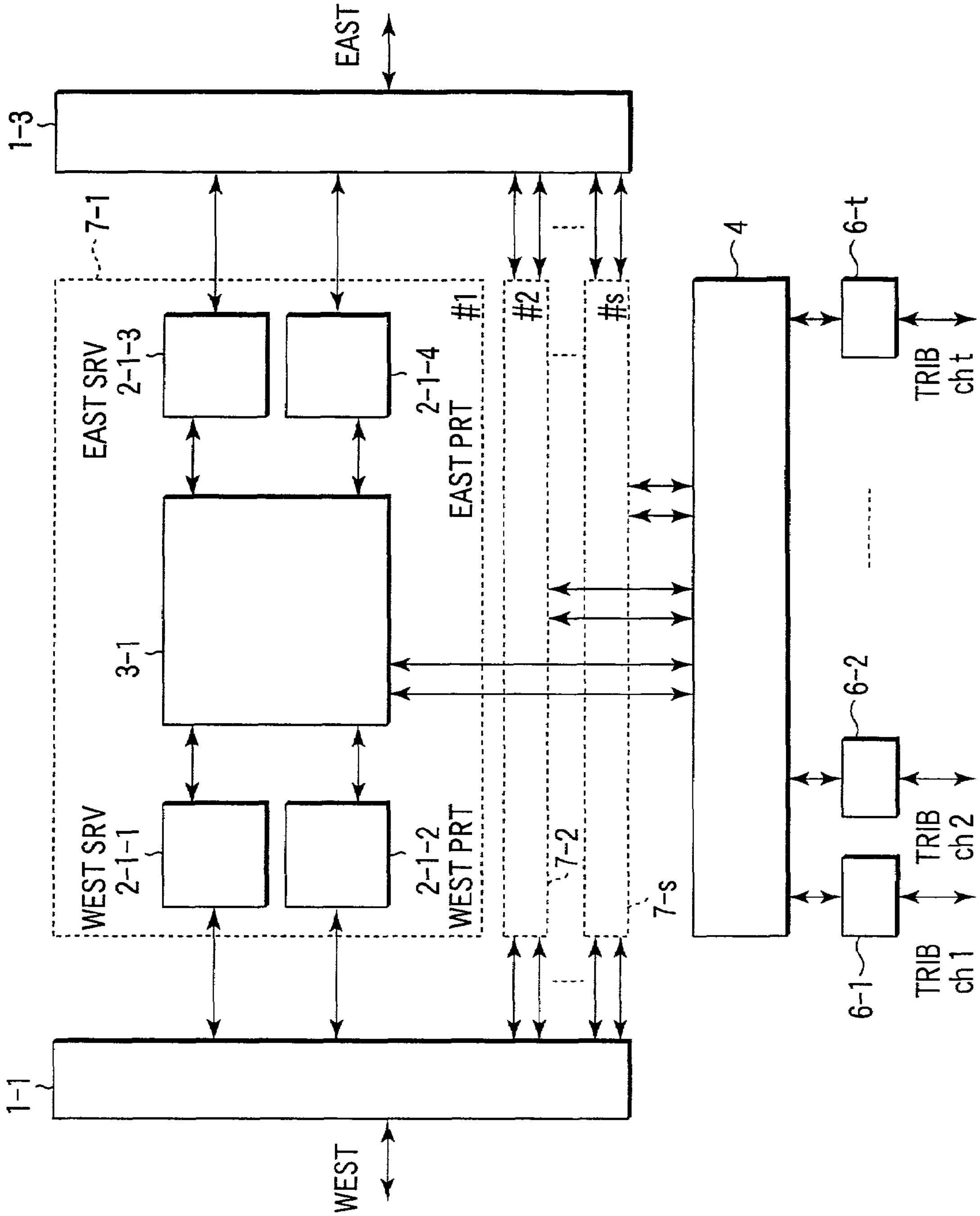
FIG. 46 is a block diagram showing another configuration of an optical transmission apparatus according to the present invention.

FIG. 46 is a block diagram showing another configuration of an optical transmission apparatus according to the present invention. The optical transmission apparatus of the twenty-eighth embodiment includes no switchable redundancy system and is provided with an optical cross-connect section for assigning wavelengths between the line side and the tributary side. The optical transmission apparatus is used in a 2-fiber transmission system.

The optical transmission apparatus of FIG. 46 comprises wavelength-division multiplexing and demultiplexing sections (WEST: 1-1, EAST: 1-3), line redundancy units 7-1 to 7-s, a t number of tributary interface sections (6-1 for ch 1, 6-2 for ch 2, 6-t for ch t) for interfacing with the tributary side, and an optical cross-connect section 4 for setting arbitrarily the connection between the tributary interface channels and the line switch sections provided for the individual wavelengths.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line using a specific wavelength and a line switch section 3-1 having the same function as that in the twenty-fourth embodiment.

The basic operation of the optical transmission apparatus shown in FIG. 46 will be explained, centering on a path set via the line redundancy unit 7-1.

[Add Direction]

In FIG. 46, after the path held in the tributary interface section 6-1 is subjected to a signal form converting process, a signal monitoring process, or a terminating process as needed, the resulting path is outputted to the optical cross-connect section 4. The optical cross-connect section 4 connects the signal from the tributary interface section 6-1 to the line redundancy unit 7-1 according to the connection setting.

The line switch section 3-1 in the line redundancy unit 7-1 connects the path to the line interface section (WEST SRV) 2-1-1 according to the connection setting. The line interface section (WEST SRV) 2-1-1 converts the signal form of the inputted path as needed and outputs the resulting signal of a specific wavelength. The wavelength-division multiplexing and demultiplexing section (WEST) 1-1 wavelength-multiplexes the signals from the line interface sections for the individual wavelengths and outputs the resulting signal to the transmission line.

In this state, if a failure has occurred in the line interface section (WEST SRV) 2-1-1, the line switch section 3-1 detours the path to the line interface section (WEST PRT) 2-1-2. On the other hand, if a failure has occurred in the WEST-side line or wavelength-division multiplexing and demultiplexing section 1-1, the line switch section 3-1 detours the path to the line interface section (EAST PRT) 2-1-4.

In FIG. 46, after the path held in the tributary interface section 6-t is subjected to a signal form converting process, a signal monitoring process, or a terminating process as needed, the resulting signal is outputted to the optical cross-connect section 4. The optical cross-connect section 4 connects the signal from the tributary interface section 6-t to the line redundancy unit 7-1 according to the connection setting.

The line switch section 3-1 in the line redundancy unit 7-1 connects the path to the line interface section (EAST SRV) 2-1-3 according to the connection setting. The line interface section 2-1-3 converts the signal form of the inputted path as needed and outputs the resulting signal of a specific wavelength.

The EAST-side wavelength-division multiplexing and demultiplexing section 1-3 wavelength-multiplexes the signals from the line interface sections for the individual wavelengths and outputs the resulting signal to the transmission line.

In this state, if a failure has occurred in the line interface section (EAST SRV) 2-1-3, the line switch section 3-1 detours the path to the line interface section (EAST PRT) 2-1-4. On the other hand, if a failure has occurred in the EAST-side line or wavelength-division multiplexing and demultiplexing section 1-3, the line switch section 3-1 detours the path to the line interface section (WEST PRT) 2-1-2.

[Drop Direction]

In FIG. 46, the wavelength-division multiplex light held in the wavelength-division multiplexing and demultiplexing section 1-1 is demultiplexed in wavelength units and one of the separated signals is inputted to the line interface section (WEST SRV) 2-1-1 in the line redundancy unit 7-1. The line interface section 2-1-1 converts the signal form of the inputted signal as needed and outputs the resulting signal to the transmission line switch section 3-1. The line switch section 3-1 outputs the inputted signal to the optical cross-correct section 4 according to the connection setting. The optical cross-connect section 4 connects the inputted signal to the tributary interface section 6-1 according to the connection setting. The tributary interface section 6-1 converts the signal form of the inputted signal as needed and outputs the resulting signal to an external unit.

In this state, if a failure has occurred in the line interface section (WEST SRV) 2-1-1, the line switch section 3-1 outputs the path detoured via the line interface section (WEST PRT) 2-1-2 to the optical cross-connect section 4. On the other hand, if a failure has occurred in the WEST-side transmission line or wavelength-division multiplexing and demultiplexing section 1-1, the line switch section 3-1 outputs the path detoured via the line interface section (EAST PRT) 2-1-4 to the optical cross-connect section 4.

In FIG. 46, the wavelength-division multiplex signal inputted to the wavelength-division multiplexing and demultiplexing section 1-3 is demultiplexed into wavelength units and one of the separated signals is inputted to the line interface section 2-1-3 in the line redundancy unit 7-1. The line interface section 2-1-3 converts the signal form of the inputted signal as needed and outputs the resulting signal to the transmission line switch section 3-1. The line switch section 3-1 outputs the inputted signal to the optical cross-connect section 4 according to the connection setting. The optical cross-connect section 4 connects the inputted signal to the tributary interface section 6-t according to the connection setting. The tributary interface section 6-t converts the signal form of the inputted signal as needed and outputs the resulting signal to an external unit.

In this state, if a failure has occurred in the line interface section (EAST SRV) 2-1-3, the line switch section 3-1 outputs the path detoured via the line interface section (EAST PRT) 2-1-4 to the optical cross-connect section 4. On the other hand, if a failure has occurred in the EAST-side transmission line or wavelength-division multiplexing and demultiplexing section 1-3, the line switch section 3-1 outputs the path detoured via the line interface section (WEST PRT) 2-1-2 to the optical cross-connect section 4.

[Through Direction]

In FIG. 46, the wavelength-division multiplex signal inputted to the wavelength-division multiplexing and demultiplexing section 1-1 is demultiplexed in wavelength units and one of the split signals is inputted to the line interface section (WEST SRV) 2-1-1 in the line redundancy unit 7-1. The line interface section 2-1-1 converts the signal form of the inputted optical signal as needed and inputs the resulting signal to the line switch section 3-1. The line switch section 3-1 connects the path to the line interface section (EAST SRV) 2-1-3 according to the connection setting. The line interface section 2-1-3 converts the signal form of the inputted path as needed and outputs the resulting signal of a specific wavelength.

The wavelength-division multiplexing and demultiplexing section (EAST SRV) 1-3 wavelength-multiplexes the signals from the line interface sections corresponding to the individual wavelengths and outputs the resulting signal to the transmission line.

Furthermore, the wavelength-division multiplex signal inputted to the wavelength-division multiplexing and demultiplexing section (WEST) 1-1 is demultiplexed in wavelength units and one of the separated signals is inputted to the line interface section (WEST PRT) 2-1-2 in the line redundancy unit 7-1. The line interface section 2-1-2 converts the signal form of the inputted optical signal as needed and outputs the resulting signal to the transmission line switch section 3-1. The line switch section 3-1 connects the path to the line interface section (EAST PRT) 2-1-4 according to the connection setting. The line interface section (WEST PRT) 2-1-4 converts the signal form of the inputted path as needed and outputs the resulting signal of a specific wavelength.

The wavelength-division multiplexing and demultiplexing section 1-3 wavelength-multiplexes the signals from the line interface sections corresponding to the individual wavelengths and outputs the resulting signal to the transmission line.

In this state, if a failure has occurred in the line interface section (WEST SRV) 2-1-1, the line switch section 3-1 outputs the path detoured via the line interface section (WEST PRT) 2-1-2 to the line interface section (EAST SRV) 2-1-3. On the other hand, if a failure has occurred in the line interface section (EAST SRV) 2-1-3, the line switch section 3-1 detours the path via the line interface section (EAST PRT) 2-1-4.

With the twenty-eighth embodiment, the following effects are produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

b) Since only one fiber pair is used as each of the WEST-side line and EAST-side line, the cost of the transmission paths can be reduced.

c) The optical cross-connect section 4 can connect any tributary channel to any wavelength on the WEST side or EAST side.

<Embodiment to Help Explain an Optical Transmission Apparatus which Includes Neither a Redundancy System nor a Cross-connect Switch and is Applied to a 4-Fiber System>

(Twenty-ninth Embodiment)

Figure 47:
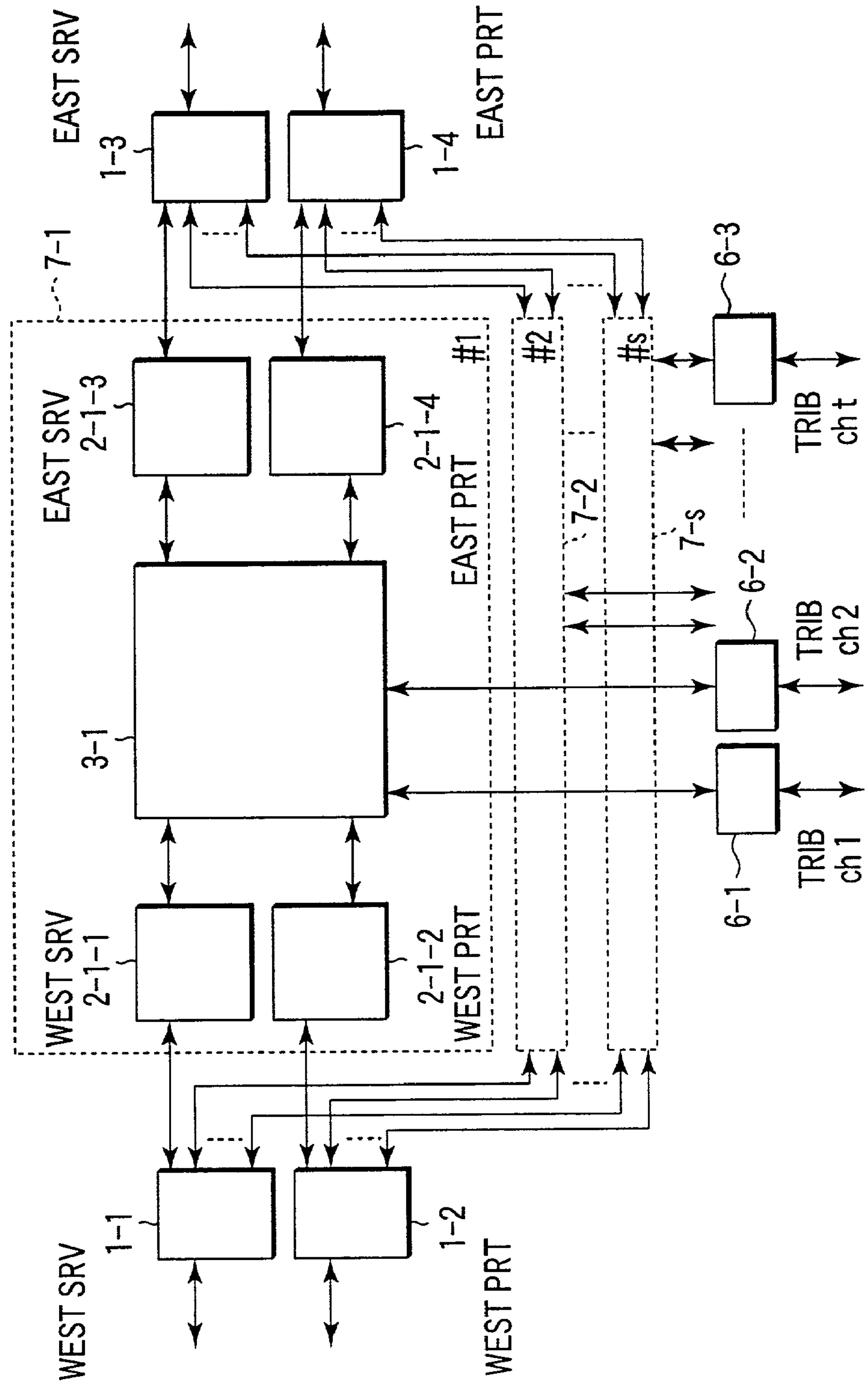
FIG. 47 is a block diagram showing another configuration of an optical transmission apparatus according to the present invention.

FIG. 47 is a block diagram showing another configuration of an optical transmission apparatus according to the present invention. The optical transmission apparatus of the twenty-ninth embodiment includes neither a switchable redundancy system nor an optical cross-connect section for assigning wavelengths between the line side and the tributary side. The optical transmission apparatus is used in a 4-fiber transmission system.

The optical transmission apparatus of FIG. 47 comprises wavelength-division multiplexing and demultiplexing sections (WEST SRV: 1-1, WEST PRT: 1-2, EAST SRV: 1-3, EAST PRT: 1-4), line redundancy units 7-1 to 7-s, a t number of tributary interface sections (6-1 for ch 1, 6-2 for ch 2, 6-t for ch t) for interfacing with the tributary side, and an optical cross-connect section 4.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line side using a specific wavelength and a line switch section 3 having the same function as that in the twenty-fourth embodiment.

The basic operation of the optical transmission apparatus shown in FIG. 47 will be explained, centering on a path set via the line redundancy unit 7-1.

[Add Direction]

In FIG. 47, after the path held in the tributary interface section 6-1 is subjected to a signal form converting process, a signal monitoring process, or a terminating process as needed, the resulting path is outputted to the line redundancy unit 7-1.

The line switch section 3-1 in the line redundancy unit 7-1 connects the path to the line interface section (WEST SRV) 2-1-1 according to the connection setting. The line interface section (WEST SRV) 2-1-1 converts the signal form of the inputted path as needed and outputs the resulting signal of a specific wavelength. The wavelength-division multiplexing and demultiplexing section (WEST SRV) 1-1 wavelength-multiplexes the signals from the line interface sections for the individual wavelengths and outputs the resulting signal to the transmission line.

In this state, if a failure has occurred in the WEST-SRV line, wavelength-division multiplexing and demultiplexing section 1-1, or line interface section (WEST SRV) 2-1-1, the line switch section 3-1 detours the path to the line interface section (WEST PRT) 2-1-2. On the other hand, if failures have occurred simultaneously in the WEST-side SRV system and PRT system, the line switch section 3-1 detours the path to the line interface section (EAST PRT) 2-1-4.

In FIG. 47, after the path held in the tributary interface section 6-2 is subjected to a signal form converting process, a signal monitoring process, or a terminating process as needed, the resulting signal is connected to the line redundancy unit 7-1.

The line switch section 3-1 in the line redundancy unit 7-1 connects the path to the line interface section (EAST SRV) 2-1-3 according to the connection setting. The line interface section 2-1-3 converts the signal form of the inputted path as needed and outputs the resulting signal of a specific wavelength. The wavelength-division multiplexing and demultiplexing section 1-3 wavelength-multiplexes the signals from the line interface sections for the individual wavelengths and outputs the resulting signal to the transmission line.

In this state, if a failure has occurred in the EAST-SRV line, wavelength-division multiplexing and demultiplexing section 1-3, or line interface section 2-1-3, the line switch section 3-1 detours the path to the line interface section (EAST PRT) 2-1-4. On the other hand, if failures have occurred simultaneously in the EAST-side SRV system and PRT system, the line switch section 3-1 detours the path to the line interface section (WEST PRT) 2-1-2.

[Drop Direction]

In FIG. 47, the wavelength-division multiplex light held in the wavelength-division multiplexing and demultiplexing section 1-1 is demultiplexed in wavelength units and one of the separated signals is inputted to the line interface section (WEST SRV) 2-1-1 in the line redundancy unit 7-1. The line interface section 2-1-1 converts the signal form of the inputted signal as needed and outputs the resulting signal to the transmission line switch section 3-1. The line switch section 3-1 connects the inputted signal to the tributary interface section 6-1 according to the connection setting. The tributary interface section 6-1 converts the signal form of the inputted signal as needed and outputs the resulting signal to an external unit.

In this state, if a failure has occurred in the WEST-SRV line, wavelength-division multiplexing and demultiplexing section 1-1, or line interface section 2-1-1, the line switch section 3-1 outputs the path detoured via the line interface section (WEST PRT) 2-1-2 to the tributary interface section. On the other hand, if failures have occurred simultaneously in the WEST-side SRV system and PRT system, the line switch section 3-1 outputs the path detoured via the line interface section (EAST PRT) 2-1-4 to the tributary interface section.

In FIG. 47, the wavelength-division multiplex signal inputted to the wavelength-division multiplexing and demultiplexing section 1-3 is demultiplexed in wavelength units and one of the separated signals is inputted to the line interface section 2-1-3 in the line redundancy unit 7-1. The line interface section 2-1-3 converts the signal form of the inputted signal as needed and outputs the resulting signal to the transmission line switch section 3-1. The line switch section 3-1 connects the inputted signal to the tributary interface section 6-2 according to the connection setting. The tributary interface section 6-2 converts the signal form of the inputted signal and outputs the resulting signal to an external unit.

In this state, if a failure has occurred in the EAST-SRV line, wavelength-division multiplexing and demultiplexing section 1-3, or line interface section 2-1-3, the line switch section 3-1 outputs the path detoured via the line interface section (EAST PRT) 2-1-4 to the tributary interface section. On the other hand, if failures have occurred simultaneously in the EAST-side SRV system and PRT system, the line switch section 3-1 outputs the path detoured via the line interface section (WEST PRT) 2-1-2 to the tributary interface section.

[Through Direction]

In FIG. 47, the wavelength-division multiplex signal inputted to the wavelength-division multiplexing and demultiplexing section 1-1 is demultiplexed in wavelength units and one of the split signals is inputted to the line interface section (WEST SRV) 2-1-1 in the line redundancy unit 7-1. The line interface section 2-1-1 converts the signal form of the inputted optical signal as needed and inputs the resulting signal to the line switch section 3-1. The line switch section 3-1 connects the path to the line interface section (EAST SRV) 2-1-3 according to the connection setting. The line interface section 2-1-3 converts the signal form of the inputted path as needed and outputs the resulting signal of a specific wavelength. The wavelength-division multiplexing and demultiplexing section 1-3 wavelength-multiplexes the signals from the line interface sections corresponding to the individual wavelengths and outputs the resulting signal to the transmission line.

Furthermore, the wavelength-division multiplex signal inputted to the wavelength-division multiplexing and demultiplexing section 1-2 is demultiplexed in wavelength units and one of the split signals is inputted to the line interface section (WEST PRT) 2-1-2 in the line redundancy unit 7-1. The line interface section 2-1-2 converts the signal form of the inputted signal as needed and outputs the resulting signal to the transmission line switch section 3-1. The line switch section 3-1 connects the path to the line interface section (EAST PRT) 2-1-4 according to the connection setting. The line interface section 2-1-4 converts the signal form of the inputted path as needed and outputs the resulting signal of a specific wavelength. The wavelength-division multiplexing and demultiplexing section 1-4 wavelength-multiplexes the signals from the line interface sections corresponding to the individual wavelengths and outputs the resulting signal to the transmission line.

In this state, if a failure has occurred in the WEST-SRV line, wavelength-division multiplexing and demultiplexing section 1-1, or line interface section 2-1-1, the line switch section 3-1 outputs the path detoured via the line interface section (WEST PRT) 2-1-2 to the line interface section (EAST SRV) 2-1-3. In addition, if a failure has occurred in the line interface section (EAST SRV) 2-1-3, the line switch section 3-1 detours the path via the line interface section (EAST PRT) 2-1-4.

[Tributary→Tributary Direction]

After the path held in the tributary interface section 6-1 is subjected to a signal form converting process, a signal monitoring process, or a terminating process as needed, the resulting signal is connected to the line redundancy unit 7-1. The line switch section 3-1 in the line redundancy unit 7-1 connects the path to the line interface section (WEST SRV) 2-1-1 according to the connection setting. The line interface section 2-1-1 converts the signal form of the inputted path and outputs the resulting signal of a specific wavelength. The wavelength-division multiplexing and demultiplexing section 1-1 wavelength-multiplexes the signals from the line interface sections for the individual wavelengths and outputs the resulting signal to the transmission line.

In this state, if a failure has occurred in the WEST-side or EAST-side transmission line, the wavelength-division multiplexing and demultiplexing sections 1-1 or 1-3, or the line interface section, the line switch section 3-1 detours the path to the tributary interface section 6-2.

With the twenty-ninth embodiment, the following effect is produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

<Embodiment to Help Explain an Optical Transmission Apparatus which Includes Neither a Redundancy System Nor a Cross-connect Switch and is Applied to a 2-Fiber System>

(Thirtieth Embodiment)

Figure 48:
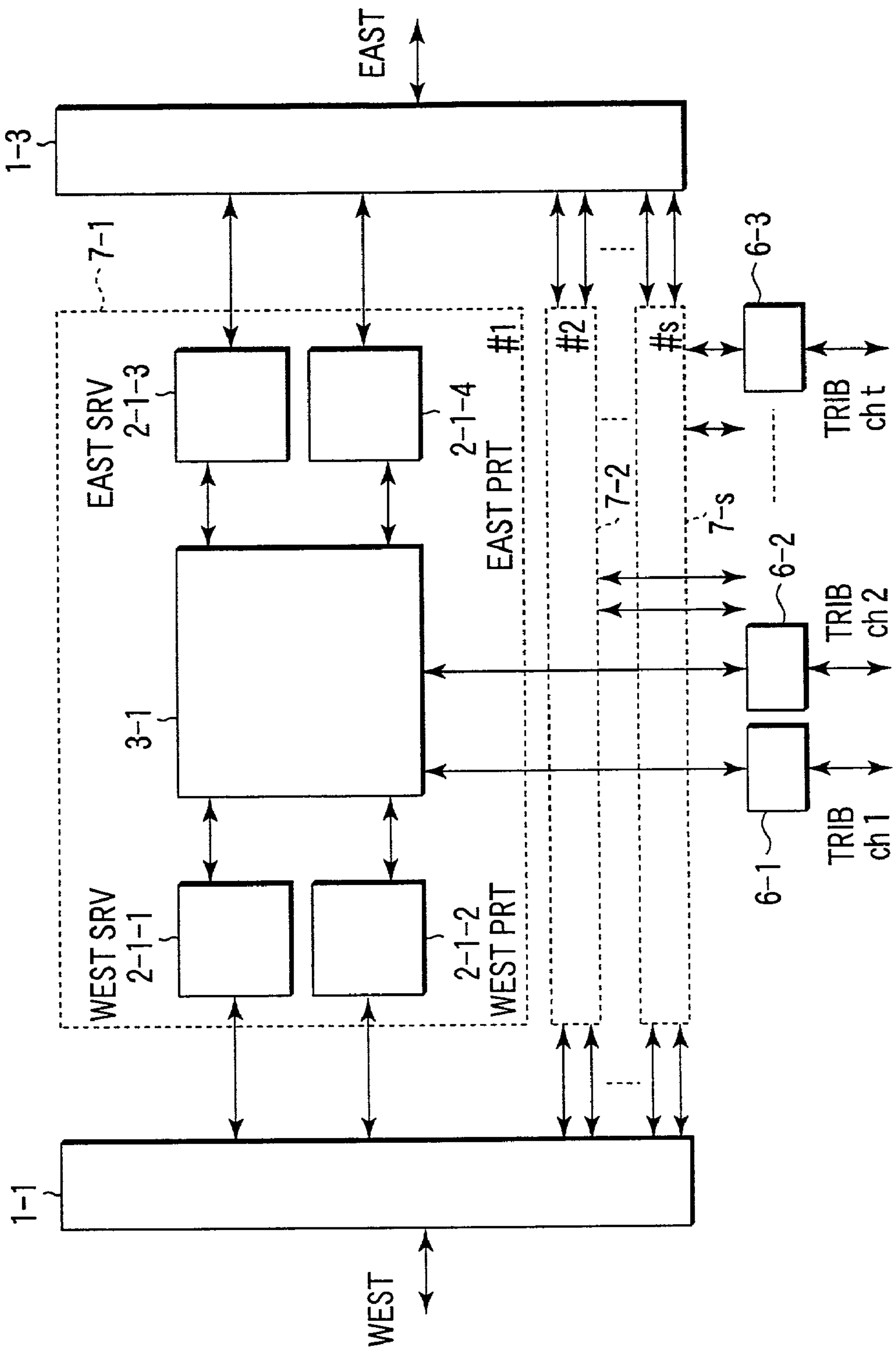
FIG. 48 is a block diagram showing another configuration of an optical transmission apparatus according to the present invention.

FIG. 48 is a block diagram showing another configuration of an optical transmission apparatus according to the present invention. The optical transmission apparatus of the thirtieth embodiment includes neither a switchable redundancy system nor an optical cross-connect section for assigning wavelengths between the line side and the tributary side. The optical transmission apparatus is used in a 2-fiber transmission system.

The optical transmission apparatus of FIG. 48 comprises wavelength-division multiplexing and demultiplexing sections (WEST: 1-1, EAST: 1-3), line redundancy units 7-1 to 7-s, and a t number of tributary interface sections (6-1 for ch 1, 6-2 for ch 2, 6-t for ch t) for interfacing with the tributary side.

The line redundancy units 7-1 to 7-s include line interface sections (WEST SRV: 2-1-1, WEST PRT: 2-1-2, EAST SRV: 2-1-3, EAST PRT: 2-1-4) for interfacing with the line using a specific wavelength and a line switch section 3 having the same function as that in the twenty-fourth embodiment.

The basic operation of the optical transmission apparatus shown in FIG. 48 will be explained, centering on a path set via the line redundancy unit 7-1.

[Add Direction]

After the path held in the tributary interface section 6-1 is subjected to a signal form converting process, a signal monitoring process, or a terminating process as needed, the resulting path is outputted to the line redundancy unit 7-1.

The line switch section 3-1 in the line redundancy unit 7-1 connects the path to the line interface section (WEST SRV) 2-1-1 according to the connection setting. The line interface section (WEST SRV) 2-1-1 converts the signal form of the inputted path as needed and outputs the resulting signal of a specific wavelength. The wavelength-division multiplexing and demultiplexing section 1-1 wavelength-multiplexes the signals from the line interface sections for the individual wavelengths and outputs the resulting signal to the transmission line.

In this state, if a failure has occurred in the line interface section (WEST SRV) 2-1-1, the line switch section 3-1 detours the path to the line interface section (WEST PRT) 2-1-2. On the other hand, if a failure has occurred in the WEST-side transmission line or wavelength-division multiplexing and demultiplexing section 1-1, the line switch section 3-1 detours the path to the line interface section (EAST PRT) 2-1-4.

After the path held in the tributary interface section 6-2 is subjected to a signal form converting process, a signal monitoring process, or a terminating process as needed, the resulting signal is connected to the line redundancy unit 7-1.

The line switch section 3-1 in the line redundancy unit 7-1 connects the path to the line interface section (EAST SRV) 2-1-3 according to the connection setting. The line interface section 2-1-3 converts the signal form of the inputted path and outputs the resulting signal of a specific wavelength. The wavelength-division multiplexing and demultiplexing section 1-3 wavelength-multiplexes the signals from the line interface sections for the individual wavelengths and outputs the resulting signal to the transmission line.

In this state, if a failure has occurred in the line interface section (EAST SRV) 2-1-3, the line switch section 3-1 detours the path to the line interface section (EAST PRT) 2-1-4. On the other hand, if a failure has occurred in the EAST-side transmission line or wavelength-division multiplexing and demultiplexing section 1-3, the line switch section 3-1 detours the path to the line interface section (WEST PRT) 2-1-2.

[Drop Direction]

The wavelength-division multiplex light held in the wavelength-division multiplexing and demultiplexing section 1-1 is demultiplexed in wavelength units and one of the separated signals is inputted to the line interface section (WEST SRV) 2-1-1 in the line redundancy unit 7-1. The line interface section 2-1-1 converts the signal form of the inputted signal as needed and outputs the resulting signal to the transmission line switch section 3-1. The line switch section 3-1 connects the inputted signal to the tributary interface section 6-1 according to the connection setting. The tributary interface section 6-1 converts the signal form of the inputted signal as needed and outputs the resulting signal to an external unit.

In this state, if a failure has occurred in the line interface section (WEST SRV) 2-1-1, the line switch section 3-1 outputs the path detoured via the line interface section (WEST PRT) 2-1-2 to the tributary interface section 6-1. On the other hand, if a failure has occurred in the WEST-side transmission line or wavelength-division multiplexing and demultiplexing section 1-1, the line switch section 3-1 outputs the path detoured via the line interface section (EAST PRT) 2-1-4 to the tributary interface section 6-1.

In FIG. 48, the wavelength-division multiplex signal inputted to the wavelength-division multiplexing and demultiplexing section 1-3 is demultiplexed in wavelength units and one of the separated signals is inputted to the line interface section 2-1-3 in the line redundancy unit 7-1. The line interface section 2-1-3 converts the signal form of the inputted signal as needed and outputs the resulting signal to the transmission line switch section 3-1. The line switch section 3-1 connects the inputted signal to the tributary interface section 6-2 according to the connection setting. The tributary interface section 6-2 converts the signal form of the inputted signal and outputs the resulting signal to an external unit.

In this state, if a failure has occurred in the line interface section (EAST SRV) 2-1-3, the line switch section 3-1 outputs the path detoured via the line interface section (EAST PRT) 2-1-4 to the tributary interface section 6-2. On the other hand, if a failure has occurred in the EAST-side transmission line or wavelength-division multiplexing and demultiplexing section 1-3, the line switch section 3-1 outputs the path detoured via the line interface section (WEST PRT) 2-1-2 to the tributary interface section 6-2.

[Through Direction]

In FIG. 48, the wavelength-division multiplex signal inputted to the wavelength-division multiplexing and demultiplexing section 1-1 is demultiplexed in wavelength units and one of the split signals is inputted to the line interface section (WEST SRV) 2-1-1 in the line redundancy unit 7-1. The line interface section 2-1-1 converts the signal form of the inputted optical signal as needed and inputs the resulting signal to the line switch section 3-1. The line switch section 3-1 connects the path to the line interface section (EAST SRV) 2-1-3 according to the connection setting. The line interface section 2-1-3 converts the signal form of the inputted path as needed and outputs the resulting signal of a specific wavelength. The wavelength-division multiplexing and demultiplexing section 1-3 wavelength-multiplexes the signals from the line interface sections corresponding to the individual wavelengths and outputs the resulting signal to the transmission line.

Furthermore, the wavelength-division multiplex signal inputted to the wavelength-division multiplexing and demultiplexing section 1-1 is demultiplexed in wavelength units and one of the split signals is inputted to the line interface section (WEST PRT) 2-1-2 in the line redundancy unit 7-1. The line interface section 2-1-2 converts the signal form of the inputted signal as needed and outputs the resulting signal to the transmission line switch section 3-1.

The line switch section 3-1 connects the path to the line interface section (EAST PRT) 2-1-4 according to the connection setting. The line interface section 2-1-4 converts the signal form of the inputted path as needed and outputs the resulting signal of a specific wavelength. The wavelength-division multiplexing and demultiplexing section 1-3 wavelength-multiplexes the signals from the line interface sections corresponding to the individual wavelengths and outputs the resulting signal to the transmission line.

In this state, if a failure has occurred in the line interface section (WEST SRV) 2-1-1, the line switch section 3-1 outputs the path detoured via the line interface section (WEST PRT) 2-1-2 to the line interface section (EAST SRV) 2-1-3. On the other hand, if a failure has occurred in the line interface section (EAST SRV) 2-1-3, the line switch section 3-1 detours the path via the line interface section (EAST PRT) 2-1-4.

[Tributary→Tributary Direction]

In FIG. 48, after the path held in the tributary interface section 6-1 is subjected to a signal form converting process, a signal monitoring process, or a terminating process as needed, the resulting signal is connected to the line redundancy unit 7-1. The line switch section 3-1 in the line redundancy unit 7-1 connects the path to the line interface section (WEST SRV) 2-1-1 according to the connection setting. The line interface section (WEST SRV) 2-1-1 converts the signal form of the inputted path as needed and outputs the resulting signal of a specific wavelength. The wavelength-division multiplexing and demultiplexing section 1-1 wavelength-multiplexes the signals from the line interface sections for the individual wavelengths and outputs the resulting signal to the transmission line.

In this state, if a failure has occurred in the WEST-side or EAST-side transmission line, the wavelength-division multiplexing and demultiplexing section, or the line interface section, the line switch section 3-1 detours the path to the tributary interface section 6-2.

With the thirtieth embodiment, the following effects are produced:

a) Use of the line switch section capable of splitting an optical signal and connecting the split signals enables the path to be detoured quickly in case of failure. Consequently, it is possible to shorten the time during which the pass is interrupted in the case of the switching or revertive switching of the path.

b) Since only one fiber pair is used as each of the WEST-side line and EAST-side line, the cost of the transmission paths can be reduced.

As explained in the above embodiments, the present invention performs control in a wavelength-division multiplexing transmission system in such a manner that not only just switching is done, but switching is also done after the working system and protection system are brought into the Bridge state temporarily in the line switch section for performing protection switching. This way of switching produces the following effects:

1) Since service traffic is transmitted via the protection line before the start of switching, the optical transmission apparatus can check the quality of traffic. This prevents unnecessary switching and revertive switching.

2) When switching is done in the line switch section, the service traffic transmitted via the protection line can be caused to have already been inputted to the line switch section. This enables the duration of instantaneous cutoff of traffic due to switching to be decreased by the value equivalent to the delay time in transmitting the signal via the protection line.

3) When revertive switching is done in recovering from a failure, the service traffic can be inputted to the line switch section from both of the protection line and service line as described in item 2). This enables the duration of instantaneous cutoff of traffic due to revertive switching to be decreased by the value equivalent to the delay time in transmitting the signal via the service line.

Moreover, in the normal state, extra traffic or part-time traffic can be held.

Furthermore, in these embodiments, each of the line interface section and tributary interface section is provided with the function of inserting a specific signal. This prevents the misconnection between service traffic and extra traffic or between service traffic and part-time traffic.

As has been explained above, the embodiments of the present invention make it possible to design the algorithm for protection switching in a wavelength-division multiplexing network in the same manner as in a transmission apparatus that operates on an existing electric interface. Therefore, the self-healing function can be operated more stably. Moreover, the maintainability of the wavelength-division multiplexing network can be improved.

This invention is not limited to the above embodiments. For instance, while in FIG. 4, a four-fiber ring system has been shown, the application of the optical switching apparatus and optical transmission apparatus according to the present invention is not restricted to this type of system. The optical switching apparatus and optical transmission apparatus according to the present invention may be applied to a two-fiber ring transmission system or a transmission system connected by means of more than four fibers.

Although the ring network where nodes are connected in a ring has been shown in FIG. 4, the present invention is not necessarily limited to the ring form. For instance, the present invention may be applied to a system where a plurality of optical transmission apparatuses are connected linearly via optical transmission lines.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical switching apparatus provided for an optical signal transmitting apparatus connected to a plurality of optical transmission lines, said optical switching apparatus comprising: the function of splitting optical signals arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms Point-to-Point connection paths which connect senders of signals and receivers of signals in a one-to-one correspondence, between the optical signal transmitting apparatus in which said optical switching apparatus is provided and another optical signal transmitting apparatus, and said optical switching apparatus further comprises:

n×m (n and m are natural numbers) input ports to which optical signals are inputted;

n×m output ports for outputting optical signals;

n×m optical splitting elements for each splitting in half the optical signal inputted from the corresponding one of said input ports; and an optical matrix switch including 2×n×m input terminals to which the split signals outputted from the optical splitting elements are inputted in a one-to-one correspondence and n×m output terminals connected to said output ports in a one-to-one correspondence.

2. The optical switching apparatus according to claim 1, wherein said input ports and output ports are grouped into an m number of port groups caused to correspond to different wavelengths and an n number of input ports and an n number of output ports belong to each of the port groups.

3. An optical switching apparatus provided for an optical signal transmitting apparatus connected to a plurality of optical transmission lines, said optical switching apparatus comprising: the function of splitting optical signals arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms Point-to-Point connection paths which connect senders of signals and receivers of signals in a one-to-one correspondence, between the optical signal transmitting apparatus in which said optical switching apparatus is provided and another optical signal transmitting apparatus, and said optical switching apparatus further comprises:

n×m (n and m are natural numbers) input ports to which optical signals are inputted;

n×m output ports for outputting optical signals;

an optical matrix switch including (n+2)×m input terminals and n×m output terminals; and a 2m number of optical splitting elements which are connected to 2m of the output terminals of the optical matrix switch and which each splits in half the optical signal outputted from the corresponding one of the connected output terminals, wherein one-side split ends of the optical splitting elements are connected to 2m of said input terminals of said optical matrix switch in a one-to-one correspondence and the other-side split ends of said optical splitting elements are connected to 2m of said output ports in a one-to-one correspondence, said input ports are connected to the remaining (n−2)×m input terminals of said optical matrix switch in a one-to-one correspondence, and the remaining (n−2)×m input terminals of said optical matrix switch are connected to the remaining (n−2)×m of said output ports.

4. The optical switching apparatus according to claim 3, wherein said input ports and output ports are grouped into an m number of port groups caused to correspond to different wavelengths and an n number of input ports and an n number of output ports belong to each of the port groups.

5. An optical switching apparatus provided for an optical signal transmitting apparatus connected to a plurality of optical transmission lines, said optical switching apparatus comprising: the function of splitting optical signals arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms Point-to-Point connection paths which connect senders of signals and receivers of signals in a one-to-one correspondence, between the optical signal transmitting apparatus in which said optical switching apparatus is provided and another optical signal transmitting apparatus, and said optical switching apparatus further comprises:

n×m (n and m are natural numbers) input ports to which optical signals are inputted;

n×m output ports for outputting optical signals;

a 2m number of first optical splitting elements for each splitting in half the optical signal inputted from the corresponding one of 2m of said input ports;

an optical matrix switch with expansion ports each of which includes (n+2)×m input terminals and an expansion output terminal and n×m output terminals and an expansion input terminal;

a 2m number of second optical splitting elements which are connected to 2m of said output terminals of the optical matrix switch with expansion ports in a one-to-one correspondence and which each split in half the optical signal outputted from the corresponding one of the connected output terminals, wherein two split ends of said first optical splitting elements and said input ports are connected to input terminals of said optical matrix switch with expansion ports in a one-to-one correspondence, one-side split ends of said second optical splitting elements are connected to 2m of the expansion input terminals of said optical matrix switch with expansion ports, the other-side split ends of the second optical splitting elements are connected to 2m of said output ports, and the remaining (n−2)×m of said output terminals of said optical matrix switch with expansion ports and the remaining (n−2) m of said output ports are connected to each other.

6. The optical switching apparatus according to claim 5, wherein said input ports and output ports are grouped into an m number of port groups caused to correspond to different wavelengths and an n number of input ports and an n number of output ports belong to each of the port groups.

7. An optical switching apparatus provided for an optical signal transmitting apparatus connected to a plurality of optical transmission lines, said optical switching apparatus comprising: the function of splitting optical signals arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms Point-to-Point connection paths which connect senders of signals and receivers of signals in a one-to-one correspondence, between the optical signal transmitting apparatus in which said optical switching apparatus is provided and another optical signal transmitting apparatus, and said optical switching apparatus further comprises:

a 6m number of input ports (m is a natural number) to which optical signals are inputted;

a 6m number of output ports for outputting optical signals;

a 6m number of optical splitting elements each of which has three output terminals and splits the optical signal inputted from the corresponding one of said input ports into three sub-signals and outputs them at said three output terminals; and first to sixth optical switching means each of which includes a 3 m number of input terminals and an m number of output terminals and selectively switches the optical signal inputted from any one of said input terminals between its output terminals, wherein when said optical splitting elements are divided into a first to a sixth group, each of which is composed of an m number of optical splitting elements, the output terminals of the optical splitting elements belonging to the first group are connected to the input terminals of the third, fourth, and fifth optical switching means in a one-to-one correspondence, the output terminals of the optical splitting elements belonging to the second group are connected to the input terminals of the third, fifth, and sixth optical switching means in a one-to-one correspondence, the output terminals of the optical splitting elements belonging to the third group are connected to the input terminals of the first, second, and sixth optical switching means in a one-to-one correspondence, the output terminals of the optical splitting elements belonging to the fourth group are connected to the input terminals of the first, fifth, and sixth optical switching means in a one-to-one correspondence, the output terminals of the optical splitting elements belonging to the fifth group are connected to the input terminals of the first, second, and fourth optical switching means in a one-to-one correspondence, and the output terminals of the optical splitting elements belonging to the sixth group are connected to the input terminals of the second, third, and fourth optical switching means in a one-to-one correspondence.

8. The optical switching apparatus according to claim 7, wherein said input ports and output ports are grouped into an m number of port groups caused to correspond to different wavelengths and six input ports and six output ports belong to each of the port groups.

9. An optical switching apparatus provided for an optical signal transmitting apparatus connected to a plurality of optical transmission lines, said optical switching apparatus comprising: the function of splitting optical signals arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms Point-to-Point connection paths which connect senders of signals and receivers of signals in a one-to-one correspondence, between the optical signal transmitting apparatus in which said optical switching apparatus is provided and another optical signal transmitting apparatus, and said optical switching apparatus further comprises:

first to sixth input ports to which optical signals are inputted;

first to sixth output ports for outputting optical signals;

first optical switching means which has two output terminals and switches the optical signals from the first port and the second input port between its two output terminals;

second optical switching means which has two output terminals and selectively outputs the optical signal from one output terminal of said first optical switching means at one of its two output terminals;

third optical switching means which has two output terminals and switches the optical signals from the third port and the fourth input port between its two output terminals;

fourth optical switching means which has two output terminals and selectively outputs the optical signal from one output terminal of said third optical switching means at one of its two output terminals;

fifth optical switching means which selectively outputs either the optical signal from the other output terminal of said first optical switching means or the optical signal from one output terminal of said fourth optical switching means to the sixth output port;

sixth optical switching means which selectively outputs either the optical signal from the other output terminal of said third optical switching means or the optical signal from one output terminal of said second optical switching means to the fifth output port;

a first optical splitting element which has two output terminals and which splits the optical signal from the sixth input port and outputs the split signals at its two output terminals;

a second optical splitting element which has two output terminals and which splits the optical signal from the fifth input port and outputs the split signals at its two output terminals;

seventh optical switching means which selectively outputs either the optical signal from the other output terminal of said second optical switching means or the optical signal from one output terminal of said first optical splitting element;

eighth optical switching means which selectively outputs either the optical signal from the other output terminal of said fourth optical switching means or the optical signal from one output terminal of said second optical splitting element;

a third optical splitting element which has two output terminals and which splits the optical signal outputted from said seventh optical switching means and outputs one split optical signal from one of its two output terminal to the third output port and the other split optical signal at its other output terminal;

ninth optical switching means which selectively outputs either the optical signal from the other output terminal of the third optical splitting element or the optical signal from the other output terminal of said second optical splitting element to the fourth output port;

a fourth optical splitting element which has two output terminals and which splits the optical signal outputted from said eighth optical switching means and outputs one split optical signal from one of its two output terminal to the first output port and the other split optical signal at its other output terminal; and tenth optical switching means which selectively outputs either the optical signal from the other output terminal of the fourth optical splitting element or the optical signal from the other output terminal of said first optical splitting element to the second output port.

10. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further, comprising:

n×m (n and m are natural numbers) input ports to which optical signals are inputted;

n×m output ports for outputting optical signals;

n×m optical splitting elements each of which splits the optical signal inputted from the corresponding one of said input ports into four sub-signals;

an optical matrix switch including 4×n×m input terminals to which the split signals outputted from the optical splitting elements are inputted in a one-to-one correspondence and n×m output terminals connected to said output ports in a one-to-one correspondence.

11. The optical switching apparatus according to claim 10, wherein said input ports and output ports are grouped into an m number of port groups caused to correspond to different wavelengths and an n number of input ports and an n number of output ports belong to each of the port groups.

12. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

n×m (n and m are natural numbers) input ports to which optical signals are inputted;

n×m output ports for outputting optical signals;

n×m first optical splitting elements each of which splits in half the optical signal inputted from the corresponding one of said input ports;

an optical matrix switch including (2×n+2).times.m input terminals and n×m output terminals; and a 2m number of second optical splitting elements which are connected to 2m of the output terminals of the optical matrix switch in a one-to-one correspondence and each of which splits in half the optical signal outputted from the corresponding one of the connected output terminals, wherein the split ends of said first optical splitting elements are inputted to 2×n×m input terminals of said optical matrix switch in a one-to-one correspondence, the remaining 2×m input terminals of the optical matrix switch are connected to one-side split ends of said second optical splitting elements, the other-side split ends of the second optical splitting elements are connected to 2m of said output ports in a one-to-one correspondence, and the remaining (n−2)×m output terminals of said optical matrix switch are connected to the remaining (n−2)×4 of said output ports.

13. The optical switching apparatus according to claim 12, wherein said input ports and output ports are grouped into an m number of port groups caused to correspond to different wavelengths and an n number of input ports and an n number of output ports belong to each of the port groups.

14. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

a 6m number (m is a natural number) of input ports to which optical signals are inputted;

a 6m number of output ports for outputting optical signals;

a 6m number of optical splitting elements each of which splits in half the optical signal inputted from the corresponding one of said input ports;

a first optical matrix switch including a 10m number of input terminals and a 4m number of output terminals;

a second optical matrix switch including a 4m number of input terminals to which one-side ends of 4m of said first optical splitting elements are connected in a one-to-one correspondence and a 2m number of output terminals connected to 2m of said output ports in a one-to-one correspondence; and a 2m number of second optical splitting elements which are connected to 2m of the output terminals of said first optical matrix switch and each of which splits in half the optical signal outputted from the corresponding one of the connected output terminals, wherein the other-side split ends of 4m of said first optical splitting elements and the two split ends of the remaining 2m ones of said first optical splitting elements are connected to 8m of the input terminals of said first matrix switch in a one-to-one correspondence, one-side split ends of said second optical splitting elements are connected to the remaining 2m input terminals of said first matrix switch, and the remaining 2m output terminals of said first matrix switch and the other-side split ends of said second optical splitting elements are connected to the remaining 4m ones of said output ports in a one-to-one correspondence.

15. The optical switching apparatus according to claim 14, wherein said input ports and output ports are grouped into an m number of port groups caused to correspond to different wavelengths and six input ports and six output ports belong to each of the port groups.

16. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

a 6m number (m is a natural number) of input ports to which optical signals are inputted;

a 6m number of output ports for outputting optical signals;

a 6m number of optical splitting elements each of which splits in half the optical signal inputted from the corresponding one of said input ports;

a first optical matrix switch including an 8m number of input terminals and a 4m number of output terminals;

a second optical matrix switch including a 6m number of input terminals and a 4m number of output terminals; and a 2m number of optical coupler splitters each of which has two input terminals and two output terminals and which couples the optical signals inputted from its two input terminals and then splits the coupled signal and outputs the split signals at its two output terminals, wherein one-side split ends of said 6m optical splitting elements are connected to 6m of the input terminals of said first optical matrix switch and the other-side split ends of the optical splitting elements are connected to 6m input terminals of said second optical matrix switch, 2m of the output terminals of said second optical matrix switch are connected to 2m of said output ports, the remaining 2m of the output terminals of said second optical matrix switch are connected to one-side input terminals of said optical coupler splitters in a one-to-one correspondence, 2m of the output terminals of said first optical matrix switch are connected to the remaining 2m of said output ports, the remaining 2m output terminals of the first optical matrix switch are connected to the other-side input terminals of said optical coupler splitters in a one-to-one correspondence, one-side output terminals of said optical coupler splitters are connected to the remaining 2m input terminals of said first optical matrix switch, and the other-side output terminals of the optical coupler splitters are connected to the remaining 2m of said output port.

17. The optical switching apparatus according to claim 16, wherein said input ports and output ports are grouped into an m number of port groups caused to correspond to different wavelengths and six input ports and six output ports belong to each of the port groups.

18. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

a 6m number (m is a natural number) of input ports to which optical signals are inputted;

a 6m number of output ports for outputting optical signals;

n×m first optical splitting elements each of which splits in half the optical signal inputted from the corresponding one of said input ports;

an optical matrix switch with expansion ports each of which includes a 10m number of input terminals and an expansion output terminal and a 6m number of output terminals and an expansion input terminal; and a 2m number of second optical splitting elements which are connected to 2m of said expansion output terminals of said optical matrix switch with expansion ports and each of which splits in half the optical signal outputted from the corresponding one of the connected output terminals, wherein two split ends of 4m of said first optical splitting elements and one-side split ends of the remaining 2m first optical splitting elements are connected to input terminals of said optical matrix switch, the other-side split ends of said remaining 2m first optical splitting elements are connected to 2m of said expansion input terminals, one-side split ends of said second optical splitting elements are connected to the remaining 2m expansion input terminals, and the remaining 4m output terminals of said optical matrix switch and the other-side split ends of said second optical splitting elements are connected to said output ports in a one-to-one correspondence.

19. The optical switching apparatus according to claim 18, wherein said input ports and output ports are grouped into an m number of port groups caused to correspond to different wavelengths and six input ports and six output ports belong to each of the port groups.

20. The optical switching apparatus according to claim 19, wherein said input ports and output ports are grouped into an m number of port groups caused to correspond to different wavelengths and six input ports and six output ports belong to each of the port groups.

21. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

a 6m number (m is a natural number) of input ports to which optical signals are inputted;

a 6m number of output ports for outputting optical signals;

a 6m number of optical splitting elements each of which has four output terminals and splits the optical signal inputted from the corresponding one of said input ports into four sub-signals and outputs them at said four output terminals; and first to sixth optical switching means each of which includes a 4m number of input terminals and an m number of output terminals and switches the optical signal inputted from one of said input terminals between its output terminals, wherein when said optical splitting elements are divided into a first to a sixth group, each of which is composed of an m number of optical splitting elements, the output terminals of the optical splitting elements belonging to the first group are connected to the input terminals of the third, fourth, fifth, and sixth optical switching means in a one-to-one correspondence the output terminals of the optical splitting elements belonging to the second group are connected to the input terminals of the third, fourth, fifth, and sixth optical switching means in a one-to-one correspondence, the output terminals of the optical splitting elements belonging to the third group are connected to the input terminals of the first, second, fifth, and sixth optical switching means in a one-to-one correspondence, the output terminals of the optical splitting elements belonging to the fourth group are connected to the input terminals of the first, second, fifth, and sixth optical switching means in a one-to-one correspondence, the output terminals of the optical splitting elements belonging to the fifth group are connected to the input terminals of the first, second, third, and fourth optical switching means in a one-to-one correspondence, and the output terminals of the optical splitting elements belonging to the sixth group are connected to the input terminals of the first, second, third, and fourth optical switching means in a one-to-one correspondence.

22. An optical switching apparatus provided for an optical signal transmitting apparatus connected to a plurality of optical transmission lines, said optical switching apparatus comprising: the function of splitting optical signal arrived via said optical transmission lines into a plurality of sub-signals and sending them to a plurality of optical transmission lines other than the optical transmission lines over which the optical signals came, wherein said optical signal transmitting apparatus is provided for a network to which a plurality of optical signal transmitting apparatuses are connected via said optical transmission lines, and said optical switching apparatus forms a Point-to-Multi-point connection paths which connect a plurality of receivers of signals to a sender of an optical signal, between the optical signal transmitting apparatus in which said optical switching apparatus is provided and another optical signal transmitting apparatus and further comprising:

first to sixth input ports to which optical signals are inputted;

first to sixth output ports for outputting optical signals;

first optical switching means which has two output terminals and switches the optical signals from the first port and the second input port between its two output terminals;

a first optical splitting element which has two output terminals and which splits the optical signal from one output terminal of said first optical switching means and outputs the split signals at its two output terminals;

second optical switching means which has two output terminals and switches the optical signals from the third inpUt port and the fourth input port between its two output terminals;

a second optical splitting element which has two output terminals and which splits the optical signal from one output terminal of said second optical switching means and outputs the split signals at its two output terminals;

third optical switching means which selectively outputs either the optical signal from the other output terminal of said first optical switching means or the optical signal from one output terminal of said second optical splitting element to the sixth output port;

fourth optical switching means which selectively outputs either the optical signal from the other output terminal of said second optical switching means or the optical signal from one output terminal of said first optical splitting element to the fifth output port;

a third optical splitting element which has two output terminals and which splits the optical signal from the sixth input port and outputs the split signals at its two output terminals;

a fourth optical splitting element which has two output terminals and which splits the optical signal from the fifth input port and outputs the split signals at its two output terminals;

fifth optical switching means which has two output terminals and which switches the optical signals from one output terminal of said third optical splitting element and from one output terminal of said fourth optical splitting element between its two output terminals;

sixth optical switching means which has two output terminals and which switches the optical signals from the other output terminal of said third optical splitting element and from the other output terminal of said fourth optical splitting element between its two output terminals;

seventh optical switching means which selectively outputs either the optical signal from the other output terminal of said first optical switching means or the optical signal from one output terminal of said fifth optical switching means;

a fifth optical splitting element which has two output terminals and which splits the optical signal outputted from said seventh optical switching means and outputs one split optical signal from one of its two output terminals to the third output port and the other split optical signal at its other output terminal;

eighth optical switching means which selectively outputs either the optical signal from the other output terminal of said fifth optical splitting element or the optical signal from the other output terminal of said fifth optical switching means to the fourth output port;

ninth optical switching means which selectively outputs either the optical signal from the other output terminal of said second optical splitting element or the optical signal from one output terminal of said sixth optical switching means;

a sixth optical splitting element which has two output terminals and which splits the optical signal outputted from said ninth optical switching means and outputs one split optical signal from one of its two output terminals to the first output port and the other split optical signal at its other output terminal; and tenth optical switching means which selectively outputs either the optical signal from the other output terminal of said sixth optical splitting element or the optical signal from the other output terminal of said sixth optical switching means to the second output port.

23. In an information transmission system including a plurality of optical transmission apparatuses connected to one another via an optical transmission line for transmitting wavelength-division multiplex light, each of said optical transmission apparatuses comprising:

a plurality of line switch units provided so as to correspond to individual wavelengths;

wavelength-division multiplexing and demultiplexing sections which not only wavelength-multiplex the optical signals supplied from said plurality of line switch units and send the resulting signals to said optical transmission line but also wavelength-demultiplex the wavelength-division multiplex light arrived via the optical transmission line and input the resulting signals to said line switch units of the corresponding wavelengths; a plurality of tributary units provided for lower-order-group-side channels in a one-to-one correspondence; and optical cross-connect sections for assigning the wavelengths corresponding to said plurality of line switch units to said plurality of tributary units arbitrarily.

24. The optical transmission apparatus according to claim 23, wherein each of said line switch units includes line interface sections for interfacing with said wavelength-division multiplexing and demultiplexing sections, and an optical switching apparatus which is connected to said line interface sections and said optical cross-connect section and which switches the optical signal exchanged between the line interface sections and the optical cross-connect section.

25. The optical transmission apparatus according to claim 24, wherein said optical switch apparatus includes a service-system optical switching apparatus and a protection-system switch apparatus which are connected to said line interface sections and said optical cross-connect sections separately and which switch the optical signal exchanged between the line interface sections and the optical cross-connect sections, and each of said tributary units includes first to third tributary interface sections for interfacing with said lower-order-group-side, and tributary switch sections for switching the optical signal exchanged between the tributary interface sections and said optical cross-connect sections.

26. The optical transmission apparatus according to claim 25, wherein said optical transmission line includes a service line and a protection line, said first tributary interface section holds the lower-order-group-side service-system line, said second tributary interface section holds the lower-order-group-side protection-system line, said third tributary interface section holds the lower-order-group-side part-time traffic, and when said protection line has a blank transmission resource, said part-time traffic is transmitted via the transmission resource.

27. The optical transmission apparatus according to claim 26, wherein, when protection switching is effected, said third tributary interface section inserts a specific signal into the transmission resource of said part-time traffic.

28. The optical transmission apparatus according to claim 26, wherein, when protection switching is effected, said line interface sections insert a specific signal into said protection line.

29. In an information transmission system including a plurality of optical transmission apparatuses connected to one another via an optical transmission line for transmitting wavelength-division multiplex light, each of said optical transmission apparatuses comprising:

a plurality of line switch units provided so as to correspond to individual wavelengths;

wavelength-division multiplexing and demultiplexing sections which not only wavelength-multiplex the optical signals supplied from a plurality of line redundancy units and send resulting signals to said optical transmission line but also wavelength-demultiplex the wavelength-division multiplex light arrived via the optical transmission line and input the resulting signals to said line switch units of the corresponding wavelengths; and a plurality of tributary units provided for lower-order-group-side channels in a one-to-one correspondence, wherein each of said line switch units includes, line interface section for interfacing with said wavelength-division multiplexing and demultiplexing sections, and an optical switching apparatus which is connected to said line interface sections and the tributary units for the channel of the corresponding wavelength and which switches the optical signal exchanged between the line interface sections and the tributary units.

30. The optical transmission apparatus according to claim 29, wherein said optical switch apparatus includes a service-system optical switching apparatus and a protection-system switch apparatus which are connected to said line interface sections and said optical cross-connect sections separately and which switch the optical signal exchanged between the line interface sections and the optical cross-connect sections, and each of said tributary units includes first to third tributary interface sections for interfacing with said lower-order-group-side, and tributary switch sections for switching the optical signal exchanged between the tributary interface sections and said optical cross-connect sections.

31. The optical transmission apparatus according to claim 30, wherein said optical transmission line includes a service line and a protection line, said first tributary interface section holds the lower-order-group-side service-system line, said second tributary interface section holds the lower-order-group-side protection-system line, said third tributary interface section holds the lower-order-group-side part-time traffic, and when said protection line has a blank transmission resource, said part-time traffic is transmitted via the transmission resource.

32. The optical transmission apparatus according to claim 31, wherein, when protection switching is effected, said third tributary interface section inserts a specific signal into the transmission resource of said part-time traffic.

33. The optical transmission apparatus according to claim 31, wherein, when protection switching is effected, said line interface sections insert a specific signal into said protection line.

* * * * *